US010261292B2

(12) United States Patent
Uehara

(10) Patent No.: US 10,261,292 B2
(45) Date of Patent: Apr. 16, 2019

(54) VARIABLE POWER OPTICAL SYSTEM, OPTICAL DEVICE, AND METHOD FOR PRODUCING VARIABLE POWER OPTICAL SYSTEM

(71) Applicant: Nikon Corporation, Minato-ku, Tokyo (JP)

(72) Inventor: Takeru Uehara, Ageo (JP)

(73) Assignee: Nikon Corporation, Tokyo (JP)

(*) Notice: Subject to any disclaimer, the term of this patent is extended or adjusted under 35 U.S.C. 154(b) by 95 days.

(21) Appl. No.: 15/418,753

(22) Filed: Jan. 29, 2017

(65) Prior Publication Data
US 2017/0176727 A1 Jun. 22, 2017

Related U.S. Application Data

(63) Continuation of application No. PCT/JP2015/071579, filed on Jul. 30, 2015.

(30) Foreign Application Priority Data

Jul. 30, 2014 (JP) .................................. 2014-154834
Jul. 30, 2014 (JP) .................................. 2014-154835
Jul. 30, 2014 (JP) .................................. 2014-154836

(51) Int. Cl.
*G02B 15/14* (2006.01)
*G02B 15/163* (2006.01)
(Continued)

(52) U.S. Cl.
CPC ......... *G02B 15/163* (2013.01); *G02B 15/173* (2013.01); *G02B 15/177* (2013.01);
(Continued)

(58) Field of Classification Search
CPC .. G02B 27/646; G02B 15/173; G02B 13/009; G02B 15/14; G02B 13/18; G02B 15/20;
(Continued)

(56) References Cited

U.S. PATENT DOCUMENTS 5,442,486 A * 8/1995 Sato ..................... G02B 15/173
359/557
5,717,527 A * 2/1998 Shibayama .......... G02B 15/173
359/683

(Continued)

FOREIGN PATENT DOCUMENTS

JP          05-100166 A      4/1993
JP          09-152551 A      6/1997
(Continued)

OTHER PUBLICATIONS

English translation of International Preliminary Report on Patentability from International Patent Application No. PCT/JP2015/071579, dated Feb. 9, 2017.
(Continued)

*Primary Examiner* — Evelyn A Lester
(74) *Attorney, Agent, or Firm* — Shapiro, Gabor and Rosenberger, PLLC

(57) ABSTRACT

A variable magnification optical system comprises, in order from an object side, a first lens group (G1) having positive refractive power, a second lens group (G2) having negative refractive power, and a third lens group (G3) having positive refractive power. The first lens group (G1) comprises a front group (G11) having negative refractive power and a rear group (G12) having positive refractive power. Focusing is carried out by moving the front group (G11). The first lens group (G1), the second lens group (G2) or at least a portion of the third lens group (G3) is moved in a direction having a directional component perpendicular to the optical axis as a vibration reduction lens group.

21 Claims, 46 Drawing Sheets

(51) Int. Cl.
- *G02B 15/20* (2006.01)
- *G02B 15/173* (2006.01)
- *G02B 15/177* (2006.01)
- *G02B 9/12* (2006.01)
- *G02B 13/18* (2006.01)
- *G02B 15/167* (2006.01)
- *G02B 5/00* (2006.01)
- *G02B 15/15* (2006.01)
- *G02B 13/00* (2006.01)
- *G02B 27/64* (2006.01)
- *G02B 15/16* (2006.01)

(52) U.S. Cl.
CPC .............. *G02B 15/20* (2013.01); *G02B 5/005* (2013.01); *G02B 9/12* (2013.01); *G02B 13/009* (2013.01); *G02B 13/18* (2013.01); *G02B 15/14* (2013.01); *G02B 15/15* (2013.01); *G02B 15/16* (2013.01); *G02B 15/167* (2013.01); *G02B 27/646* (2013.01)

(58) Field of Classification Search
CPC .......... G02B 5/005; G02B 9/12; G02B 15/15; G02B 15/16; G02B 15/167; H04N 5/225

USPC ................ 359/557, 689, 690, 716, 740, 785
See application file for complete search history.

(56) References Cited

U.S. PATENT DOCUMENTS

| | | |
|---|---|---|
| 5,920,435 A | 7/1999 | Shibayama |
| 6,307,685 B1 | 10/2001 | Mori et al. |
| 2003/0214705 A1 | 11/2003 | Ozaki |

FOREIGN PATENT DOCUMENTS

| | | |
|---|---|---|
| JP | 10-003036 A | 1/1998 |
| JP | 10-090599 A | 4/1998 |
| JP | 2005-275435 A | 10/2005 |

OTHER PUBLICATIONS

Extended European Search Report dated May 15, 2018, in European Patent Application No. EP15827779.8.

\* cited by examiner

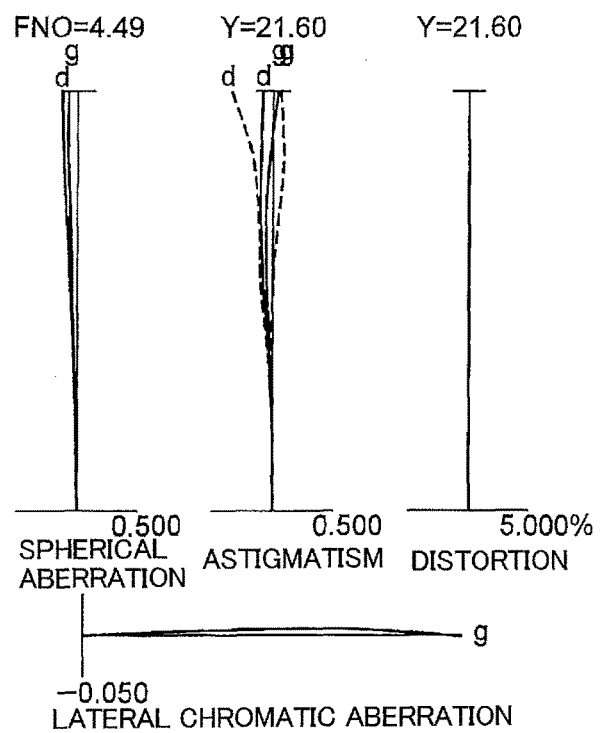
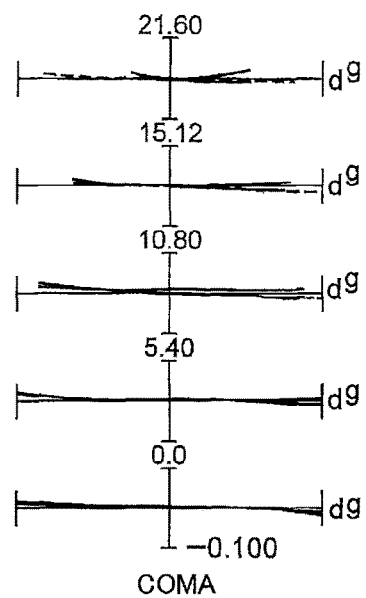
FIG.2A
FIG.2B
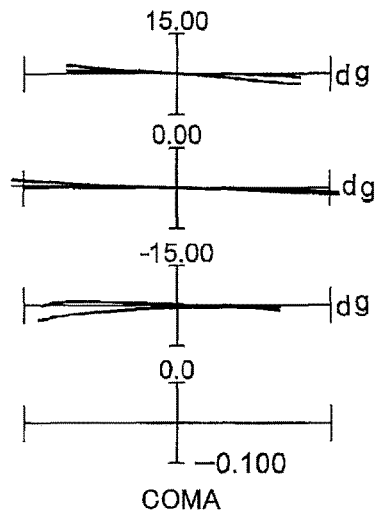

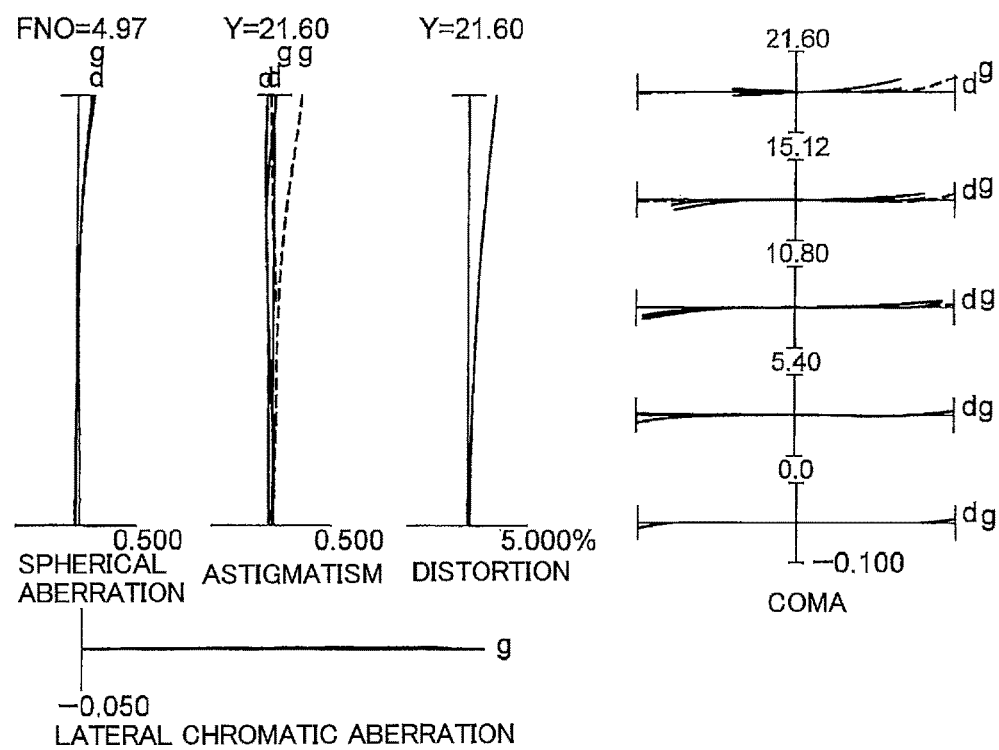

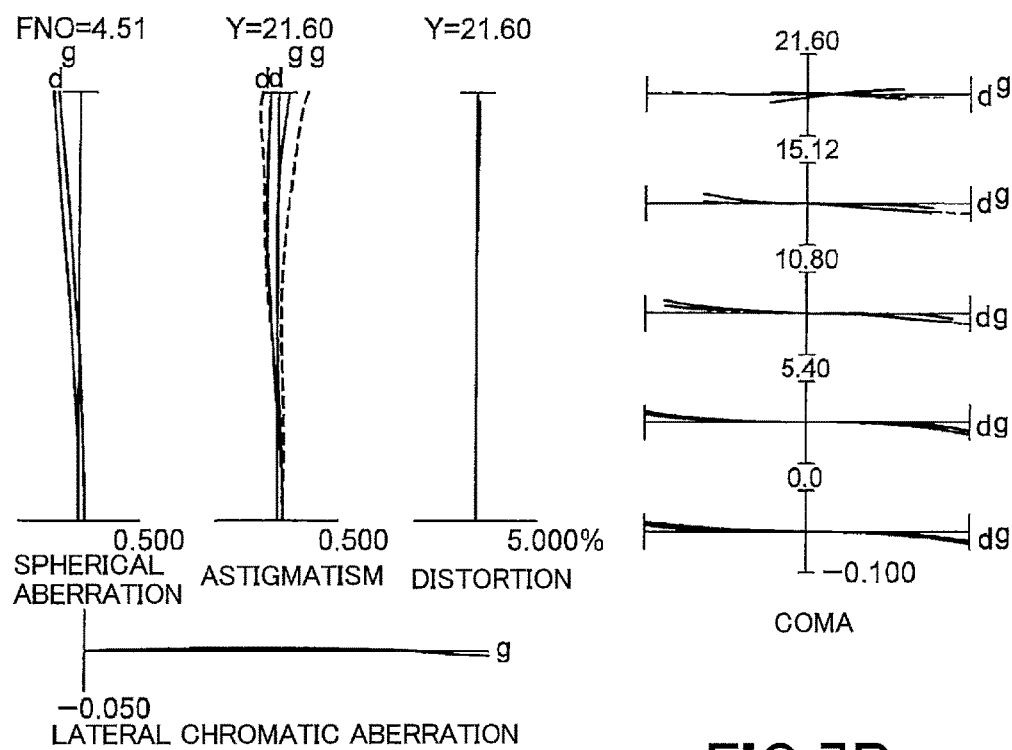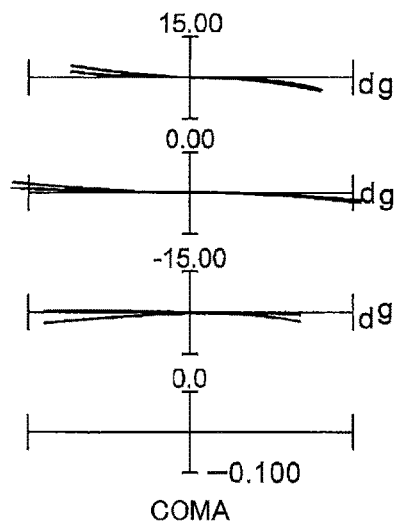

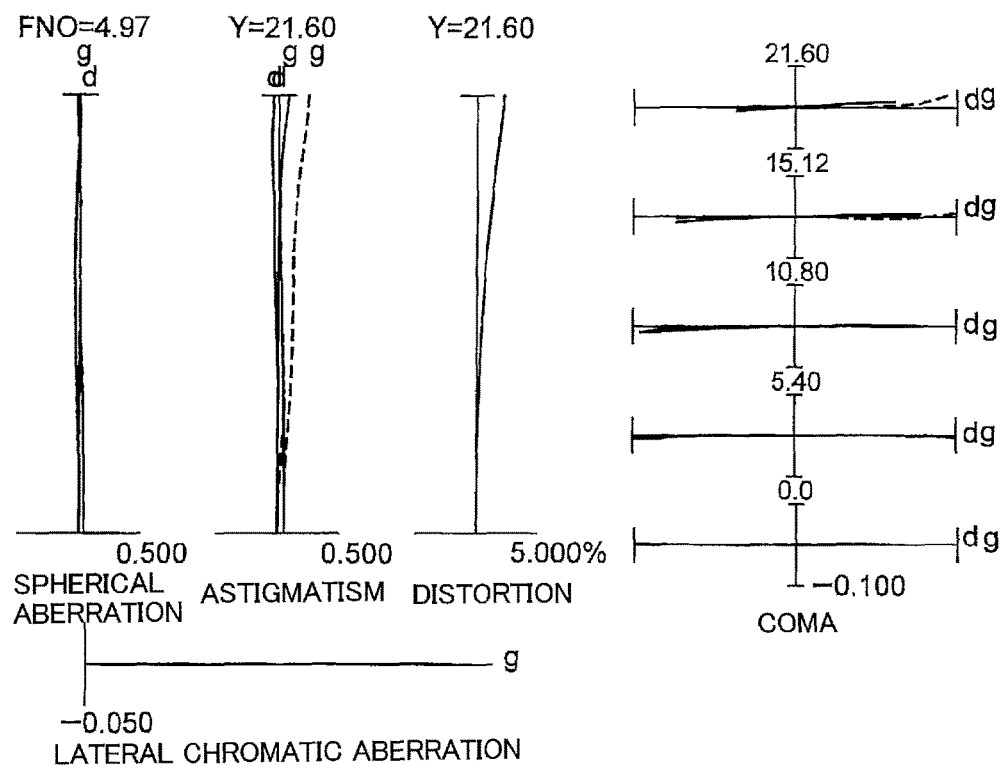

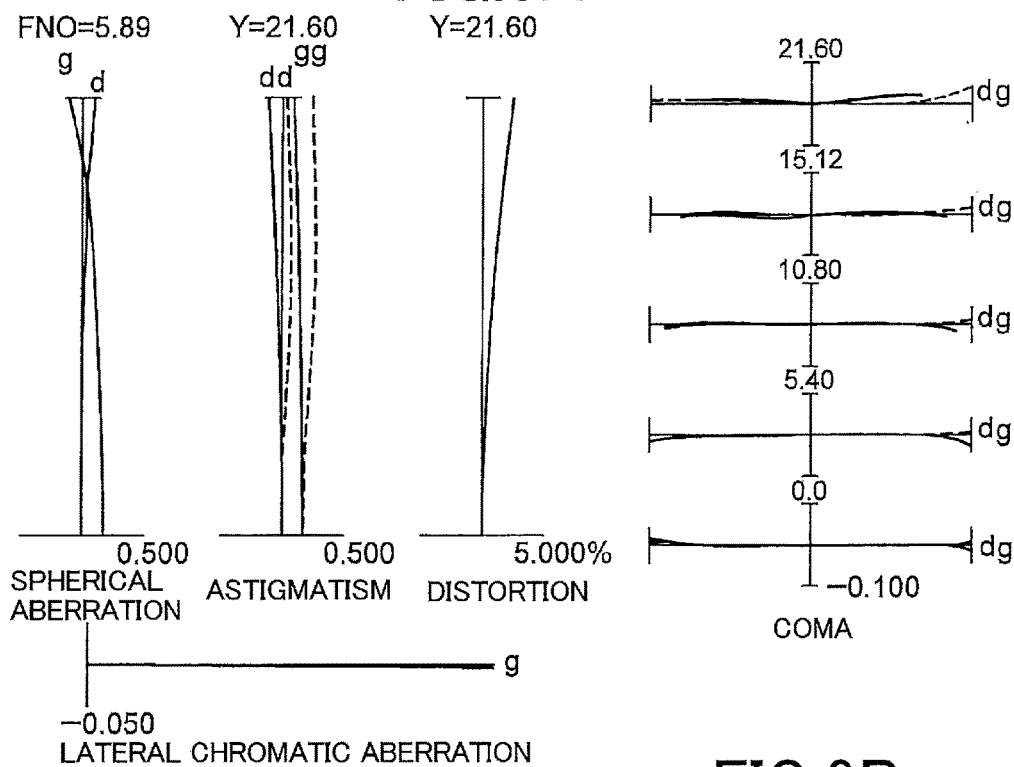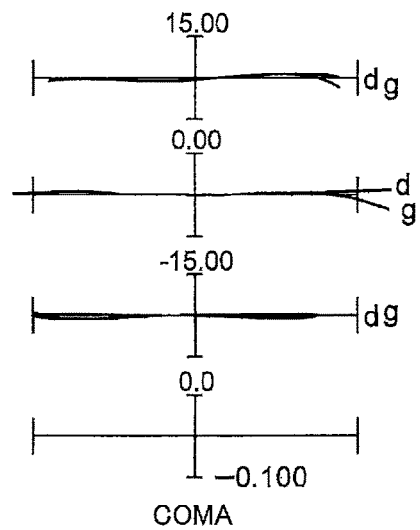

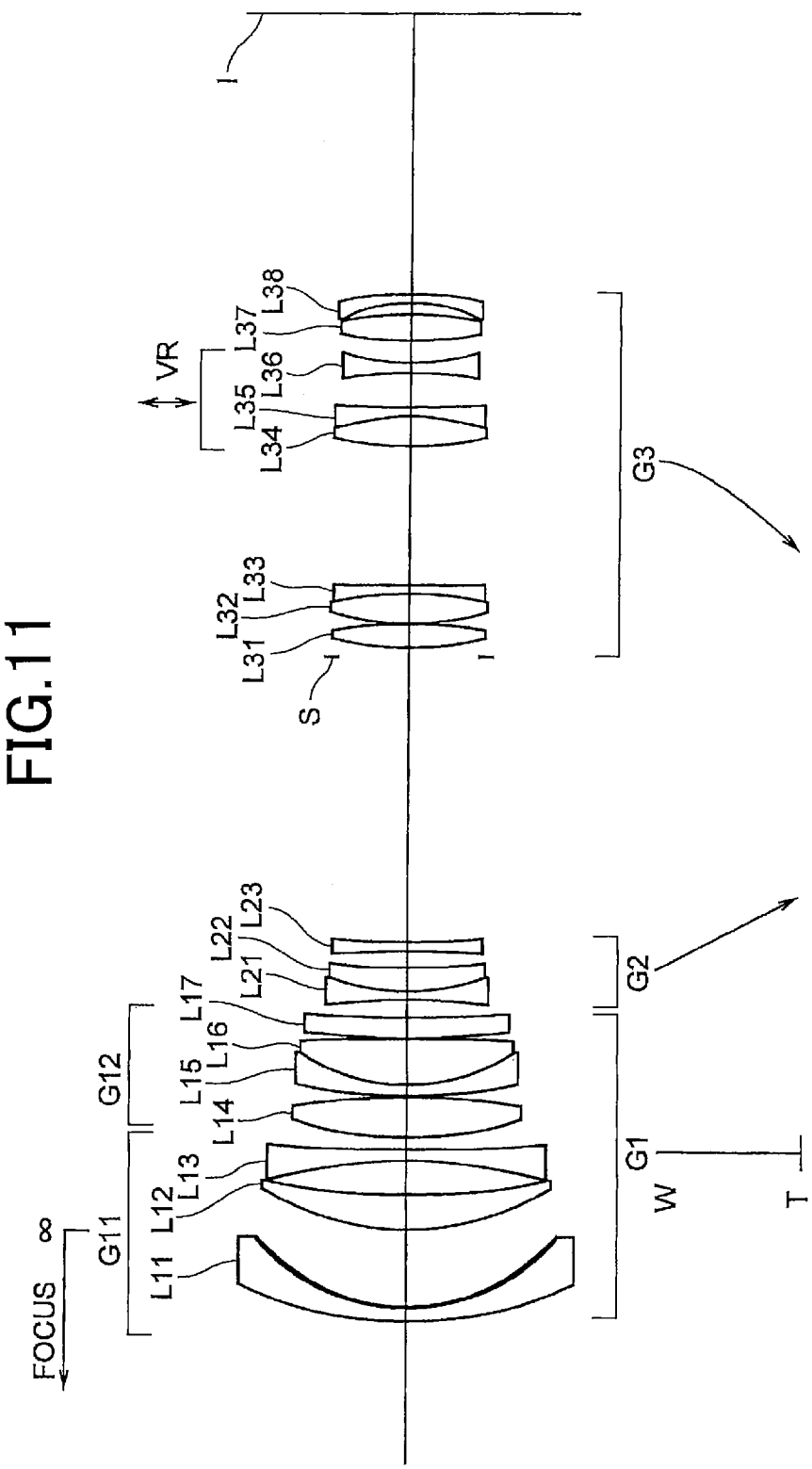

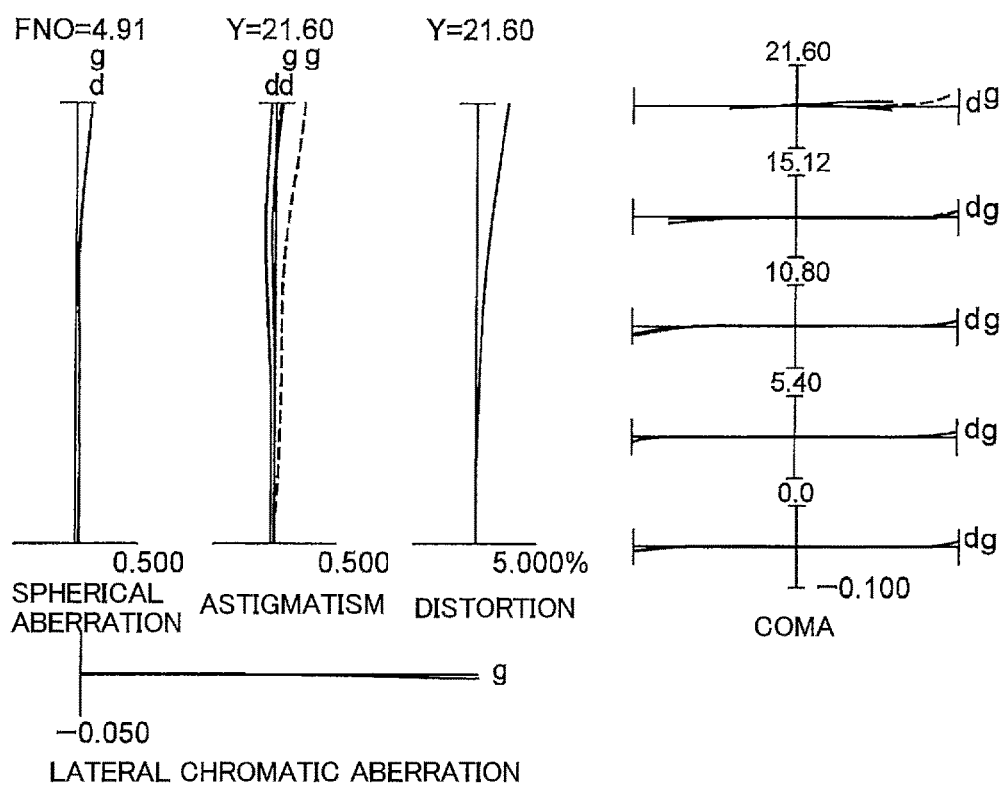

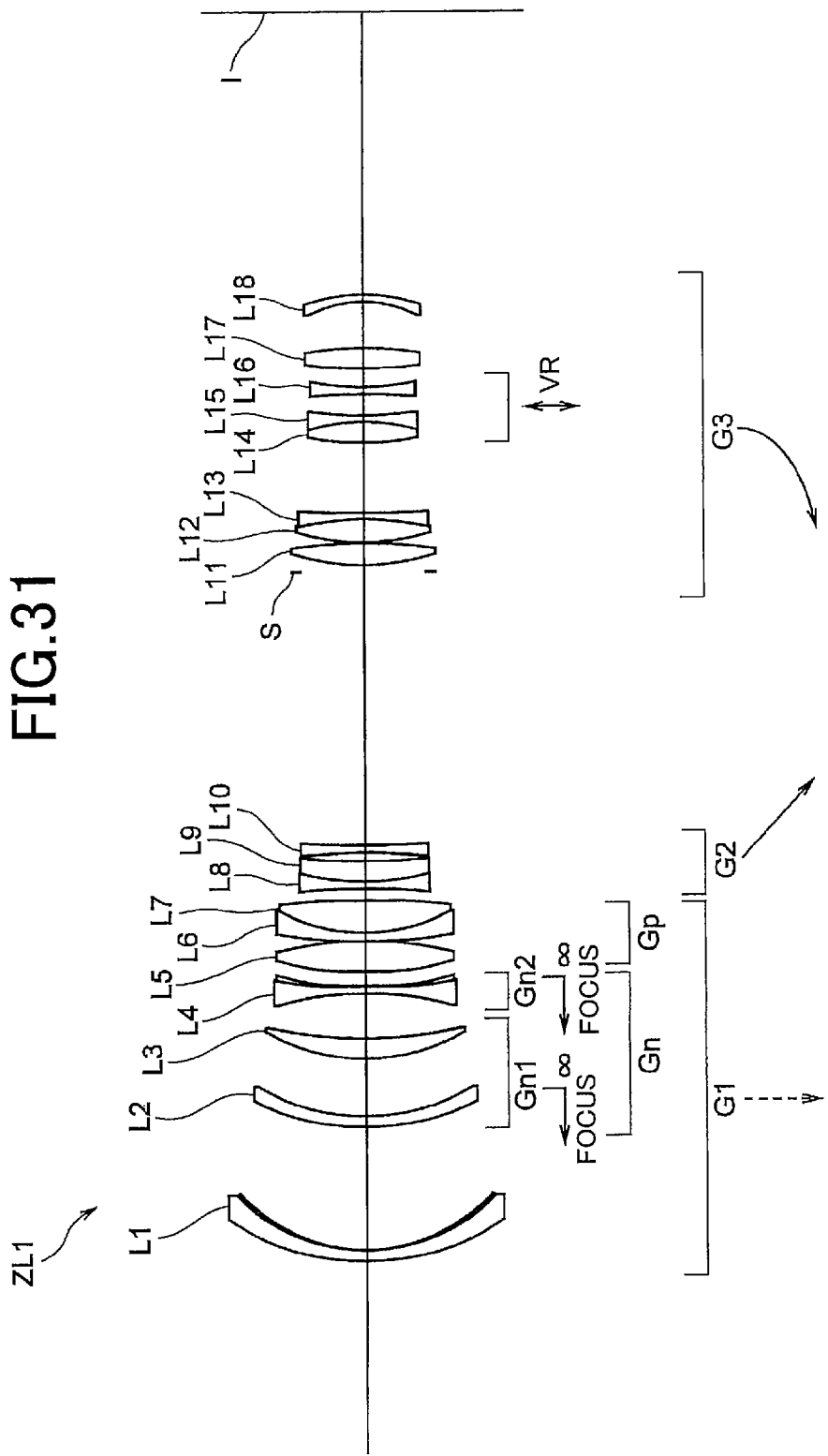

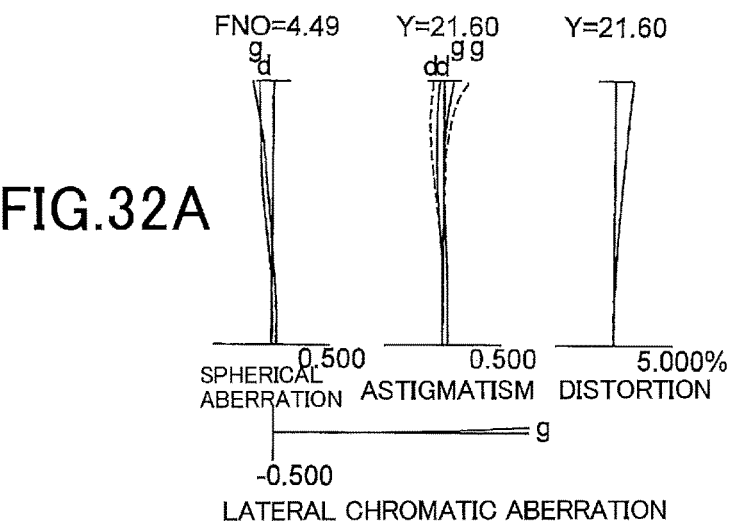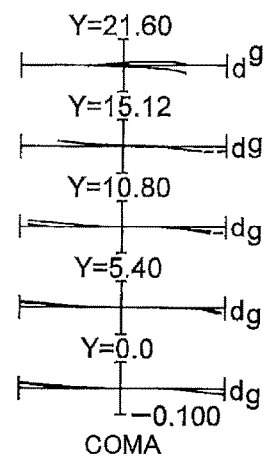
FIG.32A
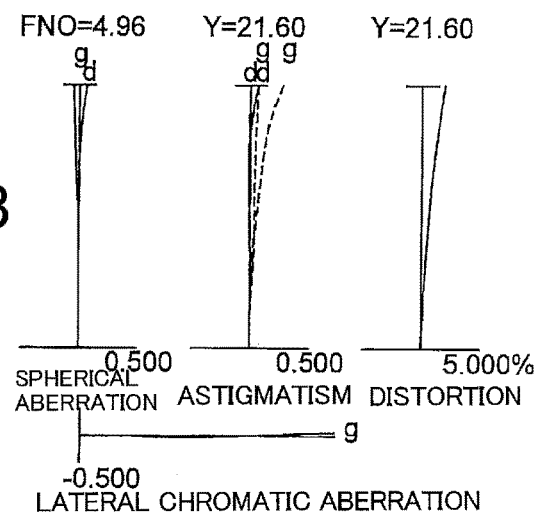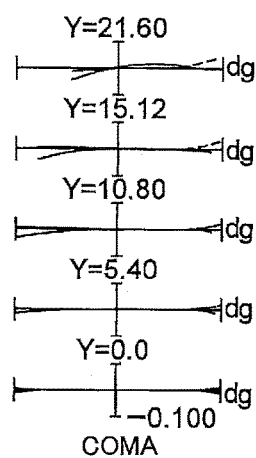
FIG.32B
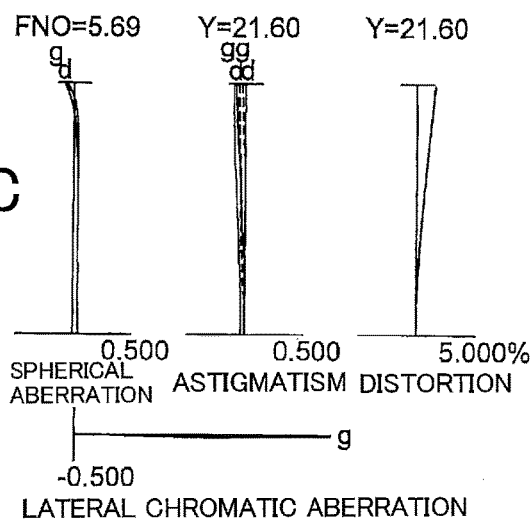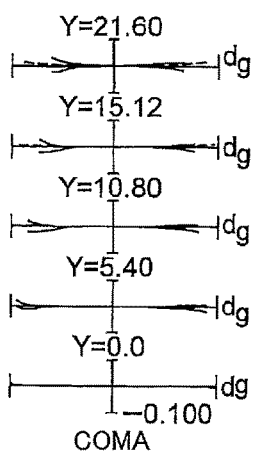
FIG.32C

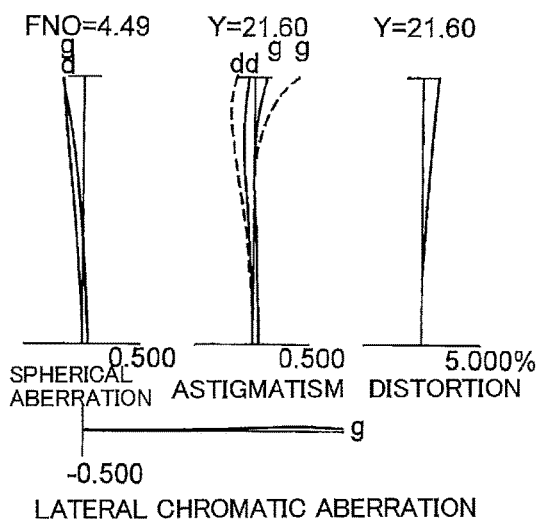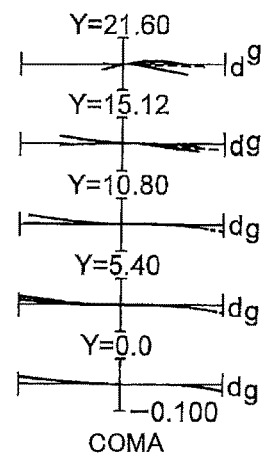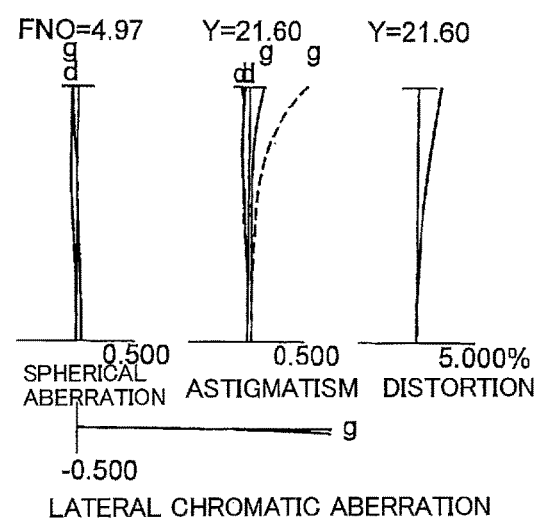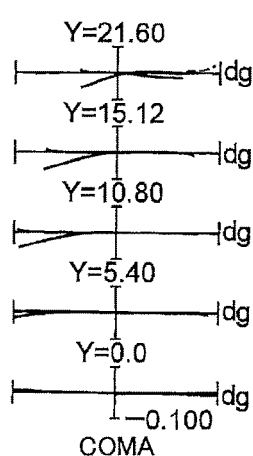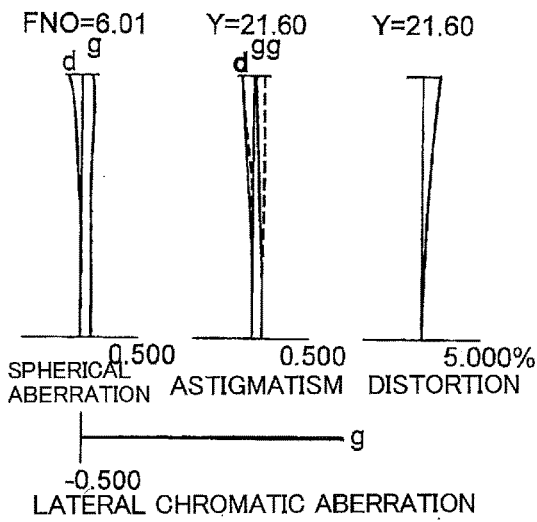

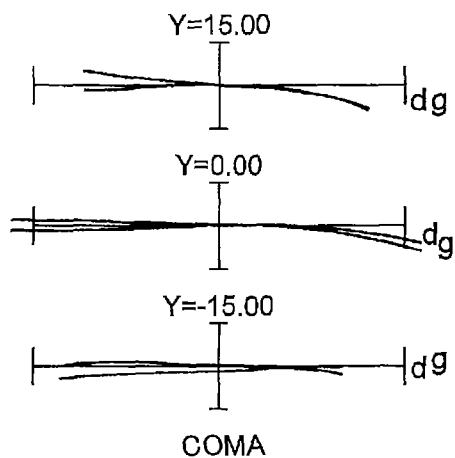
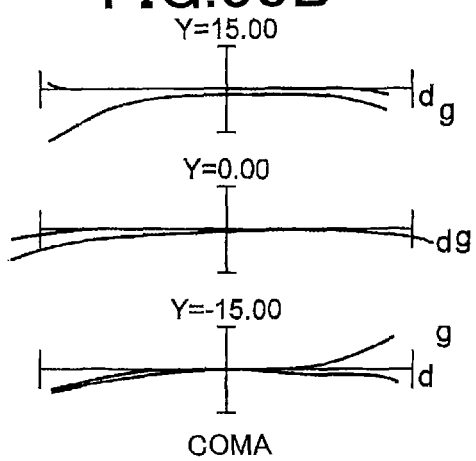

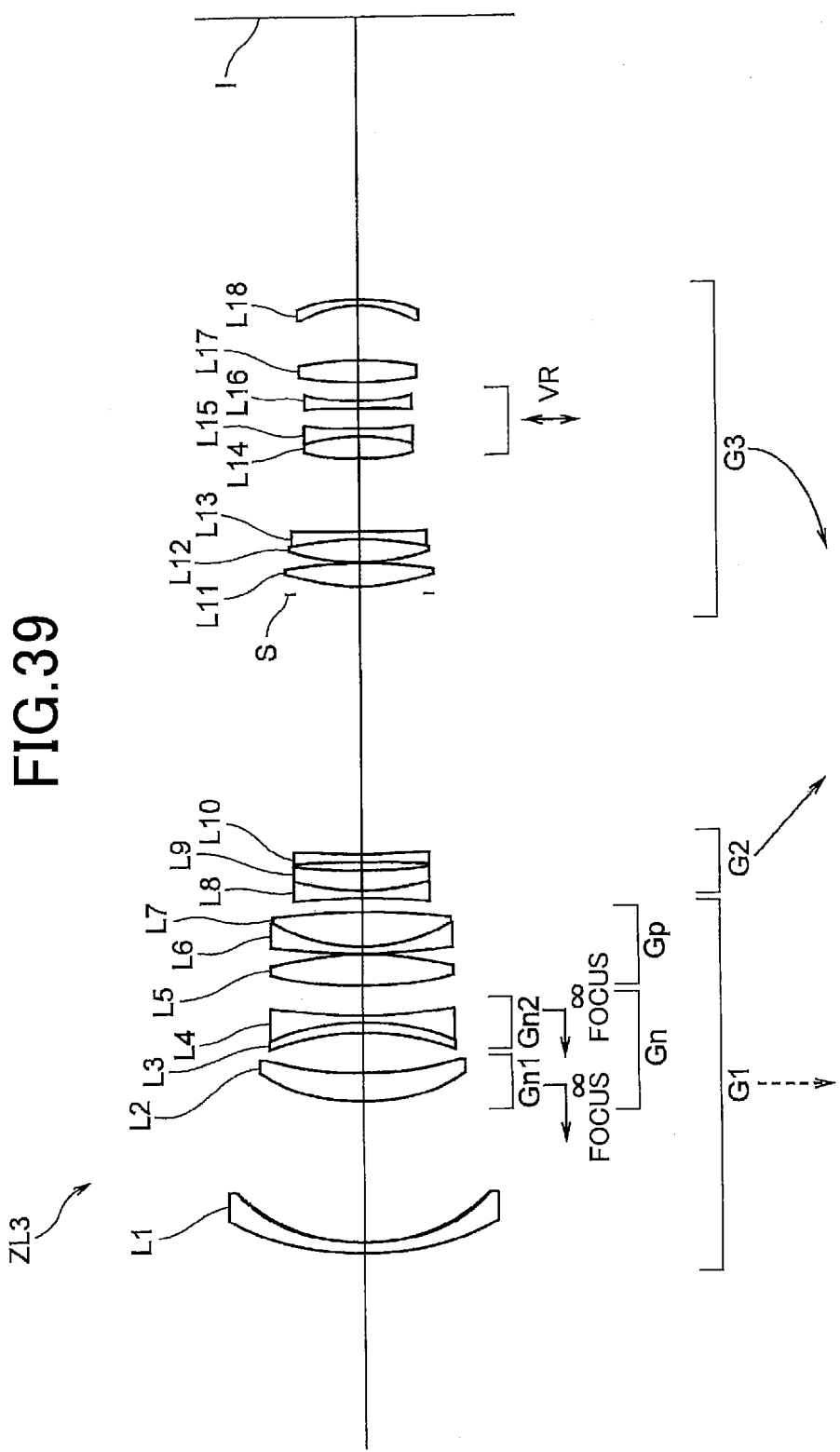

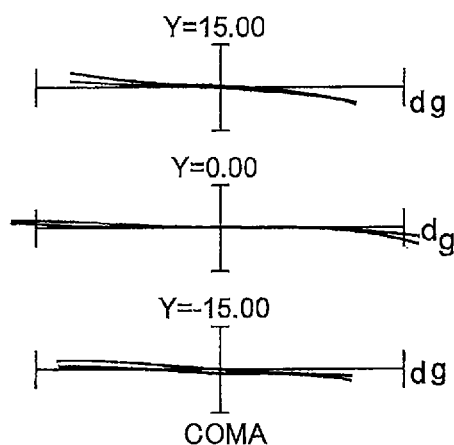
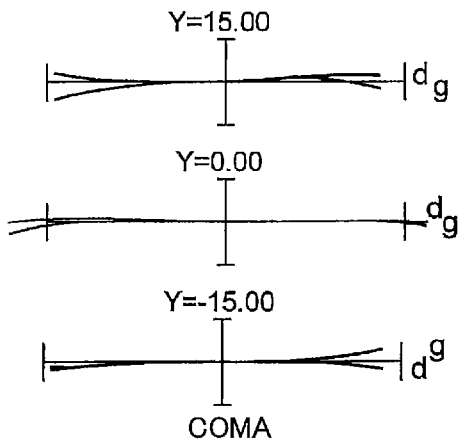

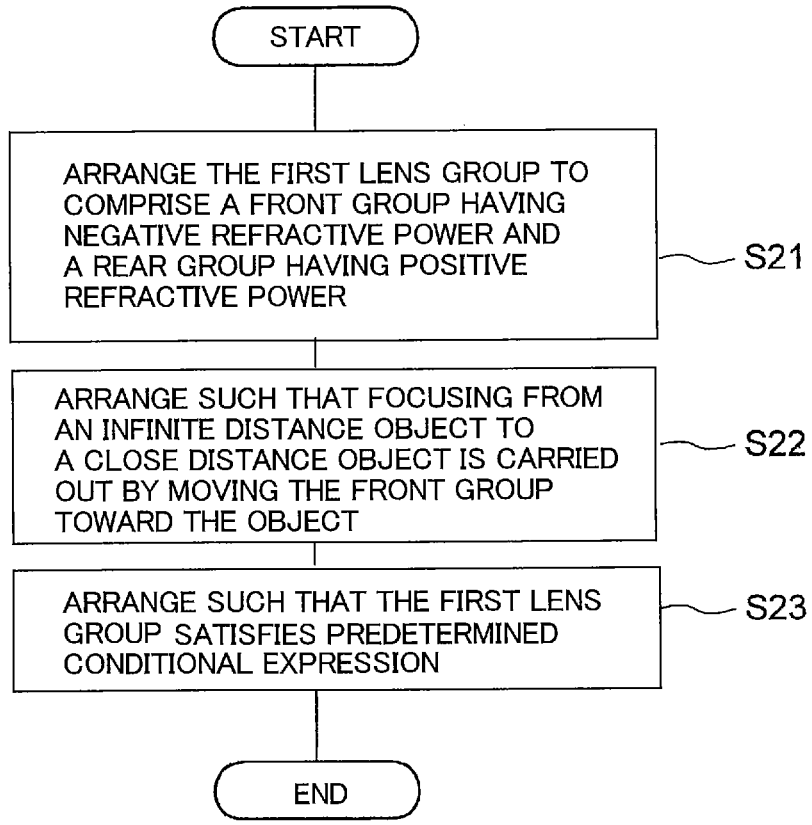

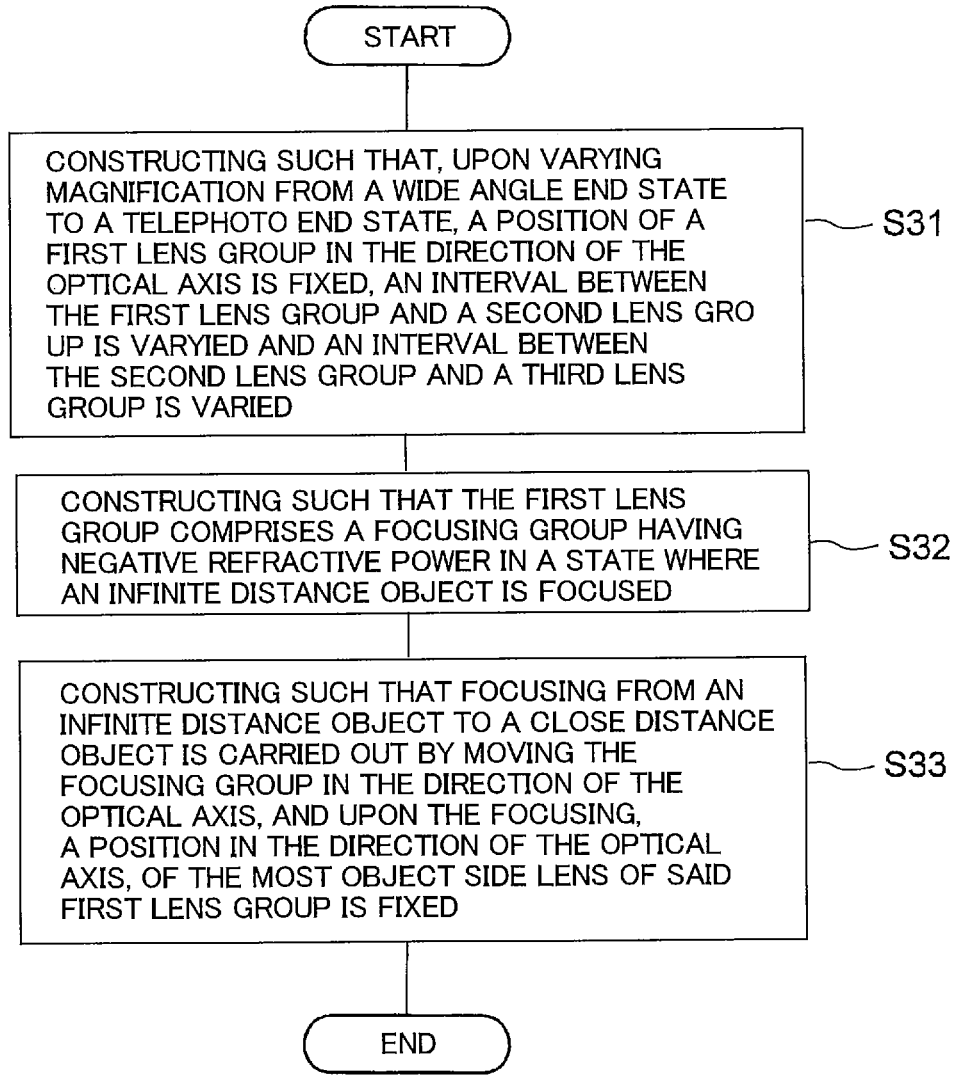

VARIABLE POWER OPTICAL SYSTEM, OPTICAL DEVICE, AND METHOD FOR PRODUCING VARIABLE POWER OPTICAL SYSTEM

TECHNICAL FIELD

The present invention relates to a variable magnification optical system, an optical apparatus and a method for manufacturing the variable magnification optical system.

BACKGROUND ART

There has been proposed a variable magnification optical system that is suitable to be used for a photographic camera, an electronic still camera, a video camera or the like. For example, there is a Patent Document 1 as below mentioned. However, there has been a problem that it is difficult for the conventional variable magnification optical system to attain sufficient optical performance.

PRIOR ART REFERENCE

Patent Document

Patent Document 1: Japanese Patent application Laid-Open Gazette No. H10-3036.

SUMMARY OF THE INVENTION

According to a first aspect of the present application, there is provided a variable magnification optical system comprising, in order from an object side, a first lens group having positive refractive power, a second lens group having negative refractive power, and a third lens group having positive refractive power;
said first lens group comprising a front group having negative refractive power and a rear group having positive refractive power;
focusing being carried out by moving said front group;
said first lens group, said second lens group or at least a portion of said third lens group being moved in a direction having a directional component perpendicular to the optical axis as a vibration reduction lens group.

According to a second aspect of the present application, there is provided a variable magnification optical system comprising, in order from an object side, a first lens group having positive refractive power, a second lens group having negative refractive power, and a third lens group having positive refractive power;
said first lens group comprising a front group having negative refractive power and a rear group having positive refractive power;
focusing being carried out by moving said front group; and
the following conditional expression being satisfied:

$$0.20 < df/D1 < 0.50$$

where df denotes the sum of thickness along the optical axis of each lens composing the front group, and D1 denotes the sum of thickness along the optical axis of each lens composing the first lens group.

According to a third aspect of the present application, there is provided a variable magnification optical system comprising, in order from an object side along the optical axis, a first lens group having positive refractive power, a second lens group having negative refractive power, and a third lens group having positive refractive power;
upon varying magnification, an interval between said first lens group and said second lens group being varied and an interval between said second lens group and said third lens group being varied;
said first lens group comprising at least one lens disposed on the most object side and a focusing group disposed on an image side than said lens;
said focusing group having negative refractive power in a state where an infinite distance object is focused; and
focusing being carried out by moving said focusing group in the direction of the optical axis.

According to a fourth aspect of the present application, there is provided an optical apparatus equipped with the variable magnification optical system according to any one of said first to said third aspects of the present application.

Further, according to a fifth aspect of the present application, there is provided a method for manufacturing a variable magnification optical system comprising, in order from an object side, a first lens group having positive refractive power, a second lens group having negative refractive power and a third lens group having positive refractive power;
the method comprising steps of:
arranging said first lens group to comprise a front group having negative refractive power and a rear group having positive refractive power;
arranging such that focusing is carried out by moving said front group;
arranging such that said first lens group, said second lens group or at least a portion of said third lens group is moved in a direction having a directional component perpendicular to the optical axis as a vibration reduction lens group.

Further, according to a sixth aspect of the present application, there is provided a method for manufacturing a variable magnification optical system comprising, in order from an object side, a first lens group having positive refractive power, a second lens group having negative refractive power and a third lens group having positive refractive power;
the method comprising steps of:
arranging said first lens group to comprise a front group having negative refractive power and a rear group having positive refractive power;
arranging such that focusing is carried out by moving said front group; and
arranging such that the following conditional expression is satisfied:

$$0.20 < df/D1 < 0.50$$

where df denotes the sum of thickness along the optical axis of each lens composing the front group, and D1 denotes the sum of thickness along the optical axis of each lens composing the first lens group.

Further, according to a seventh aspect of the present application, there is provided a method for manufacturing a variable magnification optical system comprising, in order from an object side, a first lens group having positive refractive power, a second lens group having negative refractive power and a third lens group having positive refractive power;
the method comprising steps of:
constructing such that, upon varying magnification from a wide angle end state to a telephoto end state, a position of said first lens group in the direction of the optical axis is fixed, an interval between said first lens group and said second lens group is varied and an interval between said second lens group and said third lens group is varied;

constructing such that said first lens group comprises a focusing group having negative refractive power in a state where an infinite distance object is focused; and constructing such that focusing from an infinite distance object to a close distance object is carried out by moving said focusing group in the direction of the optical axis, and upon the focusing, a position in the direction of the optical axis, of the most object side lens of said first lens group is fixed.

BRIEF DESCRIPTION OF THE DRAWINGS

FIGS. 2A and 2B are graphs showing various aberrations in the wide angle end state of the variable magnification optical system according to the First Example of the present application, in which FIG. 2A shows various aberrations upon focusing on an infinite distance object, and FIG. 2B shows coma aberration when correction of image blur is conducted upon focusing on an infinite distance object.

FIG. 3 is graphs showing various aberrations in the intermediate focal length state of the variable magnification optical system according to the First Example.

FIGS. 4A and 4B are graphs showing various aberrations in the telephoto end state of the variable magnification optical system according to the First Example of the present application, in which FIG. 4A shows various aberrations upon focusing on an infinite distance object, and FIG. 4B shows coma aberration when correction of image blur is conducted upon focusing on an infinite distance object.

FIGS. 5A and 5B are graphs showing various aberrations of the variable magnification optical system according to the First Example of the present application upon focusing on a close distance object, in which FIG. 5A shows various aberrations in the wide angle end state, and FIG. 5B shows various aberrations in the telephoto end state.

FIGS. 7A and 7B are graphs showing various aberrations in the wide angle end state of the variable magnification optical system according to the Second Example of the present application, in which FIG. 7A shows various aberrations upon focusing on an infinite distance object, and FIG. 7B shows coma aberration when correction of image blur is conducted upon focusing on an infinite distance object.

FIG. 8 is graphs showing various aberrations in the intermediate focal length state of the variable magnification optical system according to the Second Example.

FIGS. 9A and 9B are graphs showing various aberrations in the telephoto end state of the variable magnification optical system according to the Second Example, in which FIG. 9A shows various aberrations upon focusing on an infinite distance object, and FIG. 9B shows coma aberration when correction of image blur is conducted upon focusing on an infinite distance object.

FIGS. 10A and 10B are graphs showing various aberrations of the variable magnification optical system according to the Second Example of the present application upon focusing on a close distance object, in which FIG. 10A shows various aberrations in the wide angle end state, and FIG. 10B shows various aberrations in the telephoto end state.

FIG. 11 is a sectional view showing a lens configuration of a variable magnification optical system according to a Third Example that is common to the first and the second embodiments of the present application.

FIGS. 12A and 12B are graphs showing various aberrations in the wide angle end state of the variable magnification optical system according to the Third Example of the present application, in which FIG. 12A shows various aberrations upon focusing on an infinite distance object, and FIG. 12B shows coma aberration when correction of image blur is conducted upon focusing on an infinite distance object.

FIG. 13 is graphs showing various aberrations in the intermediate focal length state of the variable magnification optical system according to the Third Example.

FIGS. 14A and 14B are graphs showing various aberrations in the telephoto end state of the variable magnification optical system according to the Third Example of the present application, in which FIG. 14A shows various aberrations upon focusing on an infinite distance object, and FIG. 14B shows coma aberration when correction of image blur is conducted upon focusing on an infinite distance object.

FIGS. 15A and 15B are graphs showing various aberrations of the variable magnification optical system according to the Third Example of the present application upon focusing on a close distance object, in which FIG. 15A shows various aberrations in the wide angle end state, and FIG. 15B shows various aberrations in the telephoto end state.

FIGS. 17A and 17B are graphs showing various aberrations in the wide angle end state of the variable magnification optical system according to the Fourth Example, in which FIG. 17A shows various aberrations upon focusing on an infinite distance object, and FIG. 17B shows coma aberration when correction of image blur is conducted upon focusing on an infinite distance object.

FIGS. 19A and 19B are graphs showing various aberrations in the telephoto end state of the variable magnification optical system according to the Fourth Example, in which FIG. 19A shows various aberrations upon focusing on an infinite distance object, and FIG. 19B shows coma aberration when correction of image blur is conducted upon focusing on an infinite distance object.

FIGS. 20A and 20B are graphs showing various aberrations of the variable magnification optical system according to the Fourth Example upon focusing on a close distance object, in which FIG. 20A shows various aberrations in the wide angle end state, and FIG. 20B shows various aberrations in the telephoto end state.

FIGS. 22A and 22B are graphs showing various aberrations in the wide angle end state of the variable magnification optical system according to the Fifth Example of the present application, in which FIG. 22A shows various aberrations upon focusing on an infinite distance object, and FIG. 22B shows coma aberration when correction of image blur is conducted upon focusing on an infinite distance object.

FIGS. 24A and 24B are graphs showing various aberrations in the telephoto end state of the variable magnification optical system according to the Fifth Example of the present application, in which FIG. 24A shows various aberrations upon focusing on an infinite distance object, and FIG. 4B shows coma aberration when correction of image blur is conducted upon focusing on an infinite distance object.

FIGS. 25A and 25B are graphs showing various aberrations of the variable magnification optical system according to the Fifth Example of the present application upon focusing on a close distance object, in which FIG. 25A shows various aberrations in the wide angle end state, and FIG. 25B shows various aberrations in the telephoto end state.

FIGS. 27A and 27B are graphs showing various aberrations in the wide angle end state of the variable magnification optical system according to the Sixth Example of the present application, in which FIG. 27A shows various aberrations upon focusing on an infinite distance object, and FIG. 27B shows coma aberration when correction of image blur is conducted upon focusing on an infinite distance object.

FIGS. 29A and 29B are graphs showing various aberrations in the telephoto end state of the variable magnification optical system according to the Sixth Example of the present application, in which FIG. 29A shows various aberrations upon focusing on an infinite distance object, and FIG. 29B shows coma aberration when correction of image blur is conducted upon focusing on an infinite distance object.

FIGS. 30A and 30B are graphs showing various aberrations of the variable magnification optical system according to the Sixth Example of the present application upon focusing on a close distance object, in which FIG. 30A shows various aberrations in the wide angle end state, and FIG. 30B shows various aberrations in the telephoto end state.

FIG. 31 is a sectional view showing a lens configuration of a variable magnification optical system according to a Seventh Example that is related to a third embodiment of the present application.

FIGS. 32A, 32B and 32C are graphs showing various aberrations of the variable magnification optical system according to the Seventh Example upon focusing on an infinite distance object, in which FIG. 32A shows the wide angle end state, FIG. 32B shows the intermediate focal length state, and FIG. 32C shows the telephoto end state.

FIGS. 33A and 33B are graphs showing various aberrations of the variable magnification optical system according to the Seventh Example upon focusing on a close distance object, in which FIG. 33A shows the wide angle end state and FIG. 33B shows the telephoto end state.

FIGS. 34A and 34B are graphs showing meridional transverse aberration of the variable magnification optical system according to the Seventh Example when correction of image blur is conducted upon focusing on an infinite distance object, in which FIG. 34A shows the wide angle end state and FIG. 34B shows the telephoto end state.

FIGS. 36A, 36B and 36C are graphs showing various aberrations of the variable magnification optical system according to the Eighth Example upon focusing on an infinite distance object, in which FIG. 36A shows the wide angle end state, FIG. 36B shows the intermediate focal length state, and FIG. 36C shows the telephoto end state.

FIGS. 37A and 37B are graphs showing various aberrations of the variable magnification optical system according to the Eighth Example upon focusing on a close distance object, in which FIG. 37A shows the wide angle end state and FIG. 37B shows the telephoto end state.

FIGS. 38A and 38B are graphs showing meridional transverse aberration of the variable magnification optical system according to the Eighth Example when correction of image blur is conducted upon focusing on an infinite distance object, in which FIG. 38A shows the wide angle end state and FIG. 38B shows the telephoto end state.

FIG. 39 is a sectional view showing a lens configuration of a variable magnification optical system according to a Ninth Example that is related to the third embodiment of the present application.

FIGS. 40A, 40B and 40C are graphs showing various aberrations of the variable magnification optical system according to the Ninth Example upon focusing on an infinite distance object, in which FIG. 40A shows the wide angle end state, FIG. 40B shows the intermediate focal length state, and FIG. 40C shows the telephoto end state.

FIGS. 41A and 41B are graphs showing various aberrations of the variable magnification optical system according to the Ninth Example upon focusing on a close distance object, in which FIG. 41A shows the wide angle end state and FIG. 41B shows the telephoto end state.

FIGS. 42A and 42B are graphs showing meridional transverse aberration of the variable magnification optical system according to the Ninth Example when correction of image blur is conducted upon focusing on an infinite distance object, in which FIG. 42A shows the wide angle end state and FIG. 42B shows the telephoto end state.

FIG. 45 is a flowchart schematically showing a method for manufacturing the variable magnification optical system according to the second embodiment of the present application.

FIG. 46 is a schematic view showing a method for manufacturing the variable magnification optical system according to the third embodiment of the present application.

EMBODIMENTS FOR CARRYING OUT THE INVENTION

Figure 1:
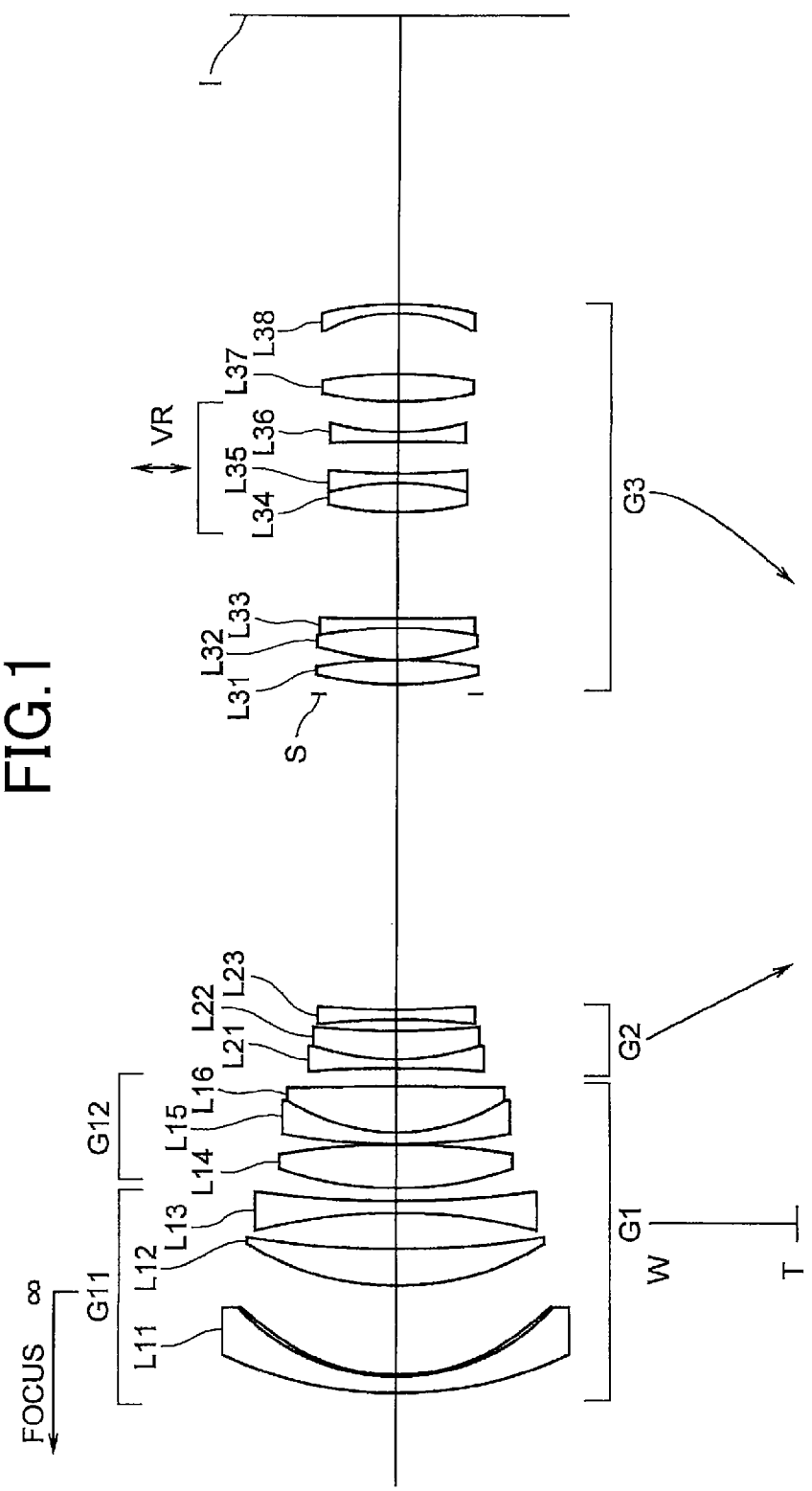
FIG. 1 is a sectional view showing a lens configuration of a variable magnification optical system according to a First Example that is common to a first and a second embodiments of the present application.

Next, a variable magnification optical system according to the first to the third embodiments of the present application, an optical apparatus and a method for producing the variable magnification optical system, will be explained with reference to the accompanying drawings. Meanwhile, the embodiments explained below are for easily understanding the invention and are not intended to exclude any addition, replacement or the like which can be applicable by those skillful in the art within the scope from which the technical idea of the invention of the present application is not departed.

First Embodiment

The variable magnification optical system according to the first embodiment of the present application, comprises, in order from an object side, a first lens group having positive refractive power, a second lens group having negative refractive power, and a third lens group having positive refractive power. The first lens group comprises a front group having negative refractive power and a rear group having positive refractive power and is not moved for varying magnification. Focusing from an infinite distance object to a close distance object is carried out by moving said front group toward the object. Said first lens group, said second lens group or at least a portion of said third lens group is moved in a direction having a directional component perpendicular to the optical axis as a vibration reduction lens group.

With such configuration, it is possible to attain a variable magnification optical system having optical performance capable of dealing with problems caused by displacement of an imaging position due to a camera shake or the like. In other words, the variable magnification optical system according to the first embodiment can correct superbly aberrations over the entire object distance from an infinite distance to the closest distance and upon correcting displacement of an imaging position caused by a camera shake or the like. Meanwhile, in the first and second aspects of the present application, a position of the first lens group relative to the image plane may be fixed upon varying magnification, as in the first embodiment of the present application.

In the variable magnification optical system according to the first embodiment of the present application, it is preferable that the following conditional expression (1-1) is satisfied:

$$0.80 < f1/(-f11) < 1.60 \quad (1\text{-}1)$$

where f1 denotes a focal length of the first lens group, and f11 denotes a focal length of the front group.

The conditional expression (1-1) defines a proper focal length of the first lens group relative to the focal length of the front group as a focusing group.

When the value of f1/(−f11) is equal to or exceeds the upper limit of the conditional expression (1-1), refractive power of the front group becomes large, and it becomes difficult to correct curvature of field upon focusing. Meanwhile, in order to ensure the advantageous effect of the present embodiment more surely, it is preferable to set the upper limit value of the conditional expression (1-1) to 1.50.

When the value of f1/(−f11) is equal to or falls below the lower limit of the conditional expression (1-1), refractive power of the first lens group becomes large, and it becomes difficult to correct spherical aberration upon focusing. Meanwhile, in order to ensure the advantageous effect of the present embodiment more surely, it is preferable to set the lower limit value of the conditional expression (1-1) to 0.90.

Further, in the variable magnification optical system according to the first embodiment of the present application, it is preferable that the following conditional expression (1-2) is satisfied:

$$0.80 < f1/(-f1F) < 1.50 \quad (1\text{-}2)$$

where f1F denotes a focal length of the most object side lens in the front group.

The conditional expression (1-2) defines a proper focal length of the first lens group relative to the focal length of the most object side lens in the first lens group.

When the value of f1/(−f1F) is equal to or exceeds the upper limit of the conditional expression (1-2), refractive power of the most object side lens in the first lens group becomes large, and it becomes difficult to correct curvature of field upon focusing. Meanwhile, in order to ensure the advantageous effect of the present embodiment more surely, it is preferable to set the upper limit value of the conditional expression (1-2) to 1.40.

On the other hand, when the value of f1/(−f1F) is equal to or falls below the lower limit of the conditional expression (1-2), refractive power of the first lens group becomes large, and it becomes difficult to correct spherical aberration upon focusing. Meanwhile, in order to ensure the advantageous effect of the present embodiment more surely, it is preferable to set the lower limit value of the conditional expression (1-2) to 0.90.

In the variable magnification optical system according to the first embodiment, it is preferable that the following conditional expression (1-3) is satisfied:

$$0.85 < (-f2)/f3 < 1.20 \quad (1\text{-}3)$$

where f2 denotes a focal length of the second lens group, and f3 denotes a focal length of the third lens group.

The conditional expression (1-3) defines a proper focal length of the third lens group relative to the focal length of the second lens group.

When the value of (−f2)/f3 is equal to or exceeds the upper limit of the conditional expression (1-3), refractive power of the third lens group becomes large, and it becomes difficult to correct spherical aberration, curvature of field and coma aberration upon varying magnification. Meanwhile, in order to ensure the advantageous effect of the present embodiment more surely, it is preferable to set the upper limit value of the conditional expression (1-3) to 1.10.

On the other hand, when the value of (−f2)/f3 is equal to or falls below the lower limit of the conditional expression (1-3), refractive power of the second lens group becomes large, and it becomes difficult to correct spherical aberration, curvature of field and coma aberration upon varying magnification. Meanwhile, in order to ensure the advantageous effect of the present embodiment more surely, it is preferable to set the lower limit value of the conditional expression (1-3) to 0.90.

Further, in the variable magnification optical system according to the first embodiment, it is preferable that each of said first, said second and said third lens groups has at least one cemented lens. With such configuration, it is possible to correct superbly variation in lateral chromatic aberration upon varying magnification.

Further, in the variable magnification optical system according to the first embodiment, it is preferable that said first lens group has at least one aspherical surface. With such configuration, it is possible to correct superbly variations in spherical aberration and curvature of field upon focusing. Meanwhile, it is more preferable that, in the first lens group, each of the front group and the rear group has an aspherical surface as in examples cited later.

Further, in the variable magnification optical system according to the first embodiment, it is preferable that, upon varying magnification from the wide angle end state to the telephoto end state, an interval between the first lens group and the second lens group increases and an interval between the second lens group and the third lens group decreases. With such configuration, it is possible to downsize the variable magnification optical system and attain the variable magnification optical system having high magnification.

Further, the optical apparatus of the first embodiment is equipped with the variable magnification optical system having the above described configuration, so it is possible to realize an optical apparatus that can solve the problem of displacement of an imaging position caused by a camera shake or the like.

Further, a method for manufacturing a variable magnification optical system according to the first embodiment, is a method for manufacturing a variable magnification optical system which comprises, in order from an object side, a first lens group having positive refractive power, a second lens group having negative refractive power and a third lens group having positive refractive power, the method comprising steps of:

constructing the first lens group to comprise a front group having negative refractive power and a rear group having positive refractive power and be fixed for varying magnification;

constructing such that focusing from an infinite distance object to a close distance object is carried out by moving said front group toward the object and constructing such that said first lens group, said second lens group or at least a portion of said third lens group is moved as a vibration reduction lens in a direction having a directional component perpendicular to the optical axis.

According to such method, it is possible to manufacture a variable magnification optical system that can solve the problem of displacement of an imaging position caused by a camera shake or the like.

Second Embodiment

The variable magnification optical system according to the second embodiment of the present application, comprises, in order from an object side, a first lens group having positive refractive power, a second lens group having negative refractive power, and a third lens group having positive refractive power. The first lens group comprises a front group having negative refractive power and a rear group having positive refractive power and is not moved for varying magnification. Focusing from an infinite distance object to a close distance object is carried out by moving said front group toward the object.

The variable magnification optical system according to the second embodiment of the present application is so constructed as to satisfy that the following conditional expression (2-1) is satisfied:

$$0.20 < df/D1 < 0.50 \qquad (2\text{-}1)$$

where df denotes the sum of thickness along the optical axis of each lens composing the front group, and D1 denotes the sum of thickness along the optical axis of each lens composing the first lens group.

The conditional expression (2-1) defines the proper sum of thickness along the optical axis of each lens composing the first lens group relative to the sum of thickness along the optical axis of each lens composing the front group as a focusing group.

When the value of df/D1 is equal to or exceeds the upper limit of the conditional expression (2-1), the sum of lens thickness of the front group as a focusing group becomes large, the focusing group becomes large and heavy, the entire length increases and deterioration of focusing performance such as delay in a focusing speed is caused. Meanwhile, in order to ensure the advantageous effect of the present embodiment more surely, it is preferable to set the upper limit value of the conditional expression (2-1) to 0.45.

On the other hand, when the value of df/D1 is equal to or falls below the lower limit of the conditional expression (2-1), the sum of lens thickness of the first group becomes large, the entire length increases, the focusing group cannot retain its size appropriately and deterioration of focusing performance is caused. Meanwhile, in order to ensure the advantageous effect of the present embodiment more surely, it is preferable to set the lower limit value of the conditional expression (2-1) to 0.25.

With such configuration, it is possible to attain a small-sized variable magnification optical system having excellent optical performance. Meanwhile, in the first and second aspects of the present application, a position of the first lens group relative to the image plane may be fixed upon varying magnification, as in the second embodiment of the present application.

In the variable magnification optical system according to the second embodiment of the present application, it is preferable that the following conditional expression (2-2) is satisfied:

$$0.80 < f1/(-f11) < 1.60 \qquad (2\text{-}2)$$

where f1 denotes a focal length of the first lens group, and f11 denotes a focal length of the front group.

The conditional expression (2-2) defines a proper focal length of the first lens group relative to the focal length of the front group as a focusing group.

When the value of f1/(−f11) is equal to or exceeds the upper limit of the conditional expression (2-2), refractive power of the front group becomes large, and it becomes difficult to correct curvature of field upon focusing. Meanwhile, in order to ensure the advantageous effect of the present embodiment more surely, it is preferable to set the upper limit value of the conditional expression (2-2) to 1.50.

When the value of f1/(−f11) is equal to or falls below the lower limit of the conditional expression (2-2), refractive power of the first lens group becomes large, and it becomes difficult to correct spherical aberration upon focusing. Meanwhile, in order to ensure the advantageous effect of the present embodiment more surely, it is preferable to set the lower limit value of the conditional expression (2-2) to 0.90.

Further, in the variable magnification optical system according to the second embodiment of the present application, it is preferable that the following conditional expression (2-3) is satisfied:

$$0.80 < f1/(-f1F) < 1.50 \qquad (2\text{-}3)$$

where f1F denotes a focal length of the most object side lens in the front group.

The conditional expression (2-3) defines a proper focal length of the first lens group relative to the focal length of the most object side lens in the first lens group.

When the value of f1/(−f1F) is equal to or exceeds the upper limit of the conditional expression (2-3), refractive power of the most object side lens in the first lens group becomes large, and it becomes difficult to correct curvature of field upon focusing. Meanwhile, in order to ensure the advantageous effect of the present embodiment more surely, it is preferable to set the upper limit value of the conditional expression (2-3) to 1.40.

On the other hand, when the value of f1/(−f1F) is equal to or falls below the lower limit of the conditional expression (2-3), refractive power of the first lens group becomes large, and it becomes difficult to correct spherical aberration upon focusing. Meanwhile, in order to ensure the advantageous effect of the present embodiment more surely, it is preferable to set the lower limit value of the conditional expression (2-3) to 0.90.

In the variable magnification optical system according to the second embodiment, it is preferable that the following conditional expression (2-4) is satisfied:

$$0.85<(-f2)/f3<1.20 \tag{2-4}$$

where f2 denotes a focal length of the second lens group, and f3 denotes a focal length of the third lens group.

The conditional expression (2-4) defines a proper focal length of the third lens group relative to the focal length of the second lens group.

When the value of (−f2)/f3 is equal to or exceeds the upper limit of the conditional expression (2-4), refractive power of the third lens group becomes large, and it becomes difficult to correct spherical aberration, curvature of field and coma aberration upon varying magnification. Meanwhile, in order to ensure the advantageous effect of the present embodiment more surely, it is preferable to set the upper limit value of the conditional expression (2-4) to 1.10.

On the other hand, when the value of (−f2)/f3 is equal to or falls below the lower limit of the conditional expression (2-4), refractive power of the second lens group becomes large, and it becomes difficult to correct spherical aberration, curvature of field and coma aberration upon varying magnification. Meanwhile, in order to ensure the advantageous effect of the present embodiment more surely, it is preferable to set the lower limit value of the conditional expression (2-4) to 0.90.

Further, in the variable magnification optical system according to the second embodiment, it is preferable that at least a portion of said third lens group is moved as a vibration reduction lens in a direction having a directional component perpendicular to the optical axis. With such configuration, it is possible to correct superbly aberrations upon correcting displacement of an imaging position caused by a camera shake or the like.

Further, in the variable magnification optical system according to the second embodiment, it is preferable that each of said first, said second and said third lens groups has at least one cemented lens. With such configuration, it is possible to correct superbly variation in lateral chromatic aberration upon varying magnification.

Further, in the variable magnification optical system according to the second embodiment, it is preferable that said first lens group has at least one aspherical surface. With such configuration, it is possible to correct superbly spherical aberration and variation in curvature of field upon focusing. Meanwhile, it is more preferable that, in the first lens group, each of the front group and the rear group has an aspherical surface, as in examples described later.

Further, in the variable magnification optical system according to the second embodiment, it is preferable that, upon varying magnification from the wide angle end state to the telephoto end state, an interval between the first lens group and the second lens group increases and an interval between the second lens group and the third lens group decreases. With such configuration, it is possible to downsize the variable magnification optical system and attain the variable magnification optical system having high magnification.

Further, the optical apparatus of the second embodiment is equipped with the variable magnification optical system having the above described configuration, so it is possible to realize an optical apparatus that can solve the problem of displacement of an imaging position caused by a camera shake or the like.

Further, a method for manufacturing a variable magnification optical system according to the second embodiment, is a method for manufacturing a variable magnification optical system which comprises, in order from an object side, a first lens group having positive refractive power, a second lens group having negative refractive power and a third lens group having positive refractive power, the method comprising steps of:

constructing the first lens group to comprise a front group having negative refractive power and a rear group having positive refractive power and be fixed for varying magnification;

constructing such that focusing from an infinite distance object to a close distance object is carried out by moving said front group toward the object and constructing such that the following conditional expression (2-1) is satisfied:

$$0.20<df/D1<0.50 \tag{2-1}$$

where df denotes the sum of thickness along the optical axis of each lens composing the front group, and D1 denotes the sum of thickness along the optical axis of each lens composing the first lens group.

According to such method, it is possible to manufacture a small-sized variable magnification optical system having excellent optical performance.

Third Embodiment

The variable magnification optical system according to the third embodiment of the present application, comprises, in order from an object side along the optical axis, a first lens group having positive refractive power, a second lens group having negative refractive power, and a third lens group having positive refractive power. Upon varying magnification from the wide angle end state to the telephoto end state, a position of said first lens group in the direction of the optical axis is fixed, an interval between said first lens group and said second lens group is varied and an interval between said second lens group and said third lens group is varied.

With such configuration, the variable magnification optical system according to the third embodiment can attain variable magnification from the wide angle end state to the telephoto end state and correct superbly various aberrations associated with variable magnification, in particular, curvature of field and spherical aberration.

Under such configuration, in the variable magnification optical system relating to the third embodiment, said first lens group comprises a focusing group having negative refractive power in a state where an infinite distance object is focused, and focusing from an infinite distance object to a close distance object is carried out by moving said focusing group in the direction of the optical axis, and upon the focusing, a position in the direction of the optical axis, of the most object side lens of said first lens group is fixed.

With such configuration, in the variable magnification optical system relating to the third embodiment, it is possible to downsize the variable magnification optical system by suppressing the increase in the entire length thereof. Further, it is possible to correct superbly aberrations over the entire object distance from an infinite distance object to a close distance object. In particular, it is possible to correct superbly curvature of field. Meanwhile, in the third aspect of the present application, a position of said at least one lens disposed on the most object side relative to the image plane may be fixed upon focusing, as in the third embodiment of the present application. Further, in the third aspect of the present application, the first lens group may be fixed upon focusing, as in the third embodiment of the present application.

Further, in the variable magnification optical system relating to the third embodiment, it is preferable that said first lens group comprises a part lens group having positive refractive power on the image side of said focusing group.

With such configuration, it is possible to correct superbly curvature of field and spherical aberration upon focusing from an infinite distance object to a close distance object.

Further, in the variable magnification optical system relating to the third embodiment, it is preferable that said focusing group is move toward the object upon focusing from an infinite distance object to a close distance object.

With such configuration, it is possible to correct more superbly curvature of field and spherical aberration upon focusing from an infinite distance object to a close distance object.

Further, in the variable magnification optical system relating to the third embodiment of the present application, it is preferable that the following conditional expression (3-1) is satisfied:

$$0.7 < f1/(-f1n) < 1.2 \tag{3-1}$$

where f1 denotes a focal length of the first lens group, and f1n denotes a focal length of the focusing group in a state where an infinite distance object is focused.

The conditional expression (3-1) defines a proper range of the focal length of the first lens group relative to the focal length of the focusing group in a state where an infinite distance object is focused. By satisfying the conditional expression (3-1), it is possible to correct superbly curvature of field and spherical aberration upon focusing from an infinite distance object to a close distance object.

When the value of f1/(−f1n) is equal to or exceeds the upper limit of the conditional expression (3-1), refractive power of the focusing group in a state where an infinite distance object is focused, becomes large, and it becomes difficult to correct curvature of field upon focusing from an infinite distance object to a close distance object. This is unfavorable. Meanwhile, in order to ensure the advantageous effect of the third embodiment of the present application more surely, it is preferable to set the upper limit value of the conditional expression (3-1) to 1.1.

When the value of f1/(−f1n) is equal to or falls below the lower limit of the conditional expression (3-1), refractive power of the first lens group becomes large, and it becomes difficult to correct spherical aberration upon focusing from an infinite distance object to a close distance object. This is unfavorable. Meanwhile, in order to ensure the advantageous effect of the third embodiment of the present application more surely, it is preferable to set the lower limit value of the conditional expression (3-1) to 0.8.

Further, in the variable magnification optical system according to the third embodiment of the present application, it is preferable that the following conditional expression (3-2) is satisfied:

$$0.4 < |f1/f1F| < 0.8 \tag{3-2}$$

where f1 denotes a focal length of the first lens group and f1F denotes a focal length of the most object side lens in the first lens group.

The conditional expression (3-2) defines a proper range of the focal length of the first lens group relative to the focal length of the most object side lens in the first lens group. By satisfying the conditional expression (3-2), it is possible to correct superbly curvature of field and spherical aberration upon focusing from an infinite distance object to a close distance object.

When the value of |f1/f1F| is equal to or exceeds the upper limit of the conditional expression (3-2), refractive power of the most object side lens in the first lens group becomes large, and it becomes difficult to correct curvature of field upon focusing from an infinite distance object to a close distance object. This is unfavorable. Meanwhile, in order to ensure the advantageous effect of the third embodiment of the present application more surely, it is preferable to set the upper limit value of the conditional expression (3-2) to 0.7.

When the value of |f1/f1F| is equal to or falls below the lower limit of the conditional expression (3-2), refractive power of the first lens group becomes large, and it becomes difficult to correct spherical aberration upon focusing from an infinite distance object to a close distance object. This is unfavorable. Meanwhile, in order to ensure the advantageous effect of the third embodiment of the present application more surely, it is preferable to set the lower limit value of the conditional expression (3-2) to 0.5.

Further, in the variable magnification optical system relating to the third embodiment of the present application, it is preferable that the following conditional expression (3-3) is satisfied:

$$2.0 < (-f1n)/f1p < 3.0 \tag{3-3}$$

where f1n denotes a focal length of the focusing group in a state where an infinite distance object is focused, and f1p denotes a focal length of the part lens group.

The conditional expression (3-3) defines a proper range of the focal length of the focusing group in a state where an infinite distance object is focused, relative to the focal length of the part lens group disposed on the image side of the focusing group. By satisfying the conditional expression (3-3), it is possible to correct superbly curvature of field and spherical aberration upon focusing from an infinite distance object to a close distance object.

When the value of (−f1n)/f1p is equal to or exceeds the upper limit of the conditional expression (3-3), refractive power of the part lens group becomes large, and it becomes difficult to correct spherical aberration upon focusing from an infinite distance object to a close distance object. This is unfavorable. Meanwhile, in order to ensure the advantageous effect of the third embodiment of the present application more surely, it is preferable to set the upper limit value of the conditional expression (3-3) to 2.8.

When the value of (−f1n)/f1p is equal to or falls below the lower limit of the conditional expression (3-3), refractive power of the focusing group in a state where an infinite distance object is focused, becomes large, and it becomes difficult to correct curvature of field upon focusing from an infinite distance object to a close distance object. This is unfavorable. Meanwhile, in order to ensure the advantageous effect of the third embodiment of the present application more surely, it is preferable to set the lower limit value of the conditional expression (3-3) to 2.2.

Further, in the variable magnification optical system relating to the third embodiment of the present application, it is preferable that the following conditional expression (3-4) is satisfied:

$$1.7 < f1/f3 < 2.2 \tag{3-4}$$

where f1 denotes a focal length of the first lens group, and f3 denotes a focal length of the third lens group.

The conditional expression (3-4) defines a proper range of the first lens group relative to the focal length of the third lens group. By satisfying the conditional expression (3-4), it is possible to correct superbly various aberrations. In particular, it is possible to correct superbly spherical aberration, coma aberration and curvature of field upon varying magnification When the value of f1/f3 is equal to or exceeds the upper limit of the conditional expression (3-4), refractive power of the third lens group becomes large, and it becomes difficult to correct spherical aberration, coma aberration and curvature of field upon varying magnification. This is unfavorable. Meanwhile, in order to ensure the advantageous effect of the third embodiment of the present application more surely, it is preferable to set the upper limit value of the conditional expression (3-4) to 2.1.

When the value of f1/f3 is equal to or falls below the lower limit of the conditional expression (3-4), refractive power of the first lens group becomes large, and it becomes difficult to correct spherical aberration and curvature of field upon varying magnification. This is unfavorable. Meanwhile, in order to ensure the advantageous effect of the third embodiment of the present application more surely, it is preferable to set the lower limit value of the conditional expression (3-4) to 1.8.

Further, in the variable magnification optical system relating to the third embodiment of the present application, it is preferable that at least a portion of said third lens group is moved as a vibration reduction lens in a direction having a directional component perpendicular to the optical axis and thereby correction of the image plane upon occurrence of image blur is carried out.

With such configuration, it is possible to perform correction of displacement of an imaging position caused by a camera shake or the like, that is, vibration reduction, and correct superbly variation in various aberrations upon vibration reduction.

Further, in the variable magnification optical system relating to the third embodiment of the present application, it is preferable that the focusing group comprises a first part group having positive refractive power and a second part group having negative refractive power, and an interval between said first part group and said second part group is varied upon focusing from an infinite distance object to a close distance object.

With such configuration, it is possible to correct superbly variation in curvature of field and spherical aberration upon focusing from an infinite distance object to a close distance object.

Further, in the variable magnification optical system relating to the third embodiment of the present application, it is preferable that each of said first, said second and said third lens groups has at least one cemented lens.

With such configuration, it is possible to correct superbly variation in lateral chromatic aberration upon varying magnification.

Further, in the variable magnification optical system relating to the third embodiment of the present application, it is preferable that said first lens group has at least one aspherical surface.

With such configuration, it is possible to correct superbly variation in curvature of field and spherical aberration upon focusing from an infinite distance object to a close distance object.

Further, in the variable magnification optical system relating to the third embodiment of the present application, it is preferable that, upon varying magnification from the wide angle end state to the telephoto end state, an interval between the first lens group and the second lens group increases and an interval between the second lens group and the third lens group decreases.

With such configuration, it is possible to downsize the variable magnification optical system and attain the variable magnification optical system having high magnification.

Further, the optical apparatus relating to the third embodiment of the present application is equipped with the variable magnification optical system having the above described configuration, so it is possible to attain a small-sized variable magnification optical system having excellent optical performance.

Further, a method for manufacturing a variable magnification optical system relating to the third embodiment of the present application, is a method for manufacturing a variable magnification optical system which comprises, in order from an object side along the optical axis, a first lens group having positive refractive power, a second lens group having negative refractive power and a third lens group having positive refractive power, the method comprising steps of:

constructing such that, upon varying magnification from a wide angle end state to a telephoto end state, a position of said first lens group in the direction of the optical axis is fixed, an interval between said first lens group and said second lens group is varied and an interval between said second lens group and said third lens group is varied;

constructing such that said first lens group comprises a focusing group having negative refractive power in a state where an infinite distance object is focused; and constructing such that focusing from an infinite distance object to a close distance object is carried out by moving said focusing group in the direction of the optical axis, and upon the focusing, a position in the direction of the optical axis, of the most object side lens of said first lens group is fixed.

Hereinafter, variable magnification optical systems relating to numerical examples relating to the present application will be explained with reference to the accompanying drawings.

First Example

FIG. 1 is a sectional view showing a lens configuration in the wide angle end state, of a variable magnification optical system according to a First Example that is common to the first and the second embodiments of the present application.

The variable magnification optical system according to the First Example is composed of, in order from an object side along the optical axis, a first lens group G1 having positive refractive power, a second lens group G2 having negative refractive power and a third lens group G3 having positive refractive power.

The first lens group G1 is composed of a front group G11 having negative refractive power and a rear group G12 having positive refractive power. The front group G11 is composed of, in order from the object side, a negative meniscus lens L11 having a convex surface facing the object, a positive meniscus lens L12 having a convex surface facing the object, and a double concave lens L13. The rear group G12 is composed of a double convex lens L14 and a cemented lens constructed by a negative meniscus lens L15 having a convex surface facing the object cemented with a double convex lens L16. The negative meniscus lens L11 is an aspherical lens in which an aspherical surface is formed on a resin layer disposed on the image side lens surface. The double concave lens L13 is an aspherical lens in which an aspherical surface is formed on a resin layer disposed on the object side lens surface. The object side surface of the double convex lens L14 is an aspherical surface.

The second lens group G2 is composed of, in order from the object side, a cemented lens constructed by a double concave lens L21 cemented with a positive meniscus lens L22 having a convex surface facing the object, and a double concave lens L23.

The third lens group G3 is composed of, in order from the object side, a double convex lens L31, a cemented lens constructed by a double convex lens L32 cemented with a double concave lens L33, a cemented lens constructed by a double convex lens L34 cemented with a double concave lens L35, a double concave lens L36, a double convex lens L37, and a negative meniscus lens L38 having a concave surface facing the object.

Correction of displacement of an imaging position caused by a camera shake or the like is carried out by moving the double convex lens L34, the double concave lens L35 and the double concave lens L36 in a direction having a directional component perpendicular to the optical axis as a vibration reduction lens group.

Upon varying magnification from the wide angle end state to the telephoto end state, the first lens group G1 is fixed, and the second lens group G2 is moved toward the image side and the third lens group G3 is moved toward the object such that an interval between the first lens group G1 and the second lens group G2 increases and an interval between the second lens group G2 and the third lens group G3 decreases. An aperture stop S is disposed between the second lens group G2 and the third lens group G3, and moved toward the object together with the third lens group G3 upon varying magnification from the wide angle end state to the telephoto end state.

Focusing from an infinite distance object to a close distance object is carried out by extending the front group G11 in the first lens group G1, that is, the negative meniscus lens L11, the positive meniscus lens L12 and the double concave lens L13 toward the object.

Meanwhile, in a lens of which the entire system has a focal length of f and of which a vibration reduction coefficient, that is, a ratio of a moving amount of an image on the image plane to that of a moving lens group upon correcting a camera shake, of K, in order to correct rotational camera shake of an angle θ, the vibration reduction lens group for correcting the camera shake may be moved by the amount of (f×tan θ)/K perpendicularly to the optical axis. In the First Example, the vibration reduction coefficient in the wide angle end state is −0.94 and the vibration reduction coefficient in the telephoto end state is −1.33.

Table 1 below shows various values of the variable magnification optical system relating to the First Example.

In [Surface Data], "m" denotes a surface number that is an order of a lens surface counted from the object side along the optical axis, "r" denotes a radius of curvature, "d" denotes a distance, that is, an interval from an n-th surface to an (n+1)-th surface, where n is an integer, "nd" denotes refractive index for d-line (wavelength λ=587.6 nm) and "vd" denotes an Abbe number for d-line (wavelength λ=587.6 nm). Further, "OP" denotes an object surface, "dn" denotes a variable surface-to-surface distance between the n-th surface and the (n+1)-th surface, "BF" denotes a back focal length, and "I" denotes an image plane. Meanwhile, radius of curvature r=∞ denotes a plane surface, and refractive index of the air nd=1.000000 is omitted. In addition, a position of an aspherical surface is expressed by attaching "*" to the surface number, and in the column of the radius of curvature, a paraxial radius of curvature is shown. In the First Example, an air interval on the axis d13 between the first lens group G1 and the second lens group G2, an air interval on the axis d18 between the second lens group G2 and the third lens group G3, and the back focal length BF are varied associated with varying magnification.

In [Aspherical Data], with respect to an aspherical surface shown in [Surface Data], an aspherical surface coefficient and a conical coefficient are shown in the case where the aspherical surface is exhibited by the following expression:

$$x=(h^2/r)/[1+[1-\kappa(h/r)^2]^{1/2}]+A4h^4+A6h^6+A8h^8+A10h^{10}$$

where "x" denotes a sag amount that is a distance along the optical axis from the tangent surface at the vertex of each aspherical surface at a vertical height "h" from the optical axis; "κ" denotes a conical coefficient; "A4", "A6", "A8" and "A10" denote respective aspherical coefficients, and "r" denotes a paraxial radius of curvature that is a radius of curvature of a reference sphere. "E−n", where n is an integer, denotes "×10$^{-n}$", for example, "1.234E−05" denotes "1.234×10$^{-5}$".

In [Various Data], "f" denotes a focal length, "FNO" denotes an F-number, "ω" denotes a half angle of view (unit "°"), "Y" denotes a maximum image height, and "TL" denotes a total length of the optical system, that is, a distance along the optical axis from the first surface of the lens surface to the image plane I. In addition, "W" denotes a wide angle end state, and "T" denotes a telephoto end state.

In [Variable Interval Data Upon Infinite Distance Imaging] and [Variable Interval Data Upon Closest Distance Imaging], "dn" denotes a variable interval between an n-th surface and an (n+1)-th surface, "W" denotes a wide angle end, "M" denotes an intermediate focal length, and "T" denotes a telephoto end, and "BF" denotes a back focal length. In [Variable Interval Data Upon Closest Distance Imaging], "β" denotes a maximum shooting magnification, and "R" denotes a closest imaging distance.

In [Lens Group Data], a starting surface and a focal length of each lens group are shown. "ST" denotes the starting surface and "f" denotes the focal length.

In [Values for Conditional Expressions], values corresponding to respective conditional expressions of imaging lenses relating to the present Example are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

The explanation of reference symbols in Table 1 described above, is the same in Tables for the other Examples.

TABLE 1

First Example

[Surface Data]

| m | r | d | nd | νd |
|---|---|---|---|---|
| OP | ∞ | ∞ | | |
| 1 | 70.34 | 2.53 | 1.58913 | 61.22 |
| 2 | 36.50 | 0.20 | 1.56093 | 36.64 |
| 3* | 32.34 | 14.72 | | |
| 4 | 49.41 | 6.00 | 1.78472 | 25.64 |
| 5 | 157.24 | 5.73 | | |
| 6* | −102.97 | 0.20 | 1.56093 | 36.64 |
| 7 | −101.81 | 1.80 | 1.80100 | 34.92 |
| 8 | 180.44 | 2.10 | | |
| 9* | 61.54 | 7.00 | 1.62299 | 58.12 |
| 10 | −121.25 | 0.10 | | |
| 11 | 120.77 | 1.84 | 1.79504 | 28.69 |
| 12 | 35.19 | 7.50 | 1.56883 | 56.00 |
| 13 | −704.94 | d13 | | |
| 14 | −198.05 | 1.45 | 1.69680 | 55.52 |
| 15 | 49.36 | 4.50 | 1.80809 | 22.74 |
| 16 | 138.27 | 1.80 | | |
| 17 | −109.88 | 1.45 | 1.59319 | 67.90 |
| 18 | 114.98 | d18 | | |
| 19 | ∞ | 1.50 | Aperture stop S | |
| 20 | 54.48 | 4.00 | 1.49782 | 82.57 |
| 21 | −85.93 | 0.10 | | |
| 22 | 44.15 | 5.00 | 1.49782 | 82.57 |
| 23 | −71.82 | 1.41 | 1.90200 | 25.26 |
| 24 | 189.20 | 17.05 | | |
| 25 | 63.27 | 4.50 | 1.90200 | 25.26 |
| 26 | −48.56 | 1.50 | 1.74100 | 52.77 |
| 27 | 93.81 | 5.05 | | |
| 28 | −250.30 | 1.50 | 2.00069 | 25.46 |
| 29 | 42.44 | 4.83 | | |
| 30 | 65.08 | 4.50 | 1.85026 | 32.35 |
| 31 | −84.56 | 9.69 | | |
| 32 | −28.63 | 1.41 | 1.79504 | 28.69 |
| 33 | −55.17 | BF | | |
| I | ∞ | | | |

[Aspherical Data]

Third Surface

κ = 0.0000
A4 = 1.55202E−06
A6 = −5.26700E−11
A8 = 6.34965E−13
A10 = −8.42324E−16

Sixth Surface

κ = 0.0000
A4 = −2.55136E−07
A6 = −3.30788E−10
A8 = 8.73814E−13
A10 = −1.04795E−15

Ninth Surface

κ = 0.0000
A4 = −3.88347E−07
A6 = 8.44413E−11
A8 = −3.63953E−13
A10 = 3.73708E−16

[Various Data]

| | W | T |
|---|---|---|
| f = | 71.8-171.0 | |
| FNO = | 4.5-5.85 | |
| Y = | 21.60-21.60 | |
| 2ω = | 33.5-14.1 | |
| TL = | 220.33-220.33 | |

TABLE 1-continued

First Example

| | W | M | T |
|---|---|---|---|

[Variable Interval Data Upon Infinite Distance Imaging]

| | W | M | T |
|---|---|---|---|
| f | 71.8 | 105.0 | 171.0 |
| d8 | 2.10 | 2.10 | 2.10 |
| d13 | 2.88 | 15.99 | 29.18 |
| d18 | 50.68 | 28.98 | 1.67 |
| BF | 45.82 | 54.42 | 68.54 |

[Variable Interval Data Upon Closest Distance Imaging]

| | W | M | T |
|---|---|---|---|
| β | −0.33 | −0.48 | −0.78 |
| d8 | 44.68 | 44.68 | 44.68 |
| d13 | 2.88 | 15.99 | 29.18 |
| d18 | 50.68 | 28.98 | 1.67 |
| BF | 45.82 | 54.42 | 68.54 |
| R | 370.00 | 370.00 | 370.00 |

[Lens Group Data]

| | ST | f |
|---|---|---|
| G1 | 1 | 130.50 |
| G2 | 14 | −55.70 |
| G3 | 20 | 56.00 |

[Values for Conditional Expressions]

(1-1) f1/(−f11) = 1.35
(1-2) f1/(−f1F) = 1.24
(1-3) (−f2)/f3 = 0.99
(2-1) df/D1 = 0.40
(2-2) f1/(−f11) = 1.35
(2-3) f1/(−f1F) = 1.24
(2-4) (−f2)/f3 = 0.99

Figure 4A:
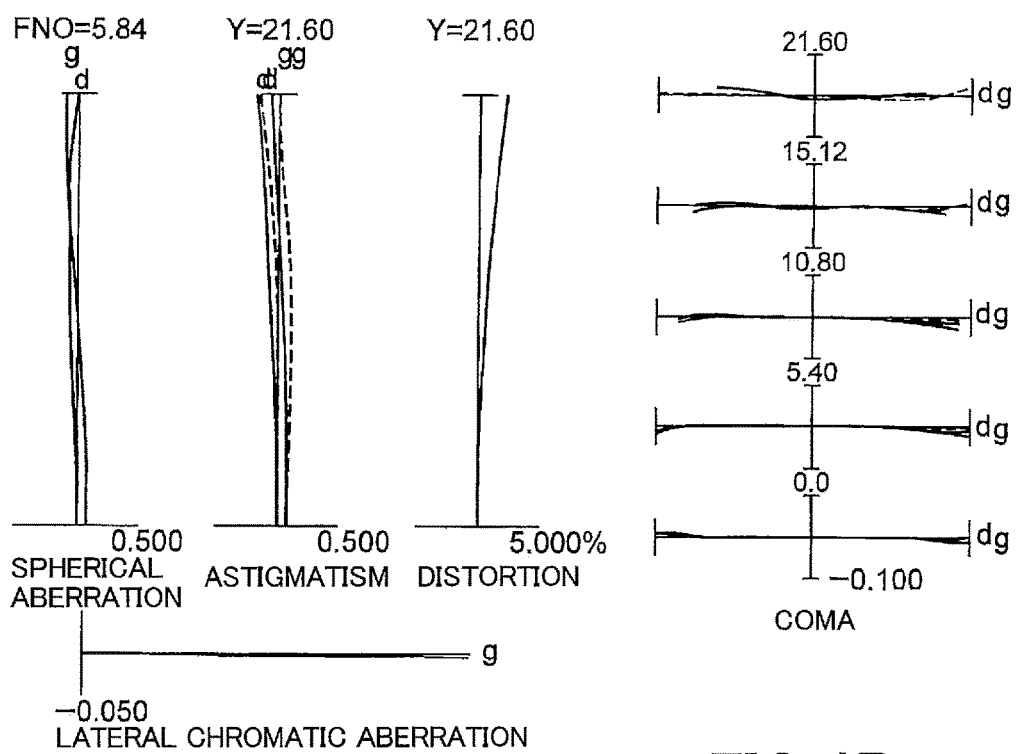
Figure 4B:
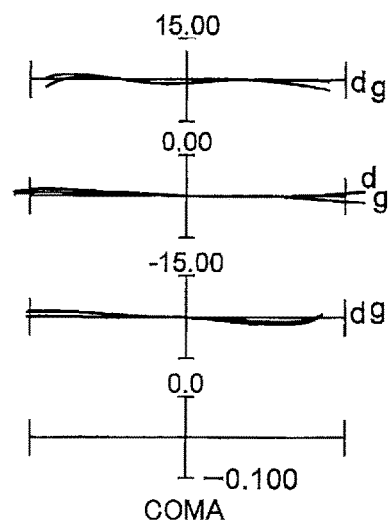
Figure 5A:
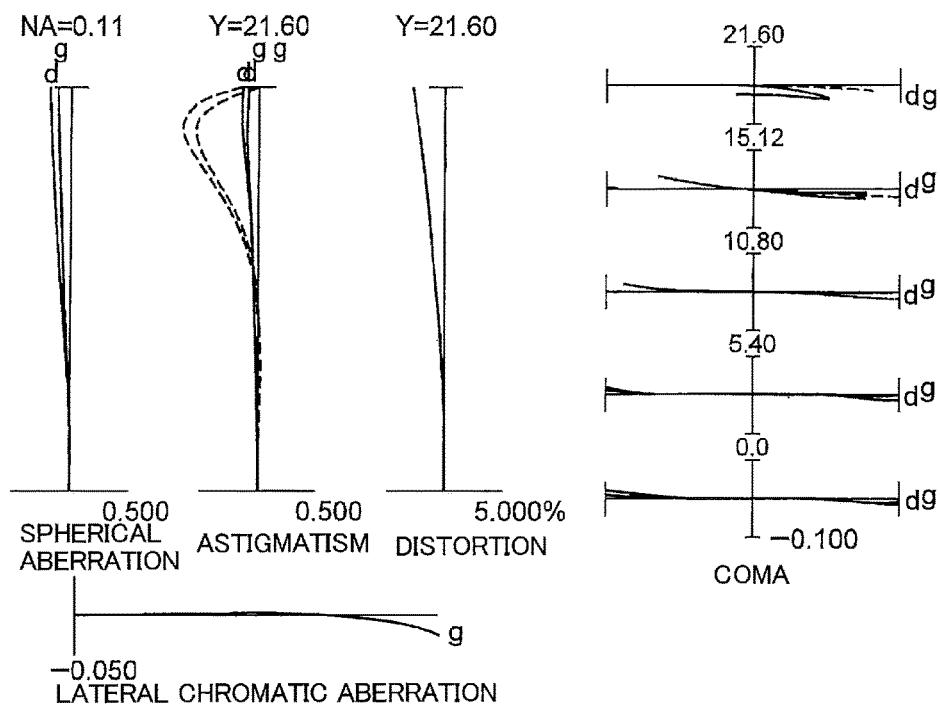
Figure 5B:
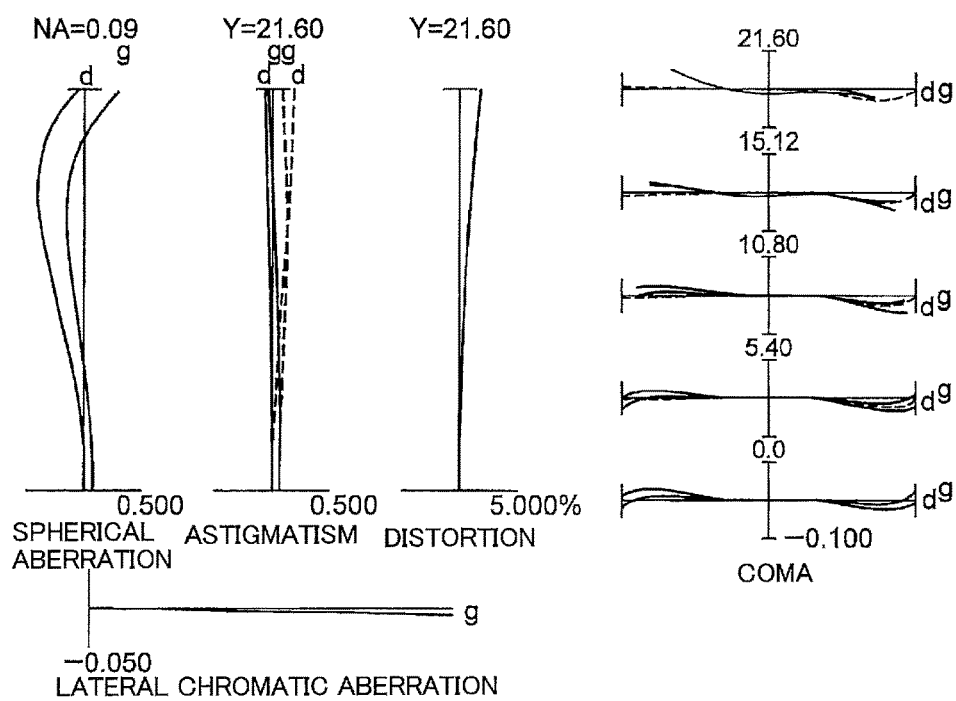

FIG. 2A is graphs showing various aberrations upon focusing on an infinite distance object in the wide angle end state of the First Example. FIG. 2B is a graph showing an aberration when correction of image blur is conducted (a shift amount of the vibration lens group is 0.52) upon focusing on an infinite distance object in the wide angle end state of the First Example. FIG. 3 is graphs showing various aberrations upon focusing on an infinite distance object in the intermediate focal length state of the First Example. FIG. 4A is graphs showing various aberrations upon focusing on an infinite distance object in the telephoto end state of the First Example. FIG. 4B is a graph showing an aberration when correction of image blur is conducted (a shift amount of the vibration lens group is 0.57) upon focusing on an infinite distance object in the telephoto end state of the First Example. FIG. 5A is graphs showing various aberrations upon focusing on a close distance object in the wide angle end state of the First Example, and FIG. 5B is graphs showing various aberrations upon focusing on a close distance object in the telephoto end state of the First Example.

In the graphs showing aberrations as drawn in FIG. 2A to FIG. 5B, "FNO" denotes an F-number, "NA" denotes a numerical aperture, and "Y" denotes an image height. In graphs showing spherical aberration, F-number with respect to the maximum aperture or the numerical aperture is shown. In graphs showing astigmatism and distortion, the maximum value of the image height is shown. In graphs showing coma aberration, the value for each image height is shown. "d" denotes d-line (wavelength λ=587.6 nm), and "g" denotes g-line (wavelength λ=435.8 nm). In graphs showing astigmatism, a solid line indicates a sagittal image plane, and a broken line indicates a meridional image plane. Meanwhile, in graphs showing various aberrations in the other Examples as described below, the same symbols as in the First Example are employed.

As is apparent from the above-mentioned graphs showing aberrations, the various aberrations including spherical aberration and comma aberration are corrected superbly in the variable magnification optical system relating to the First Example.

Second Example

Figure 6:
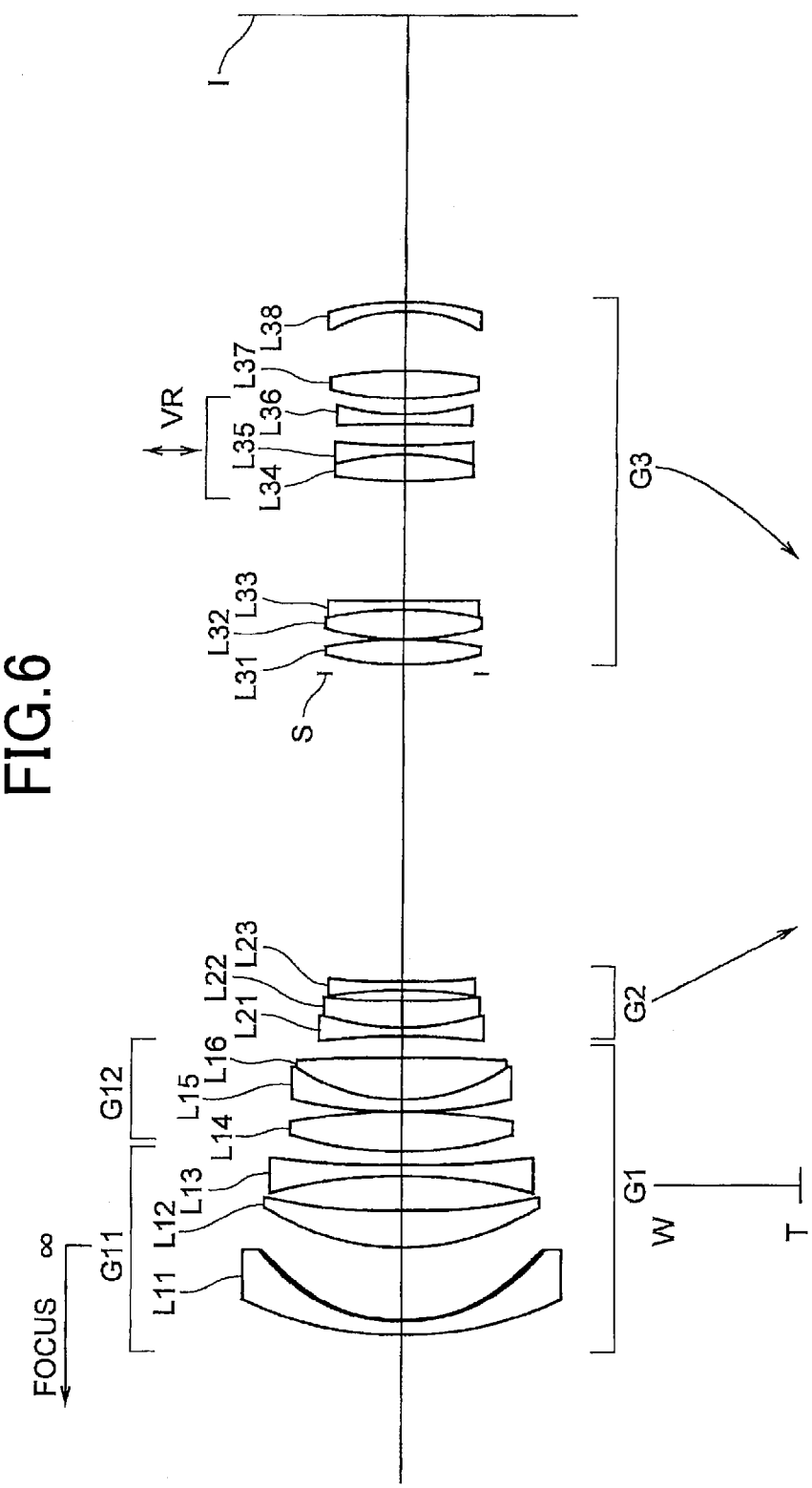
FIG. 6 is a sectional view showing a lens configuration of a variable magnification optical system according to a Second Example that is common to the first and the second embodiments of the present application.

FIG. 6 is a sectional view showing a lens configuration in the wide angle end state, of a variable magnification optical system according to a Second Example that is common to the first and the second embodiments of the present application.

The variable magnification optical system according to the Second Example is composed of, in order from an object side along the optical axis, a first lens group G1 having positive refractive power, a second lens group G2 having negative refractive power and a third lens group G3 having positive refractive power.

The first lens group G1 is composed of a front group G11 having negative refractive power and a rear group G12 having positive refractive power. The front group G11 is composed of, in order from the object side, a negative meniscus lens L11 having a convex surface facing the object, a positive meniscus lens L12 having a convex surface facing the object, and a double concave lens L13. The rear group G12 is composed of a double convex lens L14 and a cemented lens constructed by a negative meniscus lens L15 having a convex surface facing the object cemented with a double convex lens L16. The negative meniscus lens L11 is an aspherical lens in which an aspherical surface is formed on a resin layer disposed on the image side lens surface. The double concave lens L13 is an aspherical lens in which an aspherical surface is formed on a resin layer disposed on the object side lens surface. The object side surface of the double convex lens L14 is an aspherical surface.

The second lens group G2 is composed of, in order from the object side, a cemented lens constructed by a double concave lens L21 cemented with a positive meniscus lens L22 having a convex surface facing the object, and a double concave lens L23.

The third lens group G3 is composed of, in order from the object side, a double convex lens L31, a cemented lens constructed by a double convex lens L32 cemented with a double concave lens L33, a cemented lens constructed by a double convex lens L34 cemented with a double concave lens L35, a double concave lens L36, a double convex lens L37, and a negative meniscus lens L38 having a concave surface facing the object.

Correction of displacement of an imaging position caused by a camera shake or the like is carried out by moving the double convex lens L34, the double concave lens L35 and the double concave lens L36 in a direction having a directional component perpendicular to the optical axis as a vibration reduction lens group.

Upon varying magnification from the wide angle end state to the telephoto end state, the first lens group G1 is fixed, and the second lens group G2 is moved toward the image side and the third lens group G3 is moved toward the object such that an interval between the first lens group G1 and the second lens group G2 increases and an interval between the second lens group G2 and the third lens group G3 decreases. An aperture stop S is disposed between the second lens group G2 and the third lens group G3, and moved toward the object together with the third lens group G3 upon varying magnification from the wide angle end state to the telephoto end state.

Focusing from an infinite distance object to a close distance object is carried out by extending the front group G11 in the first lens group G1, that is, the negative meniscus lens L11, the positive meniscus lens L12 and the double concave lens L13 toward the object.

Meanwhile, in a lens of which the entire system has a focal length of f and of which a vibration reduction coefficient, that is, a ratio of a moving amount of an image on the image plane to that of a moving lens group upon correcting a camera shake, of K, in order to correct rotational camera shake of an angle θ, the vibration reduction lens group for correcting the camera shake may be moved by the amount of (f×tan θ/K) perpendicularly to the optical axis. In the Second Example, the vibration reduction coefficient in the wide angle end state is −0.94 and the vibration reduction coefficient in the telephoto end state is −1.34.

Table 2 below shows various values of the variable magnification optical system relating to the Second Example.

TABLE 2

Second Example

[Surface Data]

| m | r | d | nd | vd |
|---|---|---|---|---|
| OP | ∞ | ∞ | | |
| 1 | 64.50 | 2.36 | 1.51680 | 63.88 |
| 2 | 32.00 | 0.19 | 1.56093 | 36.64 |
| 3* | 28.59 | 12.39 | | |
| 4 | 45.02 | 6.00 | 1.80518 | 25.45 |
| 5 | 112.67 | 5.97 | | |
| 6* | −95.82 | 0.19 | 1.56093 | 36.64 |
| 7 | −94.75 | 1.68 | 1.80100 | 34.92 |
| 8 | 191.76 | 2.30 | | |
| 9* | 64.36 | 6.73 | 1.62299 | 58.12 |
| 10 | −121.25 | 0.10 | | |
| 11 | 97.56 | 1.77 | 1.79504 | 28.69 |
| 12 | 32.56 | 7.21 | 1.56883 | 56.00 |
| 13 | −431.72 | d13 | | |
| 14 | −176.72 | 1.45 | 1.69680 | 55.52 |
| 15 | 47.36 | 4.50 | 1.80809 | 22.74 |
| 16 | 123.31 | 1.80 | | |
| 17 | −114.50 | 1.45 | 1.59319 | 67.90 |
| 18 | 125.80 | d18 | | |
| 19 | ∞ | 1.50 | Aperture stop S | |
| 20 | 51.24 | 4.00 | 1.49782 | 82.57 |
| 21 | −101.77 | 0.10 | | |
| 22 | 48.37 | 5.00 | 1.49782 | 82.57 |
| 23 | −69.00 | 1.41 | 1.90200 | 25.26 |
| 24 | 261.08 | 19.91 | | |
| 25 | 70.21 | 4.50 | 1.90200 | 25.26 |
| 26 | −42.61 | 1.50 | 1.74100 | 52.76 |
| 27 | 140.69 | 3.55 | | |
| 28 | −218.41 | 1.50 | 2.00069 | 25.46 |
| 29 | 42.18 | 2.67 | | |
| 30 | 61.25 | 4.50 | 1.85026 | 32.35 |
| 31 | −89.36 | 9.97 | | |
| 32 | −27.54 | 1.41 | 1.79504 | 28.69 |
| 33 | −52.33 | BF | | |
| I | ∞ | | | |

[Aspherical Data]

Third Surface

κ = 0.0000
A4 = 2.78394E−06
A6 = 3.83490E−10
A8 = 1.24228E−12
A10 = −6.16341E−16

Sixth Surface

κ = 0.0000
A4 = 5.42957E−08

TABLE 2-continued

Second Example

A6 = −1.08796E−09
A8 = 2.99096E−12
A10 = −2.98655E−15
Ninth Surface

κ = 0.0000
A4 = −4.04698E−07
A6 = 6.63868E−10
A8 = −1.71365E−12
A10 = 1.67413E−15

[Various Data]

| | W | T |
|---|---|---|
| f = | | 71.8-171.0 |
| FNO = | | 4.52-5.88 |
| Y = | | 21.60-21.60 |
| 2ω = | | 33.5-14.1 |
| TL = | | 219.60-219.60 |

| | W | M | T |
|---|---|---|---|
| [Variable Interval Data Upon Infinite Distance Imaging] | | | |
| f | 71.8 | 105.0 | 171.0 |
| d8 | 2.30 | 2.30 | 2.30 |
| d13 | 3.50 | 16.52 | 28.62 |
| d18 | 51.25 | 29.90 | 2.92 |
| BF | 47.26 | 55.59 | 70.46 |
| [Variable Interval Data Upon Closest Distance Imaging] | | | |
| β | −0.33 | −0.48 | −0.77 |
| d8 | 38.66 | 38.66 | 38.66 |
| d13 | 3.50 | 16.52 | 28.62 |
| d18 | 51.25 | 29.90 | 2.92 |
| BF | 47.26 | 55.59 | 70.46 |
| R | 370.00 | 370.00 | 370.00 |

[Lens Group Data]

| | ST | f |
|---|---|---|
| G1 | 1 | 127.46 |
| G2 | 14 | −54.47 |
| G3 | 20 | 55.76 |

[Values for Conditional Expressions]

(1-1) f1/(−f11) = 1.43
(1-2) f1/(−f1F) = 1.27
(1-3) (−f2)/f3 = 0.98
(2-1) df/D1 = 0.40
(2-2) f1/(−f11) = 1.43
(2-3) f1/(−f1F) = 1.27
(2-4) (−f2)/f3 = 0.98

Figure 10A:
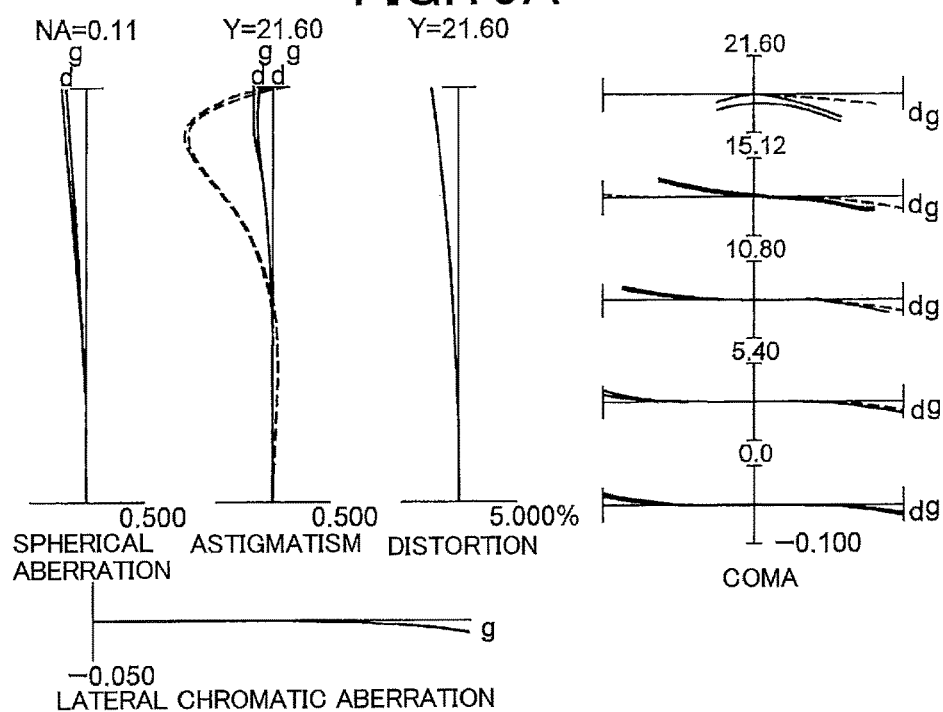
Figure 10B:
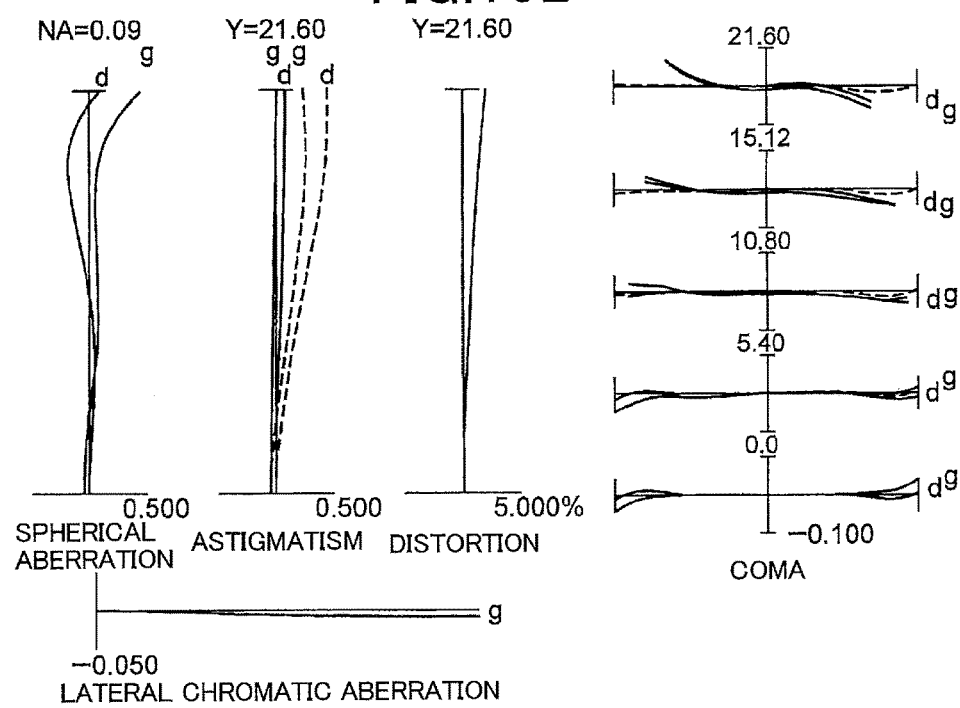

FIG. 7A is graphs showing various aberrations upon focusing on an infinite distance object in the wide angle end state of the Second Example. FIG. 7B is a graph showing an aberration when correction of image blur is conducted (a shift amount of the vibration lens group is 0.52) upon focusing on an infinite distance object in the wide angle end state of the Second Example. FIG. 8 is graphs showing various aberrations upon focusing on an infinite distance object in the intermediate focal length state of the Second Example. FIG. 9A is graphs showing various aberrations upon focusing on an infinite distance object in the telephoto end state of the Second Example. FIG. 9B is a graph showing an aberration when correction of image blur is conducted (a shift amount of the vibration lens group is 0.56) upon focusing on an infinite distance object in the telephoto end state of the Second Example. FIG. 10A is graphs showing various aberrations upon focusing on a close distance object in the wide angle end state of the Second Example, and FIG. 10B is graphs showing various aberrations upon focusing on a close distance object in the telephoto end state of the Second Example.

As is apparent from the above-mentioned graphs showing various aberrations, the various aberrations including spherical aberration and comma aberration are corrected superbly in the variable magnification system relating to the Second Example.

Third Example

FIG. 11 is a sectional view showing a configuration of a variable magnification optical system according to a Third Example that is common to the first and the second embodiments of the present application.

The variable magnification optical system according to the Third Example is composed of, in order from an object side along the optical axis, a first lens group G1 having positive refractive power, a second lens group G2 having negative refractive power and a third lens group G3 having positive refractive power.

The first lens group G1 is composed of a front group G11 having negative refractive power and a rear group G12 having positive refractive power. The front group G11 is composed of, in order from the object side, a negative meniscus lens L11 having a convex surface facing the object, a positive meniscus lens L12 having a convex surface facing the object, and a double concave lens L13. The rear group G12 is composed of a double convex lens L14, a cemented lens constructed by a negative meniscus lens L15 having a convex surface facing the object cemented with a double convex lens L16, and a positive meniscus lens L17 having a convex surface facing the object. The negative meniscus lens L11 is an aspherical lens in which an aspherical surface is formed on a resin layer disposed on the image side lens surface. The double concave lens L13 is an aspherical lens in which an aspherical surface is formed on a resin layer disposed on the object side lens surface. The object side surface of the double convex lens L14 is an aspherical surface.

The second lens group G2 is composed of, in order from the object side, a cemented lens constructed by a double concave lens L21 cemented with a positive meniscus lens L22 having a convex surface facing the object, and a double concave lens L23.

The third lens group G3 is composed of, in order from the object side, a double convex lens L31, a cemented lens constructed by a double convex lens L32 cemented with a double concave lens L33, a cemented lens constructed by a double convex lens L34 cemented with a double concave lens L35, a double concave lens L36, a double convex lens L37, and a negative meniscus lens L38 having a concave surface facing the object.

Correction of displacement of an imaging position caused by a camera shake or the like is carried out by moving the double convex lens L34, the double concave lens L35 and the double concave lens L36 in a direction having a directional component perpendicular to the optical axis as a vibration reduction lens group.

Upon varying magnification from the wide angle end state to the telephoto end state, the first lens group G1 is fixed, and the second lens group G2 is moved toward the image side and the third lens group G3 is moved toward the object such that an interval between the first lens group G1 and the second lens group G2 increases and an interval between the second lens group G2 and the third lens group G3 decreases.

An aperture stop S is disposed between the second lens group G2 and the third lens group G3, and moved toward the object together with the third lens group G3 upon varying magnification from the wide angle end state to the telephoto end state.

Focusing from an infinite distance object to a close distance object is carried out by extending the front group G11 in the first lens group G1, that is, the negative meniscus lens L11, the positive meniscus lens L12 and the double concave lens L13 toward the object.

Meanwhile, in a lens of which the entire system has a focal length of f and of which a vibration reduction coefficient, that is, a ratio of a moving amount of an image on the image plane to that of a moving lens group upon correcting a camera shake, of K, in order to correct rotational camera shake of an angle θ, the vibration reduction lens group for correcting the camera shake may be moved by the amount of (f×tan θ/K) perpendicularly to the optical axis. In the Third Example, the vibration reduction coefficient in the wide angle end state is −0.81 and the vibration reduction coefficient in the telephoto end state is −1.20.

Table 3 below shows various values of the variable magnification optical system relating to the Third Example.

TABLE 3

Third Example

[Surface Data]

| m | r | d | nd | νd |
|---|---|---|---|---|
| OP | ∞ | ∞ | | |
| 1 | 70.59 | 2.53 | 1.58913 | 61.22 |
| 2 | 35.80 | 0.20 | 1.56093 | 36.78 |
| 3* | 32.34 | 13.45 | | |
| 4 | 51.31 | 6.00 | 1.80518 | 25.45 |
| 5 | 133.67 | 5.73 | | |
| 6* | −102.97 | 0.20 | 1.56093 | 36.78 |
| 7 | −101.81 | 1.80 | 1.80100 | 34.92 |
| 8 | 314.43 | 2.00 | | |
| 9* | 65.70 | 7.00 | 1.62299 | 58.12 |
| 10 | −159.47 | 0.10 | | |
| 11 | 95.49 | 1.84 | 1.79504 | 28.69 |
| 12 | 35.52 | 8.00 | 1.51680 | 63.88 |
| 13 | −596.08 | 0.10 | | |
| 14 | 150.69 | 3.57 | 1.62299 | 58.12 |
| 15 | 237.23 | d15 | | |
| 16 | −133.64 | 1.45 | 1.69680 | 55.52 |
| 17 | 42.32 | 4.03 | 1.80809 | 22.74 |
| 18 | 113.97 | 3.00 | | |
| 19 | −135.12 | 1.45 | 1.62299 | 58.12 |
| 20 | 132.60 | d20 | | |
| 21 | ∞ | 1.50 | Aperture stop S | |
| 22 | 55.88 | 4.00 | 1.49782 | 82.57 |
| 23 | −101.43 | 0.10 | | |
| 24 | 48.32 | 5.00 | 1.49782 | 82.57 |
| 25 | −80.11 | 1.41 | 1.90200 | 25.26 |
| 26 | 387.10 | 23.70 | | |
| 27 | 66.04 | 5.00 | 1.80518 | 25.45 |
| 28 | −43.70 | 1.50 | 1.62299 | 58.12 |
| 29 | 195.07 | 5.82 | | |
| 30 | −81.08 | 1.74 | 1.90200 | 25.26 |
| 31 | 41.28 | 3.64 | | |
| 32 | 66.09 | 4.50 | 1.80440 | 39.61 |
| 33 | −60.85 | 2.00 | | |
| 34 | −29.96 | 1.41 | 1.74400 | 44.80 |
| 35 | −65.07 | BF | | |
| I | ∞ | | | |

[Aspherical Data]

Third Surface

κ = 0.0000
A4 = 1.69981E−06
A6 = 1.44951E−10
A8 = 5.11281E−13
A10 = −5.63056E−16

Sixth Surface

κ = 0.0000
A4 = −1.45599E−07
A6 = −1.50651E−10
A8 = 4.23395E−13
A10 = −5.60943E−16

Ninth Surface

κ = 0.0000
A4 = −5.37885E−08
A6 = 6.06753E−11
A8 = −1.91968E−13
A10 = 2.00142E−16

[Various Data]

| | W | T |
|---|---|---|
| f = | 71.8-171.0 | |
| FNO = | 4.48-5.69 | |
| Y = | 21.60-21.60 | |
| 2ω = | 33.5-14.1 | |
| TL = | 222.64-222.64 | |

| | W | M | T |
|---|---|---|---|

[Variable Interval Data Upon Infinite Distance Imaging]

| f | 71.8 | 105.0 | 171.0 |
|---|---|---|---|
| d8 | 2.00 | 2.00 | 2.00 |
| d15 | 3.50 | 16.52 | 28.62 |
| d20 | 51.25 | 29.90 | 2.92 |
| BF | 47.26 | 55.59 | 70.46 |

[Variable Interval Data Upon Closest Distance Imaging]

| β | −0.33 | −0.49 | −0.79 |
|---|---|---|---|
| d8 | 50.40 | 50.40 | 50.40 |
| d15 | 3.50 | 16.52 | 28.62 |
| d20 | 51.25 | 29.90 | 2.92 |
| BF | 47.26 | 55.59 | 70.46 |
| R | 370.00 | 370.00 | 370.00 |

[Lens Group Data]

| | ST | f |
|---|---|---|
| G1 | 1 | 121.26 |
| G2 | 16 | −51.36 |
| G3 | 22 | 55.48 |

[Values for Conditional Expressions]

(1-1) f1/(−f11) = 1.19
(1-2) f1/(−f1F) = 1.16
(1-3) (−f2)/f3 = 0.93
(2-1) df/D1 = 0.34
(2-2) f1/(−f11) = 1.19
(2-3) f1/(−f1F) = 1.16
(2-4) (−f2)/f3 = 0.93

Figure 12A:
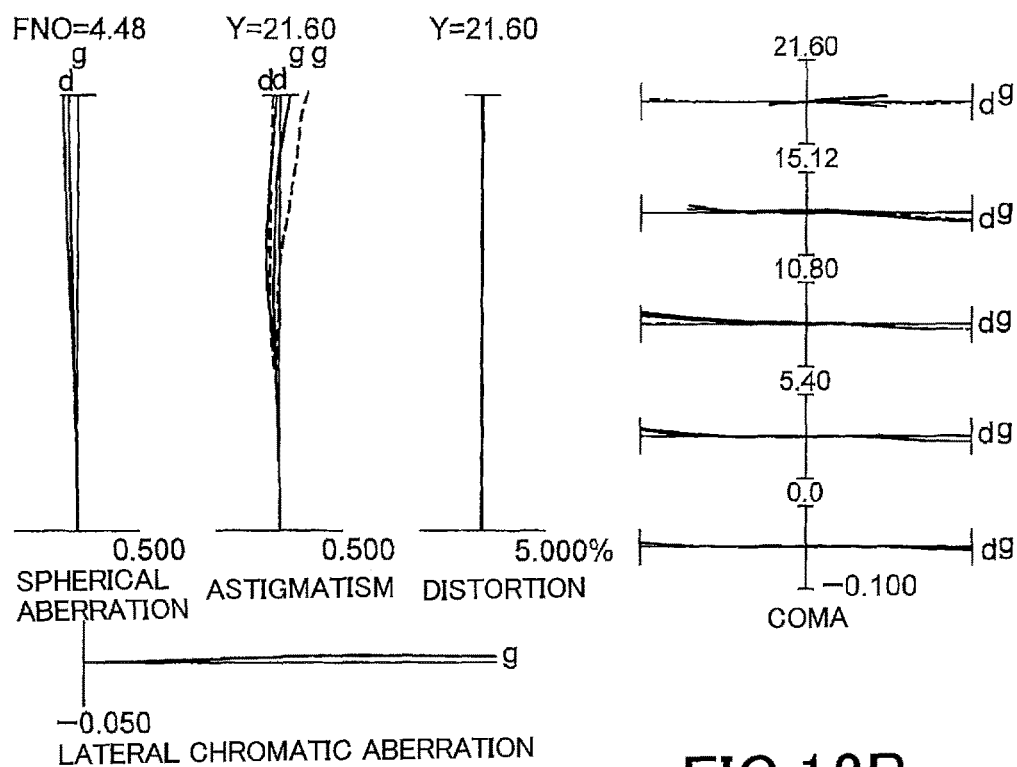
Figure 12B:
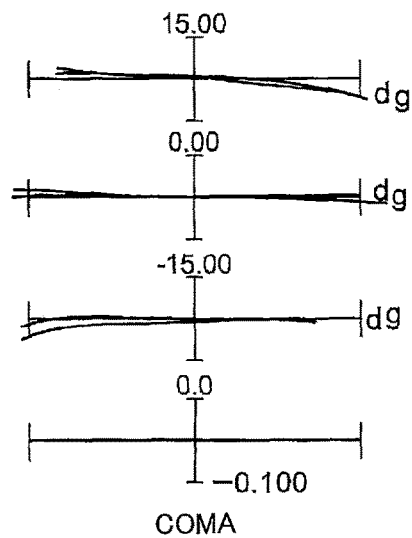
Figure 14A:
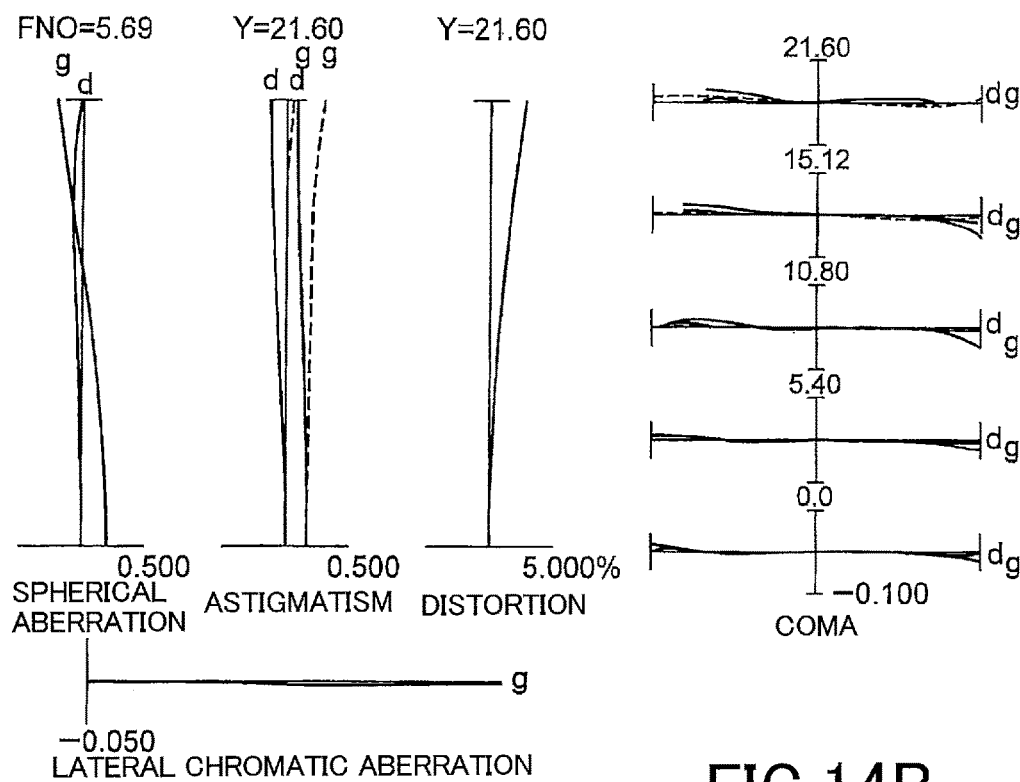
Figure 14B:
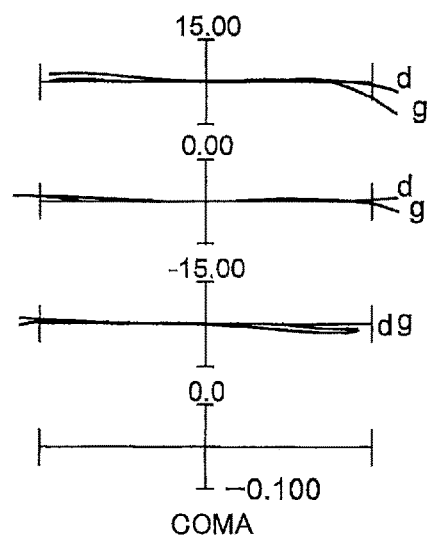
Figure 15A:
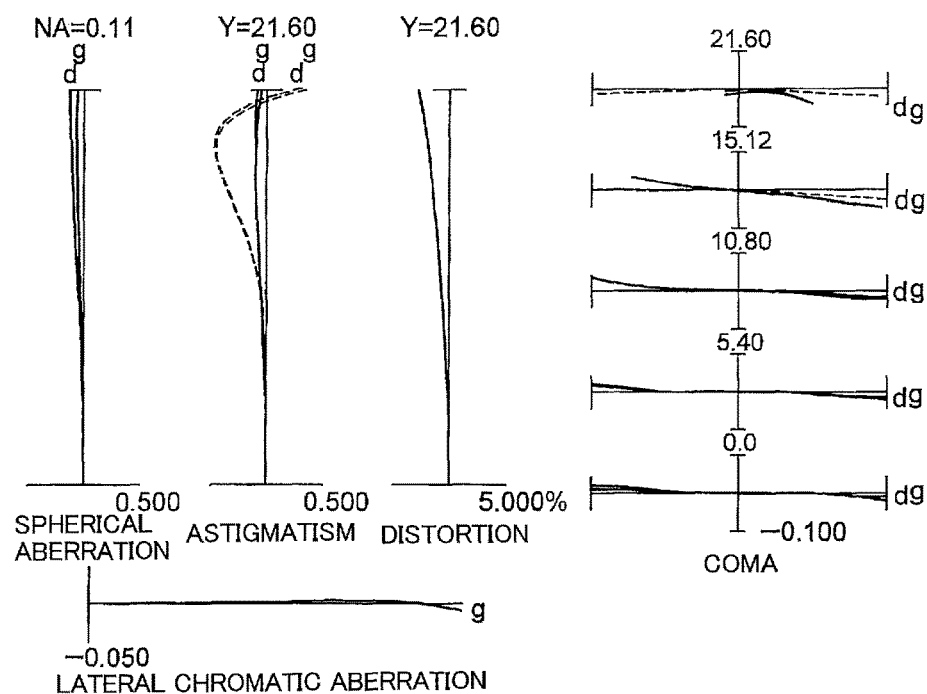
Figure 15B:
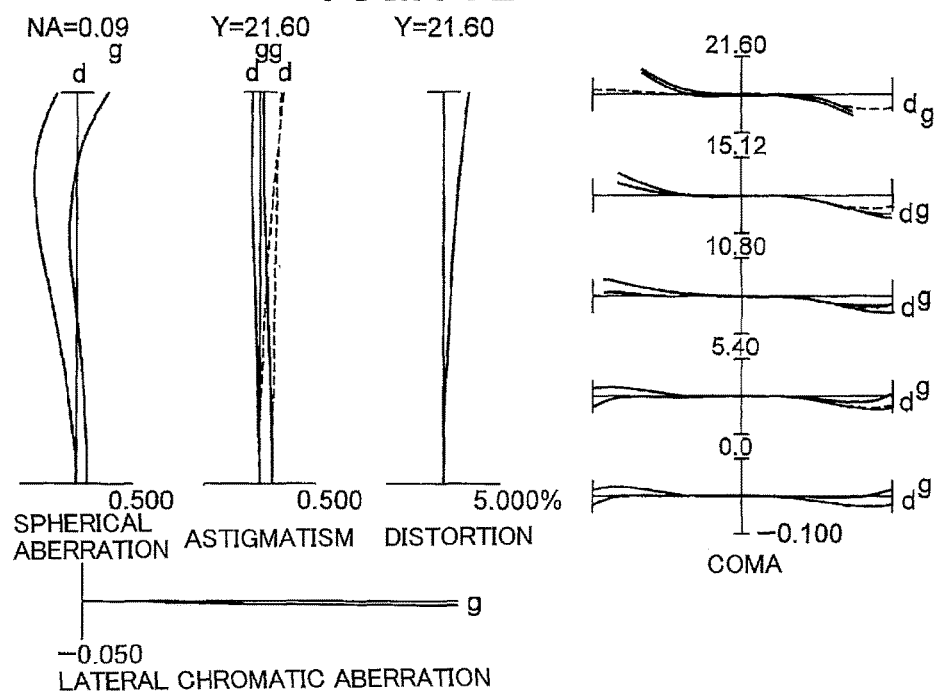

FIG. 12A is graphs showing various aberrations upon focusing on an infinite distance object in the wide angle end state of the Third Example. FIG. 12B is a graph showing an aberration when correction of image blur is conducted (a shift amount of the vibration lens group is 0.61) upon focusing on an infinite distance object in the wide angle end state of the Third Example. FIG. 13 is graphs showing various aberrations upon focusing on an infinite distance object in the intermediate focal length state of the Third Example. FIG. 14A is graphs showing various aberrations upon focusing on an infinite distance object in the telephoto end state of the Third Example. FIG. 14B is a graph showing an aberration when correction of image blur is conducted (a shift amount of the vibration lens group is 0.63) upon focusing on an infinite distance object in the telephoto end state of the Third Example. FIG. 15A is graphs showing various aberrations upon focusing on a close distance object in the wide angle end state of the Third Example, and FIG. 15B is graphs showing various aberrations upon focusing on a close distance object in the telephoto end state of the Third Example.

As is apparent from the above-mentioned graphs showing aberrations, the various aberrations including spherical aberration and comma aberration are corrected superbly in the variable magnification system relating to the Third Example.

Fourth Example

Figure 16:
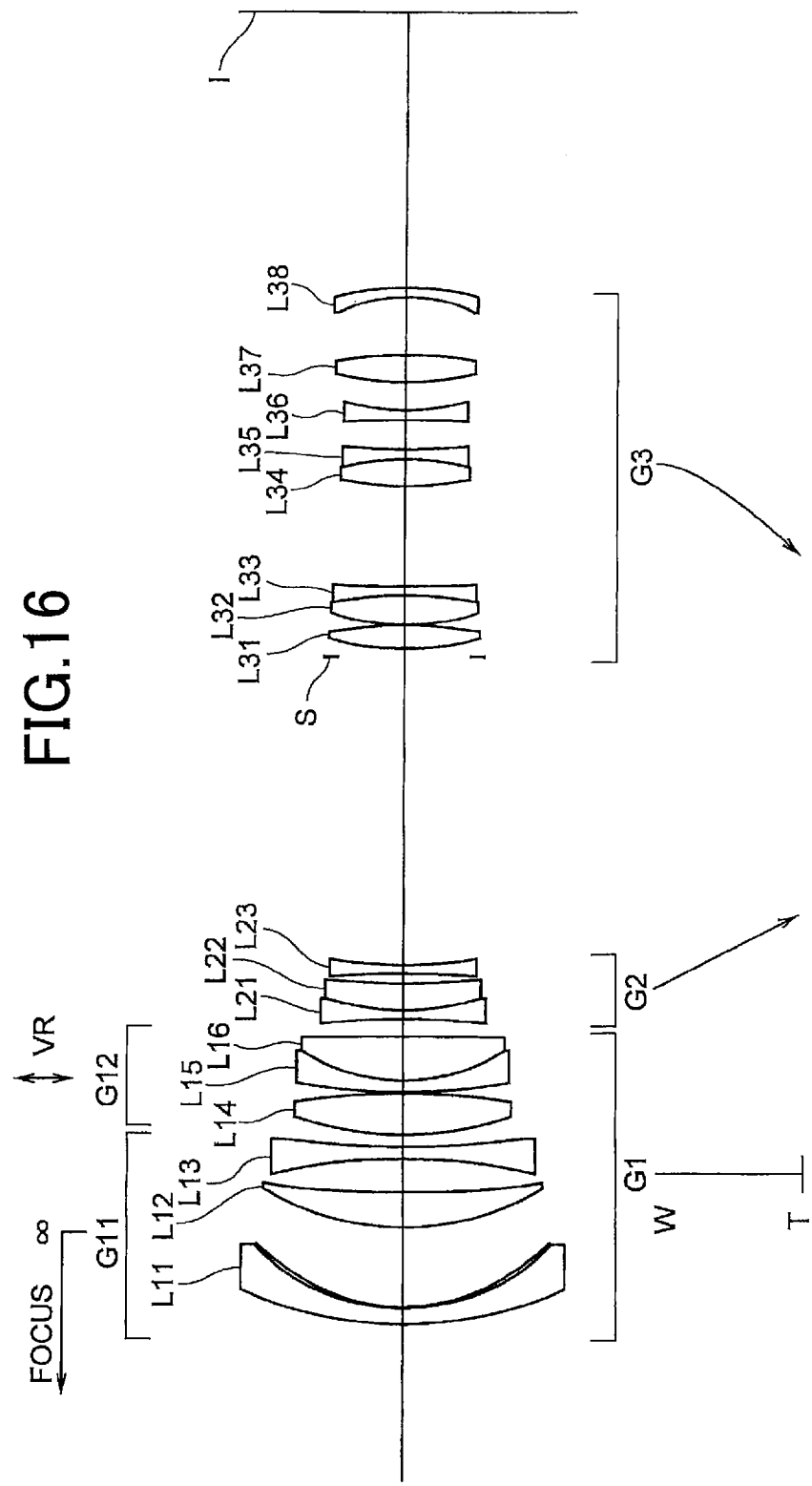
FIG. 16 is a sectional view showing a lens configuration of a variable magnification optical system according to a Fourth Example that is common to the first and the second embodiments of the present application.

FIG. 16 is a sectional view showing a configuration of a variable magnification optical system according to a Fourth Example that is common to the first and the second embodiments of the present application.

The variable magnification optical system according to the Fourth Example is composed of, in order from an object side along the optical axis, a first lens group G1 having positive refractive power, a second lens group G2 having negative refractive power and a third lens group G3 having positive refractive power.

The first lens group G1 is composed of a front group G11 having negative refractive power and a rear group G12 having positive refractive power. The front group G11 is composed of, in order from the object side, a negative meniscus lens L11 having a convex surface facing the object, a positive meniscus lens L12 having a convex surface facing the object, and a double concave lens L13. The rear group G12 is composed of a double convex lens L14 and a cemented lens constructed by a negative meniscus lens L15 having a convex surface facing the object cemented with a double convex lens L16. The negative meniscus lens L11 is an aspherical lens in which an aspherical surface is formed on a resin layer disposed on the image side lens surface. The double concave lens L13 is an aspherical lens in which an aspherical surface is formed on a resin layer disposed on the object side lens surface. The object side surface of the double convex lens L14 is an aspherical surface.

The second lens group G2 is composed of, in order from the object side, a cemented lens constructed by a double concave lens L21 cemented with a positive meniscus lens L22 having a convex surface facing the object, and a double concave lens L23.

The third lens group G3 is composed of, in order from the object side, a double convex lens L31, a cemented lens constructed by a double convex lens L32 cemented with a double concave lens L33, a cemented lens constructed by a double convex lens L34 cemented with a double concave lens L35, a double concave lens L36, a double convex lens L37, and a negative meniscus lens L38 having a concave surface facing the object.

Correction of displacement of an imaging position caused by a camera shake or the like is carried out by moving the double convex lens L14, the negative meniscus lens L15 and the double convex lens L16 in a direction having a directional component perpendicular to the optical axis as a vibration reduction lens group.

Upon varying magnification from the wide angle end state to the telephoto end state, the first lens group G1 is fixed, and the second lens group G2 is moved toward the image side and the third lens group G3 is moved toward the object such that an interval between the first lens group G1 and the second lens group G2 increases and an interval between the second lens group G2 and the third lens group G3 decreases. An aperture stop S is disposed between the second lens group G2 and the third lens group G3, and moved toward the object together with the third lens group G3 upon varying magnification from the wide angle end state to the telephoto end state.

Focusing from an infinite distance object to a close distance object is carried out by extending the front group G11 in the first lens group G1, that is, the negative meniscus lens L11, the positive meniscus lens L12 and the double concave lens L13 toward the object.

Meanwhile, in a lens of which the entire system has a focal length of f and of which a vibration reduction coefficient, that is, a ratio of a moving amount of an image on the image plane to that of a moving lens group upon correcting a camera shake, of K, in order to correct rotational camera shake of an angle θ, the vibration reduction lens group for correcting the camera shake may be moved by the amount of (f×tan θ/K) perpendicularly to the optical axis. In the Fourth Example, the vibration reduction coefficient in the wide angle end state is 1.28 and the vibration reduction coefficient in the telephoto end state is 3.05.

Table 4 below shows various values of the variable magnification optical system relating to the Fourth Example.

TABLE 4

Fourth Example

[Surface Data]

| m | r | d | nd | νd |
|---|---|---|---|---|
| OP | ∞ | ∞ | | |
| 1 | 70.29 | 2.53 | 1.58913 | 61.22 |
| 2 | 36.50 | 0.20 | 1.56093 | 36.64 |
| 3* | 32.34 | 13.84 | | |
| 4 | 49.85 | 6.00 | 1.78472 | 25.64 |
| 5 | 160.84 | 5.95 | | |
| 6* | −102.97 | 0.20 | 1.56093 | 36.64 |
| 7 | −101.81 | 1.80 | 1.80100 | 34.92 |
| 8 | 181.76 | 2.10 | | |
| 9* | 63.72 | 7.00 | 1.62299 | 58.12 |
| 10 | −118.25 | 0.10 | | |
| 11 | 110.60 | 1.84 | 1.79504 | 28.69 |
| 12 | 34.50 | 7.50 | 1.56883 | 56.00 |
| 13 | −1145.44 | d13 | | |
| 14 | −214.52 | 1.45 | 1.69680 | 55.52 |
| 15 | 48.73 | 4.50 | 1.80809 | 22.74 |
| 16 | 128.20 | 1.80 | | |
| 17 | −105.54 | 1.45 | 1.59319 | 67.90 |
| 18 | 127.16 | d18 | | |
| 19 | ∞ | 1.50 | Aperture stop S | |
| 20 | 53.73 | 4.00 | 1.49782 | 82.57 |
| 21 | −87.39 | 0.10 | | |
| 22 | 46.05 | 5.00 | 1.49782 | 82.57 |
| 23 | −67.33 | 1.41 | 1.90200 | 25.26 |
| 24 | 218.68 | 16.82 | | |
| 25 | 63.38 | 4.50 | 1.90200 | 25.26 |
| 26 | −46.65 | 1.50 | 1.74100 | 52.76 |
| 27 | 106.75 | 5.03 | | |
| 28 | −215.29 | 1.50 | 2.00069 | 25.46 |
| 29 | 42.88 | 4.93 | | |
| 30 | 74.24 | 4.50 | 1.85026 | 32.35 |
| 31 | −76.50 | 9.75 | | |
| 32 | −28.93 | 1.41 | 1.79504 | 28.69 |
| 33 | −56.04 | BF | | |
| I | ∞ | | | |

TABLE 4-continued

Fourth Example

[Aspherical Data]

Third Surface

κ = 0.0000
A4 = 1.69021E−06
A6 = 5.54096E−12
A8 = 7.83798E−13
A10 = −6.49343E−16

Sixth Surface

κ = 0.0000
A4 = −1.58234E−08
A6 = −6.54320E−10
A8 = 1.68055E−12
A10 = −1.66708E−15

Ninth Surface

κ = 0.0000
A4 = −4.30423E−07
A6 = 3.77549E−10
A8 = −9.17482E−13
A10 = 8.05198E−16

[Various Data]

| | W | T |
|---|---|---|
| f = | 71.8–171.0 | |
| FNO = | 4.49–5.81 | |
| Y = | 21.60–21.60 | |
| 2ω = | 33.5–14.1 | |
| TL = | 220.78–220.78 | |

| | W | M | T |
|---|---|---|---|
| [Variable Interval Data Upon Infinite Distance Imaging] | | | |
| f | 71.8 | 105.0 | 171.0 |
| d8 | 2.10 | 2.10 | 2.10 |
| d13 | 3.00 | 16.35 | 29.63 |
| d18 | 51.61 | 29.73 | 2.26 |
| BF | 45.96 | 54.49 | 68.68 |
| [Variable Interval Data Upon Closest Distance Imaging] | | | |
| β | −0.33 | −0.48 | −0.78 |
| d8 | 44.68 | 44.68 | 44.68 |
| d13 | 3.00 | 16.35 | 29.63 |
| d18 | 51.61 | 29.73 | 2.26 |
| BF | 45.96 | 54.49 | 68.68 |
| R | 370.00 | 370.00 | 370.00 |

[Lens Group Data]

| | ST | f |
|---|---|---|
| G1 | 1 | 133.00 |
| G2 | 14 | −56.11 |
| G3 | 20 | 56.27 |

[Values for Conditional Expressions]

(1-1) f1/(−f11) = 1.38
(1-2) f1/(−f1F) = 1.26
(1-3) (−f2)/f3 = 1.00
(2-1) df/D1 = 0.40
(2-2) f1/(−f11) = 1.38
(2-3) f1/(−f1F) = 1.26
(2-4) (−f2)/f3 = 1.00

Figure 17A:
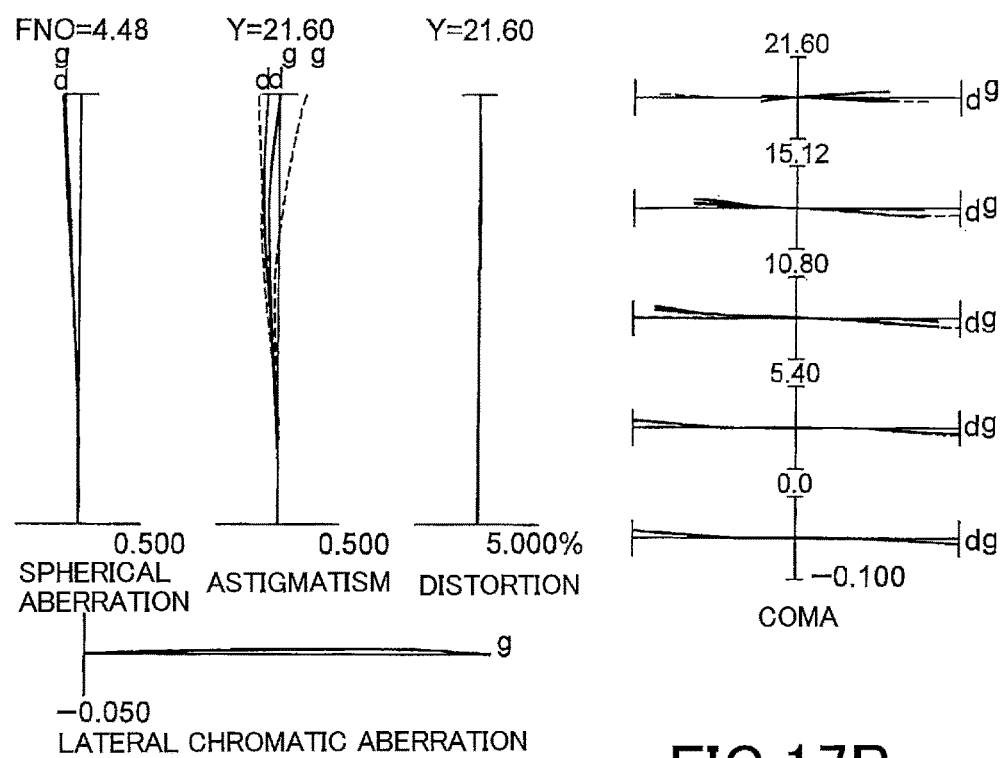
Figure 17B:
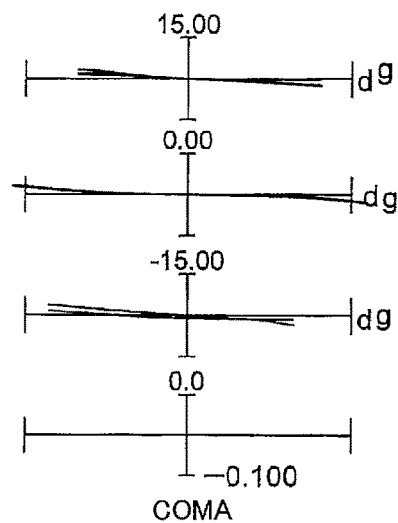
Figure 18:
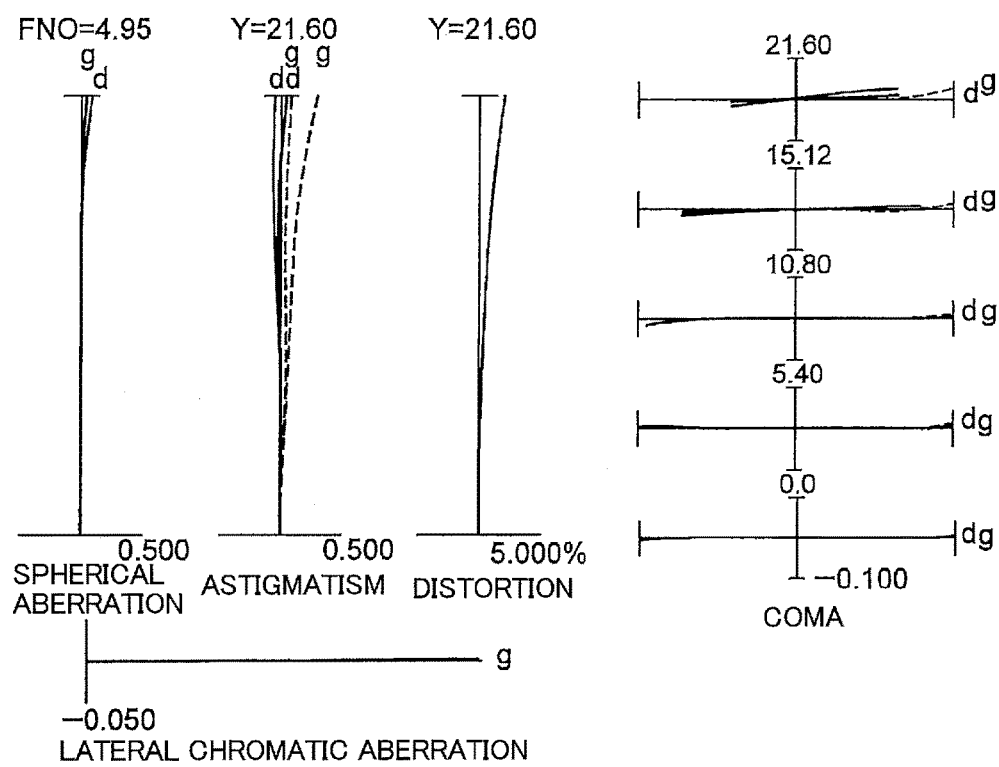
FIG. 18 is graphs showing various aberrations in the intermediate focal length state of the variable magnification optical system according to the Fourth Example.
Figure 19A:
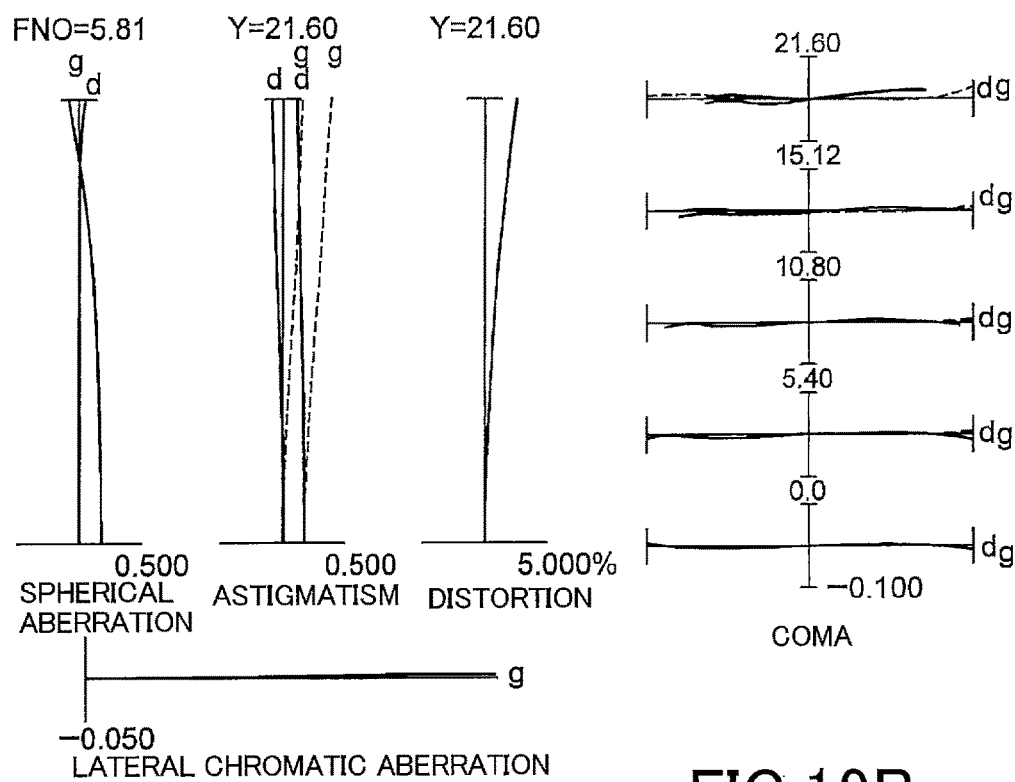
Figure 19B:
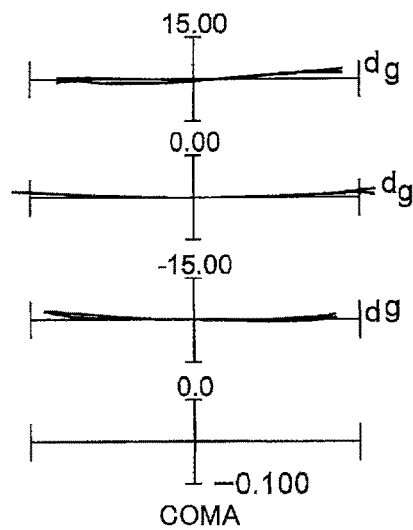
Figure 20A:
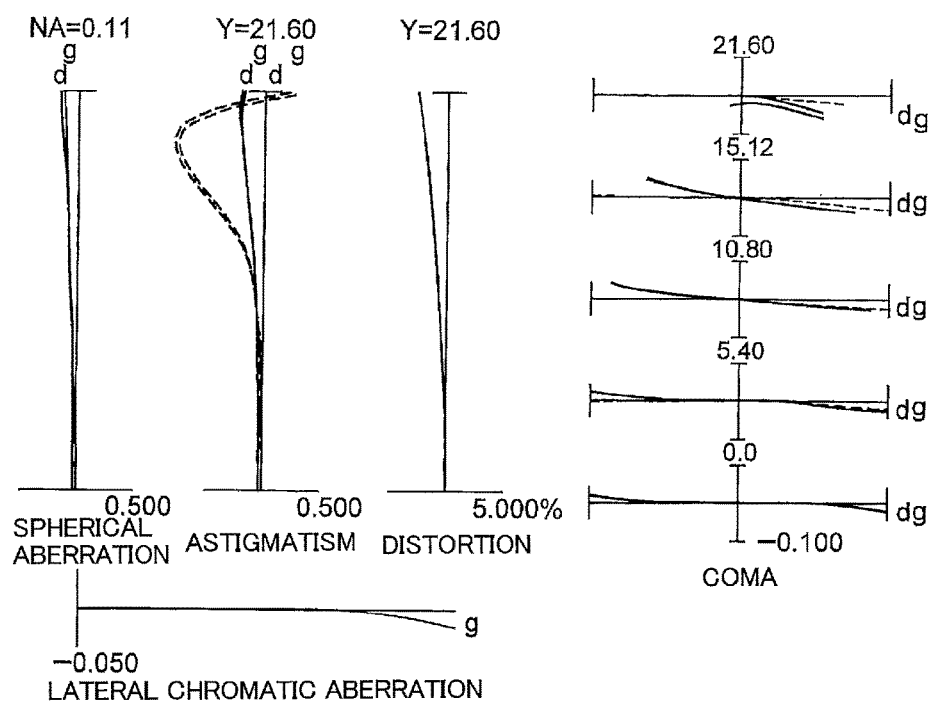
Figure 20B:
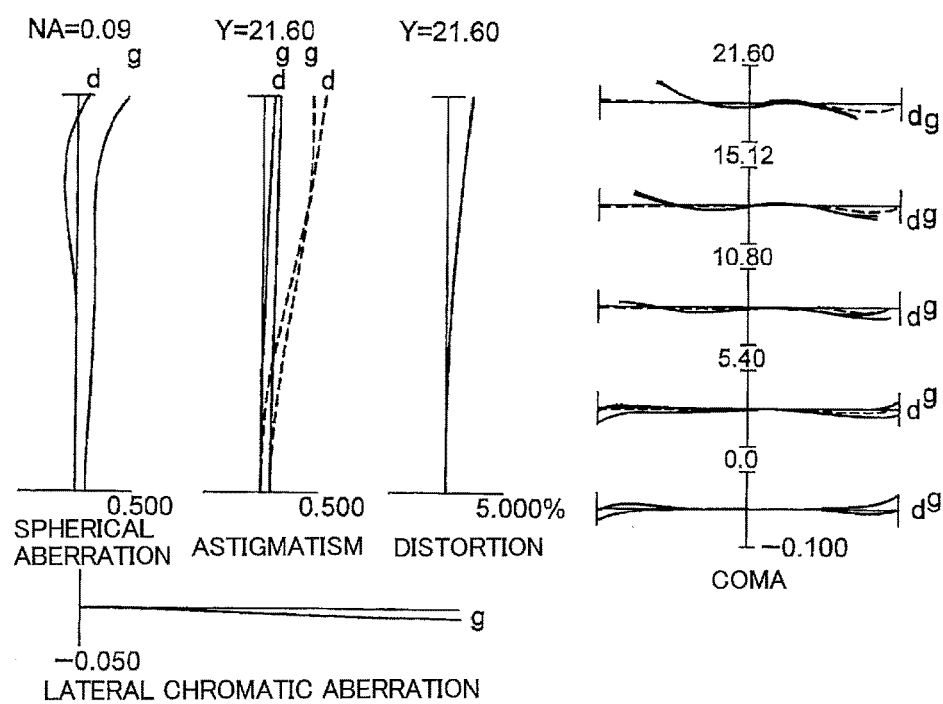

FIG. 17A is graphs showing various aberrations upon focusing on an infinite distance object in the wide angle end state of the Fourth Example. FIG. 17B is a graph showing an aberration when correction of image blur is conducted (a shift amount of the vibration lens group is 0.38) upon focusing on an infinite distance object in the wide angle end state of the Fourth Example. FIG. 18 is graphs showing various aberrations upon focusing on an infinite distance object in the intermediate focal length state of the Fourth Example. FIG. 19A is graphs showing various aberrations upon focusing on an infinite distance object in the telephoto end state of the Fourth Example. FIG. 19B is a graph showing an aberration when correction of image blur is conducted (a shift amount of the vibration lens group is 0.25) upon focusing on an infinite distance object in the telephoto end state of the Fourth Example. FIG. 20A is graphs showing various aberrations upon focusing on a close distance object in the wide angle end state of the Fourth Example, and FIG. 20B is graphs showing various aberrations upon focusing on a close distance object in the telephoto end state of the Fourth Example.

As is apparent from the above-mentioned graphs showing aberrations, the various aberrations including spherical aberration and comma aberration are corrected superbly in the variable magnification system relating to the Fourth Example.

Fifth Example

Figure 21:
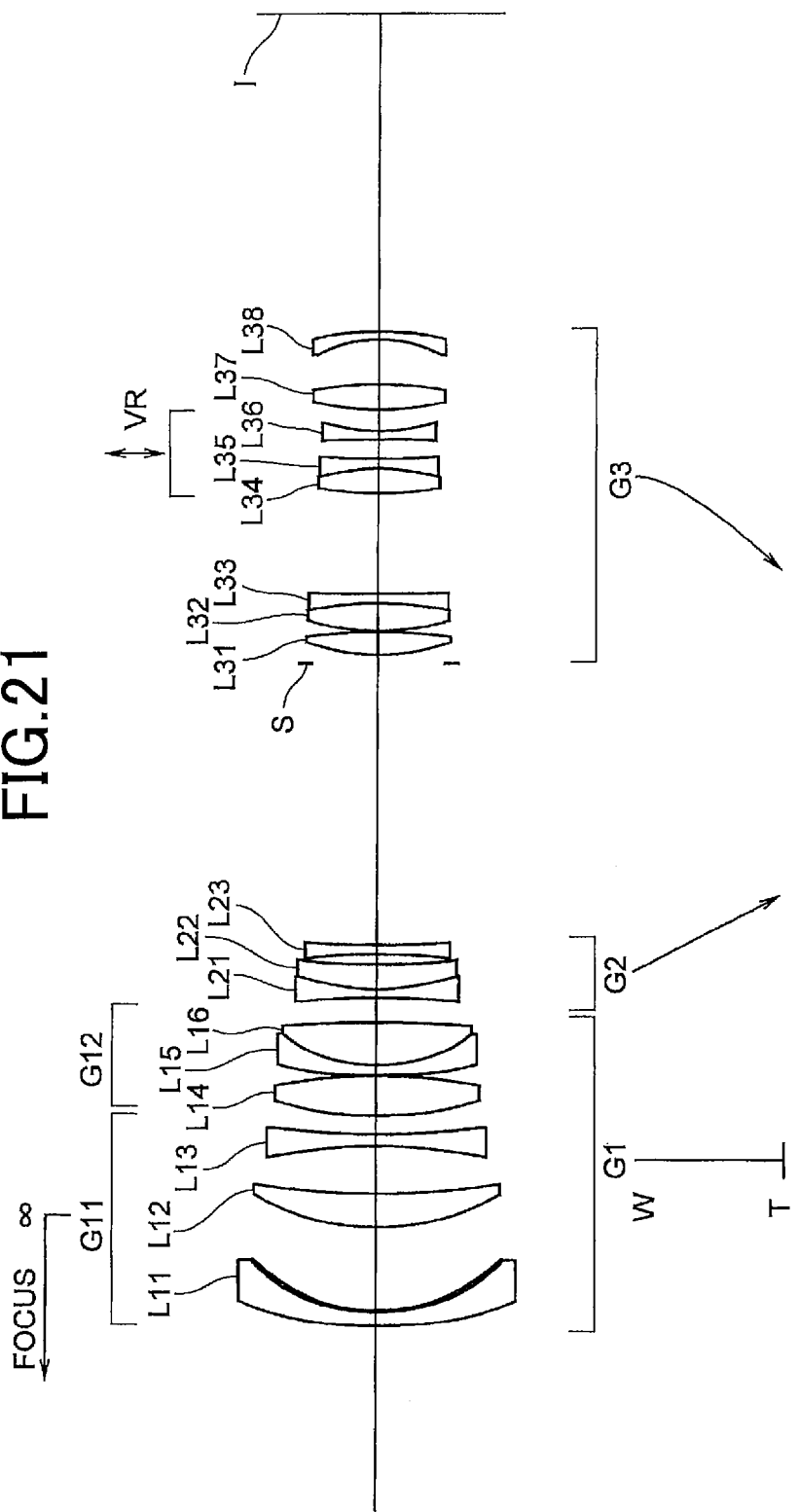
FIG. 21 is a sectional view showing a lens configuration of a variable magnification optical system according to a Fifth Example that is common to the first and the second embodiments of the present application.

FIG. 21 is a sectional view showing a configuration of a variable magnification optical system according to a Fifth Example that is common to the first and the second embodiments of the present application.

The variable magnification optical system according to the Fifth Example is composed of, in order from an object side along the optical axis, a first lens group G1 having positive refractive power, a second lens group G2 having negative refractive power and a third lens group G3 having positive refractive power.

The first lens group G1 is composed of a front group G11 having negative refractive power and a rear group G12 having positive refractive power. The front group G11 is composed of, in order from the object side, a negative meniscus lens L11 having a convex surface facing the object, a positive meniscus lens L12 having a convex surface facing the object, and a double concave lens L13. The rear group G12 is composed of a double convex lens L14 and a cemented lens constructed by a negative meniscus lens L15 having a convex surface facing the object cemented with a double convex lens L16. The negative meniscus lens L11 is an aspherical lens in which an aspherical surface is formed on a resin layer disposed on the image side lens surface. The double concave lens L13 is an aspherical lens in which an aspherical surface is formed on a resin layer disposed on the object side lens surface. The object side surface of the double convex lens L14 is an aspherical surface.

The second lens group G2 is composed of, in order from the object side, a cemented lens constructed by a double concave lens L21 cemented with a positive meniscus lens L22 having a convex surface facing the object, and a double concave lens L23.

The third lens group G3 is composed of, in order from the object side, a double convex lens L31, a cemented lens constructed by a double convex lens L32 cemented with a double concave lens L33, a cemented lens constructed by a double convex lens L34 cemented with a double concave lens L35, a double concave lens L36, a double convex lens L37, and a negative meniscus lens L38 having a concave surface facing the object.

Correction of displacement of an imaging position caused by a camera shake or the like is carried out by moving the double convex lens L34, the double concave lens L35 and the double concave lens L36 in a direction having a directional component perpendicular to the optical axis as a vibration reduction lens group.

Upon varying magnification from the wide angle end state to the telephoto end state, the first lens group G1 is fixed, and the second lens group G2 is moved toward the image side and the third lens group G3 is moved toward the object such that an interval between the first lens group G1 and the second lens group G2 increases and an interval between the second lens group G2 and the third lens group G3 decreases. An aperture stop S is disposed between the second lens group G2 and the third lens group G3, and moved toward the object together with the third lens group G3 upon varying magnification from the wide angle end state to the telephoto end state.

Focusing from an infinite distance object to a close distance object is carried out by extending the front group G11 in the first lens group G1, that is, the negative meniscus lens L11, the positive meniscus lens L12 and the double concave lens L13 toward the object.

Meanwhile, in a lens of which the entire system has a focal length of f and of which a vibration reduction coefficient, that is, a ratio of a moving amount of an image on the image plane to that of a moving lens group upon correcting a camera shake, of K, in order to correct rotational camera shake of an angle θ, the vibration reduction lens group for correcting the camera shake may be moved by the amount of (f×tan θ/K) perpendicularly to the optical axis. In the Fifth Example, the vibration reduction coefficient in the wide angle end state is −1.51 and the vibration reduction coefficient in the telephoto end state is −2.04.

Table 5 below shows various values of the variable magnification optical system relating to the Fifth Example.

TABLE 5

Fifth Example

[Surface Data]

| m | r | d | nd | νd |
|---|---|---|---|---|
| OP | ∞ | ∞ | | |
| 1 | 58.37 | 1.77 | 1.58913 | 61.22 |
| 2 | 25.55 | 0.14 | 1.56093 | 36.64 |
| 3* | 22.64 | 10.45 | | |
| 4 | 33.65 | 4.20 | 1.78472 | 25.64 |
| 5 | 108.02 | 5.95 | | |
| 6* | −72.08 | 0.14 | 1.56093 | 36.64 |
| 7 | −71.27 | 1.26 | 1.80100 | 34.92 |
| 8 | 110.38 | 2.30 | | |
| 9* | 44.75 | 4.90 | 1.62299 | 58.12 |
| 10 | −86.43 | 0.07 | | |
| 11 | 68.16 | 1.29 | 1.79504 | 28.69 |
| 12 | 22.79 | 5.25 | 1.56883 | 56.00 |
| 13 | −263.29 | d13 | | |
| 14 | −113.39 | 1.01 | 1.69680 | 55.52 |
| 15 | 33.66 | 3.15 | 1.80809 | 22.74 |
| 16 | 86.78 | 1.26 | | |
| 17 | −92.18 | 1.01 | 1.59319 | 67.90 |
| 18 | 88.17 | d18 | | |
| 19 | ∞ | 1.05 | Aperture stop S | |
| 20 | 32.69 | 2.80 | 1.49782 | 82.57 |
| 21 | −76.88 | 0.07 | | |
| 22 | 34.97 | 3.50 | 1.49782 | 82.57 |
| 23 | −47.10 | 0.99 | 1.90200 | 25.26 |
| 24 | 171.30 | 12.37 | | |
| 25 | 45.45 | 3.15 | 1.90200 | 25.26 |
| 26 | −29.37 | 1.05 | 1.74100 | 52.77 |
| 27 | 75.50 | 2.46 | | |
| 28 | −142.87 | 1.05 | 2.00069 | 25.46 |
| 29 | 28.85 | 2.52 | | |
| 30 | 41.95 | 3.15 | 1.85026 | 32.35 |
| 31 | −51.42 | 5.44 | | |
| 32 | −19.72 | 0.99 | 1.79504 | 28.69 |
| 33 | −41.86 | BF | | |
| I | ∞ | | | |

TABLE 5-continued

Fifth Example

[Aspherical Data]

Third Surface

κ = 0.0000
A4 = 4.66545E−06
A6 = 2.95477E−10
A8 = −1.58425E−12
A10 = 3.14972E−16

Sixth Surface

κ = 0.0000
A4 = −6.85860E−07
A6 = −9.09798E−10
A8 = −7.61112E−12
A10 = 1.75584E−14

Ninth Surface

κ = 0.0000
A4 = −9.29035E−07
A6 = −1.42403E−10
A8 = 3.68200E−12
A10 = −6.17569E−15

[Various Data]

| | W | T |
|---|---|---|
| f = | 51.6-120.0 | |
| FNO = | 4.50-5.68 | |
| Y = | 14.25-14.25 | |
| 2ω = | 31.9-13.77 | |
| TL = | 161.31-161.31 | |

| | W | M | T |
|---|---|---|---|

[Variable Interval Data Upon Infinite Distance Imaging]

| f | 51.6 | 75.0 | 120.0 |
|---|---|---|---|
| d8 | 2.30 | 2.30 | 2.30 |
| d13 | 3.13 | 11.86 | 20.49 |
| d18 | 34.86 | 19.77 | 0.98 |
| BF | 38.56 | 44.93 | 55.08 |

[Variable Interval Data Upon Closest Distance Imaging]

| β | −0.39 | −0.56 | −0.90 |
|---|---|---|---|
| d8 | 27.65 | 27.65 | 27.65 |
| d13 | 3.13 | 11.86 | 20.49 |
| d18 | 34.86 | 19.77 | 0.98 |
| BF | 38.56 | 44.93 | 55.08 |
| R | 370.00 | 370.00 | 370.00 |

[Lens Group Data]

| | ST | f |
|---|---|---|
| G1 | 1 | 85.58 |
| G2 | 14 | −38.79 |
| G3 | 20 | 40.84 |

[Values for Conditional Expressions]

(1-1) f1/(−f11) = 1.47
(1-2) f1/(−f1F) = 1.32
(1-3) (−f2)/f3 = 0.95
(2-1) df/D1 = 0.40
(2-2) f1/(−f11) = 1.47
(2-3) f1/(−f1F) = 1.32
(2-4) (−f2)/f3 = 0.95

Figure 22A:
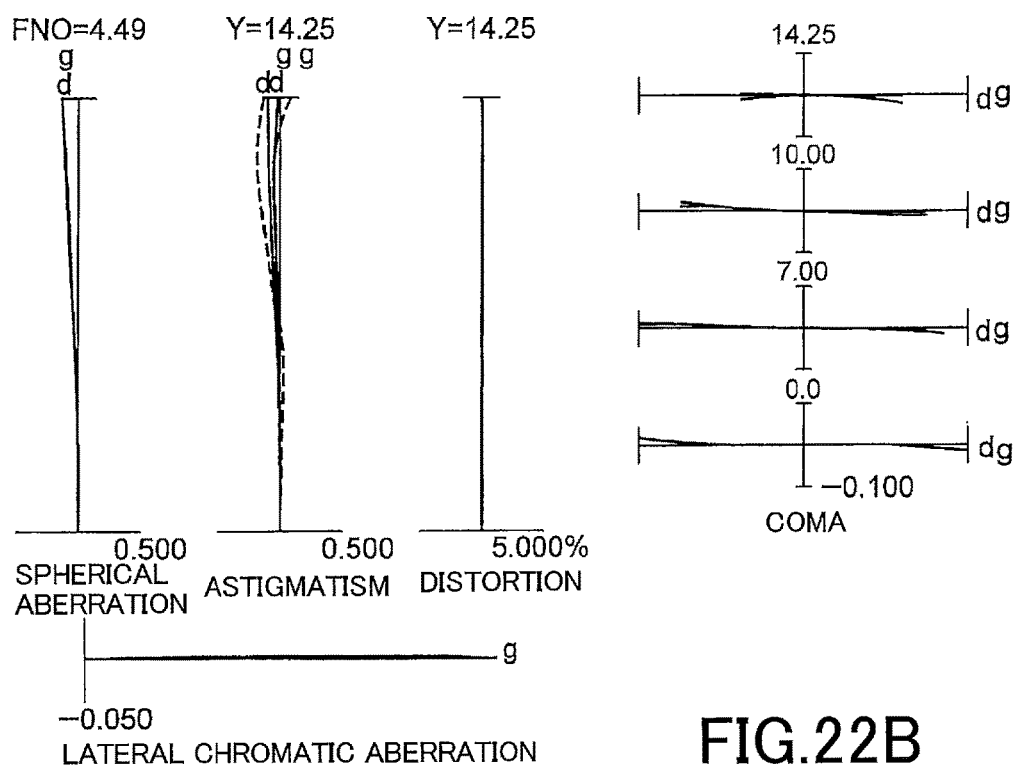
Figure 22B:
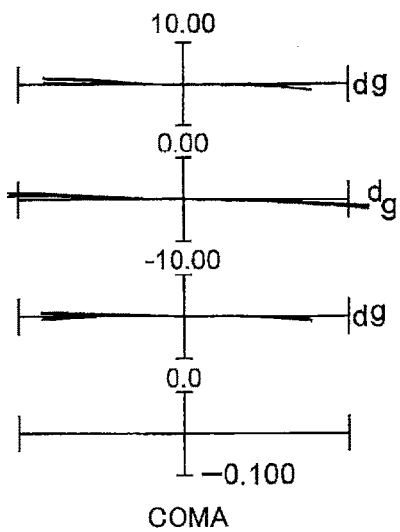
Figure 23:
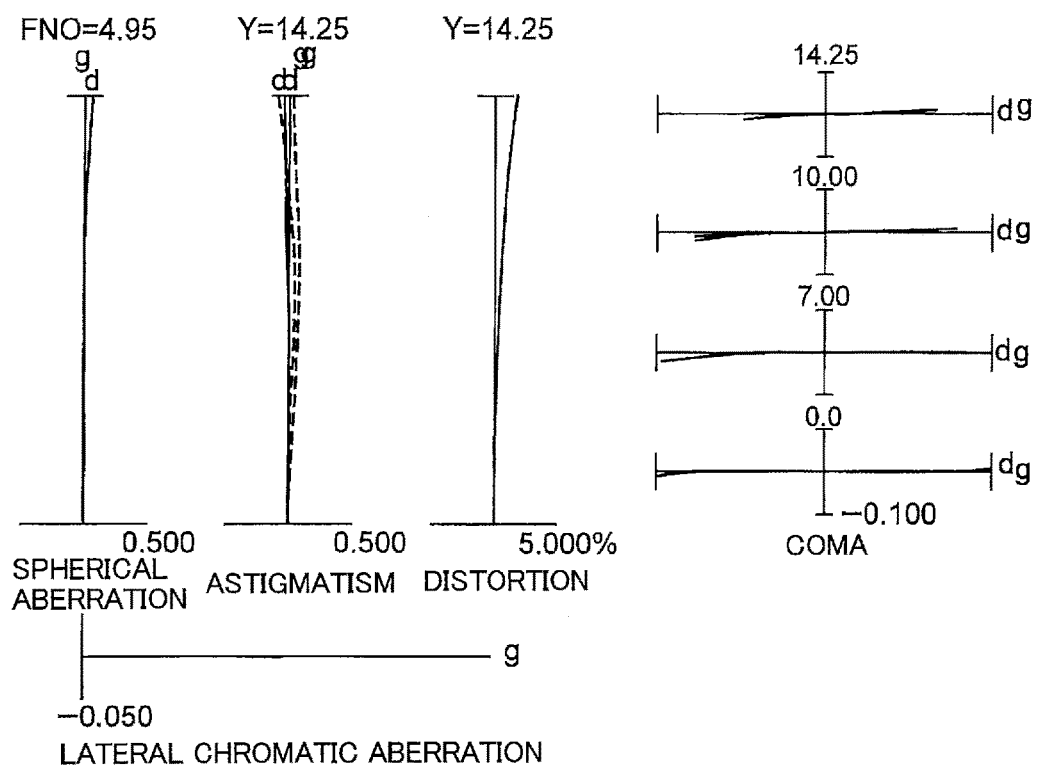
FIG. 23 is graphs showing various aberrations in the intermediate focal length state of the variable magnification optical system according to the Fifth Example.
Figure 24A:
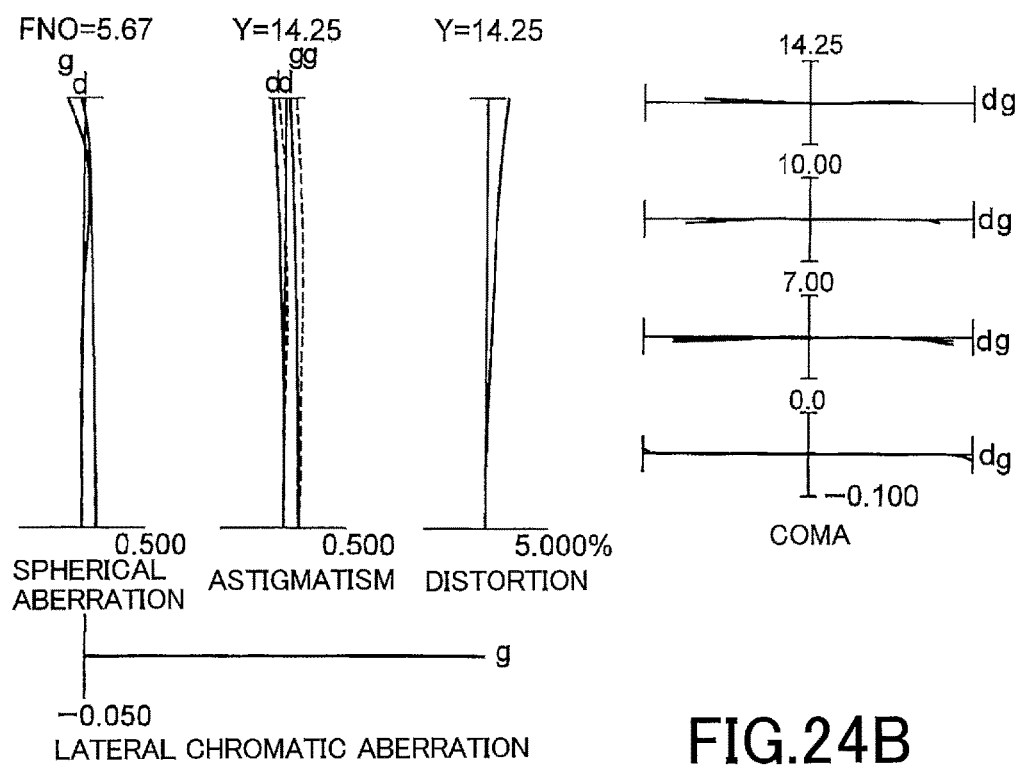
Figure 24B:
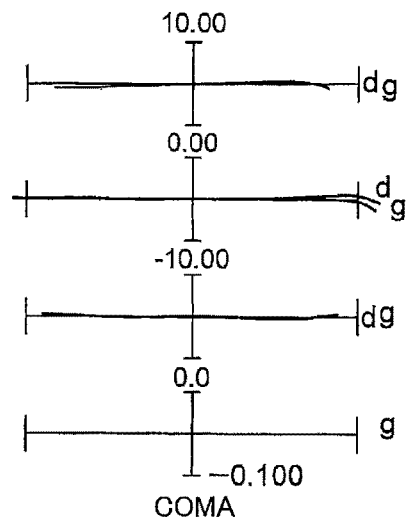
Figure 25A:
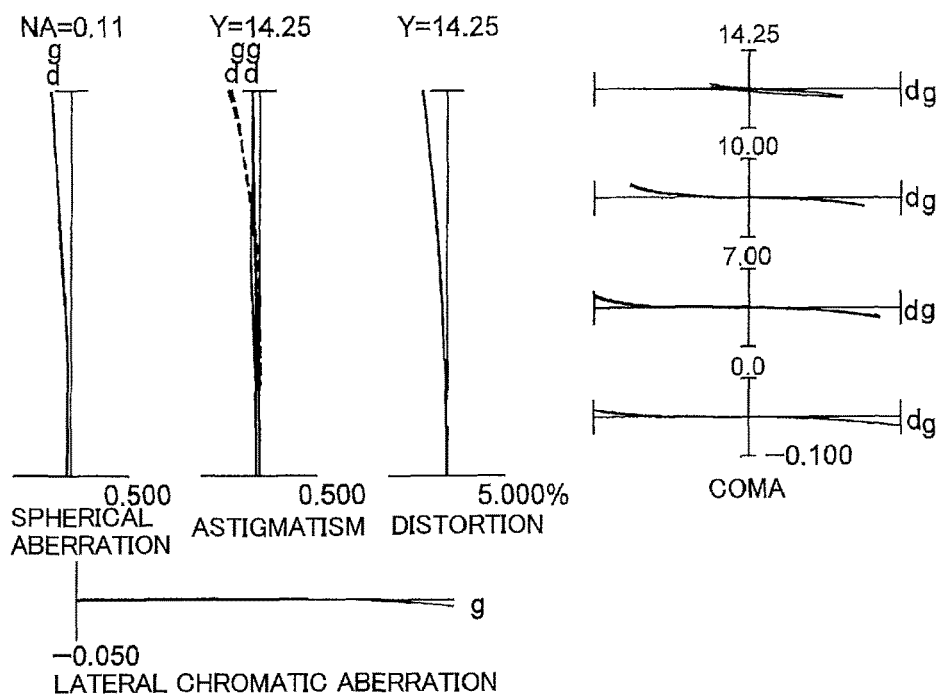
Figure 25B:
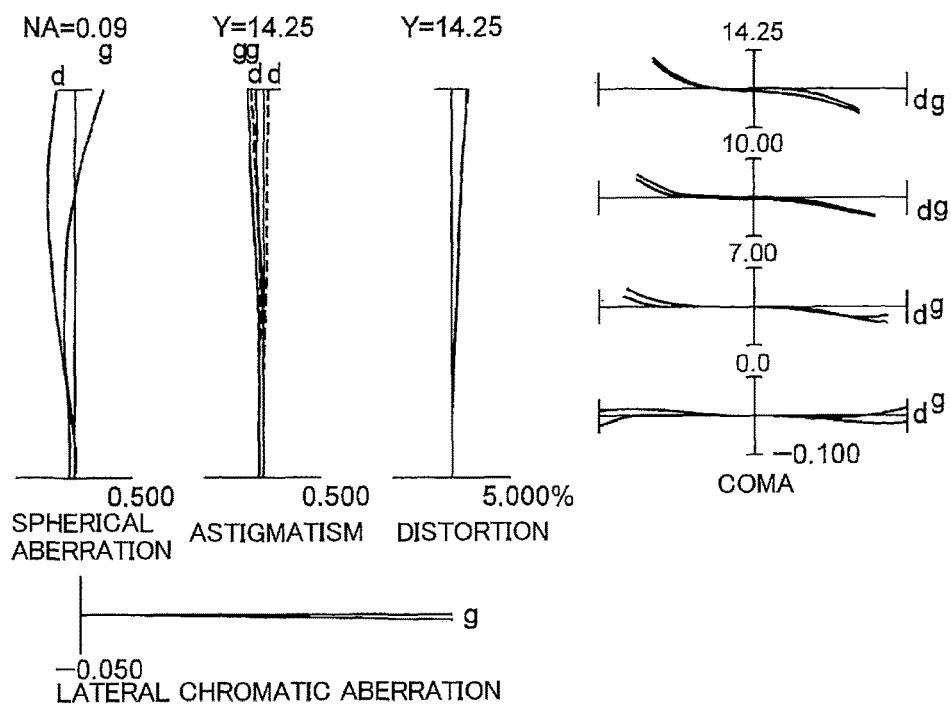

FIG. 22A is graphs showing various aberrations upon focusing on an infinite distance object in the wide angle end state of the Fifth Example. FIG. 22B is a graph showing an aberration when correction of image blur is conducted (a shift amount of the vibration lens group is 0.38) upon focusing on an infinite distance object in the wide angle end state of the Fifth Example. FIG. 23 is graphs showing various aberrations upon focusing on an infinite distance object in the intermediate focal length state of the Fifth Example. FIG. 24A is graphs showing various aberrations upon focusing on an infinite distance object in the telephoto end state of the Fifth Example. FIG. 24B is a graph showing an aberration when correction of image blur is conducted (a shift amount of the vibration lens group is 0.25) upon focusing on an infinite distance object in the telephoto end state of the Fifth Example. FIG. 25A is graphs showing various aberrations upon focusing on a close distance object in the wide angle end state of the Fifth Example, and FIG. 25B is graphs showing various aberrations upon focusing on a close distance object in the telephoto end state of the Fifth Example.

As is apparent from the above-mentioned graphs showing aberrations, the various aberrations including spherical aberration and comma aberration are corrected superbly in the variable magnification system relating to the Fifth Example.

Sixth Example

Figure 26:
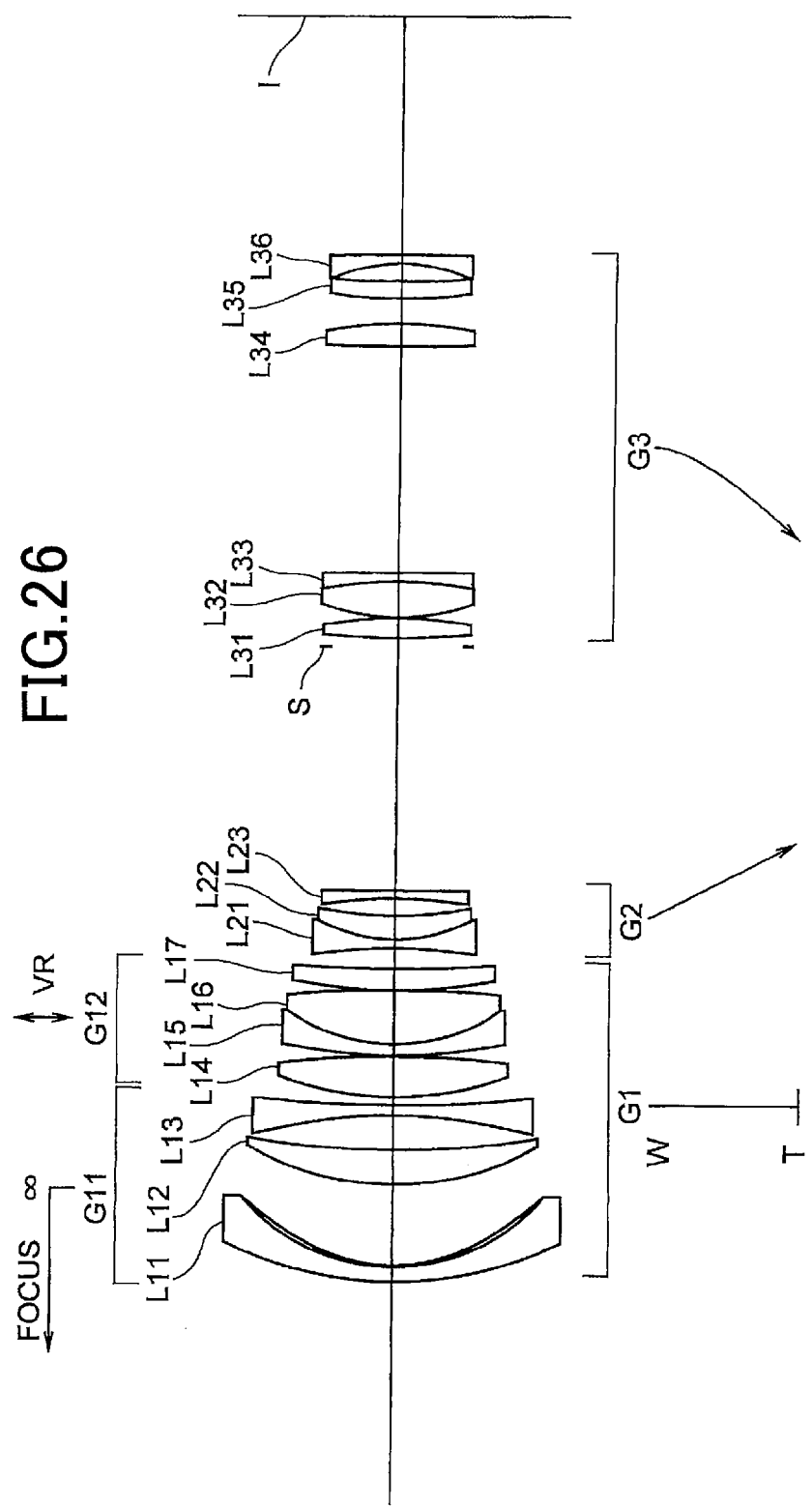
FIG. 26 is a sectional view showing a lens configuration of a variable magnification optical system according to a Sixth Example that is common to the first and the second embodiments of the present application.

FIG. 26 is a sectional view showing a configuration of a variable magnification optical system according to a Sixth Example that is common to the first and the second embodiments of the present application.

The variable magnification optical system according to the Sixth Example is composed of, in order from an object side along the optical axis, a first lens group G1 having positive refractive power, a second lens group G2 having negative refractive power and a third lens group G3 having positive refractive power.

The first lens group G1 is composed of a front group G11 having negative refractive power and a rear group G12 having positive refractive power. The front group G11 is composed of, in order from the object side, a negative meniscus lens L11 having a convex surface facing the object, a positive meniscus lens L12 having a convex surface facing the object, and a double concave lens L13. The rear group G12 is composed of a double convex lens L14, a cemented lens constructed by a negative meniscus lens L15 having a convex surface facing the object cemented with a double convex lens L16, and a positive meniscus lens L17 having a convex surface facing the object. The negative meniscus lens L11 is an aspherical lens in which an aspherical surface is formed on a resin layer disposed on the image side lens surface. The double concave lens L13 is an aspherical lens in which an aspherical surface is formed on a resin layer disposed on the object side lens surface. The object side surface of the double convex lens L14 is an aspherical surface.

The second lens group G2 is composed of, in order from the object side, a cemented lens constructed by a double concave lens L21 cemented with a positive meniscus lens L22 having a convex surface facing the object, and a negative meniscus lens L23 having a concave surface facing the object.

The third lens group G3 is composed of, in order from the object side, a double convex lens L31, a cemented lens constructed by a double convex lens L32 cemented with a negative meniscus lens L33 having a concave surface facing the object, a double convex lens L34, a positive meniscus lens L35 having a convex surface facing the object, and a negative meniscus lens L36 having a concave surface facing the object.

Correction of displacement of an imaging position caused by a camera shake or the like is carried out by moving the rear group G12, that is, the double convex lens L14, the negative meniscus lens L15, the double convex lens L16 and the positive meniscus lens L17 in a direction having a directional component perpendicular to the optical axis as a vibration reduction lens group.

Upon varying magnification from the wide angle end state the telephoto end state, the first lens group G1 is fixed, and the second lens group G2 is moved toward the image side and the third lens group G3 is moved toward the object such that an interval between the first lens group G1 and the second lens group G2 increases and an interval between the second lens group G2 and the third lens group G3 decreases. An aperture stop S is disposed between the second lens group G2 and the third lens group G3, and moved toward the object together with the third lens group G3 upon varying magnification from the wide angle end state to the telephoto end state.

Focusing from an infinite distance object to a close distance object is carried out by extending the front group G11 in the first lens group G1, that is, the negative meniscus lens L11, the positive meniscus lens L12 and the double concave lens L13 toward the object.

Meanwhile, in a lens of which the entire system has a focal length of f and of which a vibration reduction coefficient, that is, a ratio of a moving amount of an image on the image plane to that of a moving lens group upon correcting a camera shake, of K, in order to correct rotational camera shake of an angle θ, the vibration reduction lens group for correcting the camera shake may be moved by the amount of (f×tan θ/K) perpendicularly to the optical axis. In the Sixth Example, the vibration reduction coefficient in the wide angle end state is 1.43 and the vibration reduction coefficient in the telephoto end state is 3.42.

Table 6 below shows various values of the variable magnification optical system relating to the Sixth Example.

TABLE 6

Sixth Example

[Surface Data]

| m | r | d | nd | vd |
|---|---|---|---|---|
| OP | ∞ | ∞ | | |
| 1 | 68.60 | 2.53 | 1.58913 | 61.22 |
| 2 | 35.80 | 0.20 | 1.56093 | 36.78 |
| 3* | 32.34 | 13.85 | | |
| 4 | 52.37 | 6.00 | 1.80518 | 25.45 |
| 5 | 144.78 | 5.73 | | |
| 6* | −102.97 | 0.20 | 1.56093 | 36.78 |
| 7 | −101.81 | 1.80 | 1.80100 | 34.92 |
| 8 | 280.66 | 1.14 | | |
| 9* | 57.06 | 7.00 | 1.62299 | 58.12 |
| 10 | −203.38 | 0.10 | | |
| 11 | 110.95 | 1.84 | 1.79504 | 28.69 |
| 12 | 33.46 | 9.27 | 1.51680 | 63.88 |
| 13 | −307.44 | 0.10 | | |
| 14 | 105.46 | 3.57 | 1.67003 | 47.14 |
| 15 | 266.50 | d15 | | |
| 16 | −107.44 | 1.45 | 1.69680 | 55.52 |
| 17 | 28.18 | 4.03 | 1.80809 | 22.74 |
| 18 | 55.52 | 3.00 | | |
| 19 | −97.19 | 1.45 | 1.62299 | 58.12 |
| 20 | −1286.06 | d20 | | |
| 21 | ∞ | 1.50 | Aperture stop S | |
| 22 | 139.85 | 3.23 | 1.49782 | 82.57 |
| 23 | −81.58 | 0.10 | | |
| 24 | 40.98 | 6.05 | 1.49782 | 82.57 |
| 25 | −86.02 | 1.41 | 1.90200 | 25.28 |

TABLE 6-continued

Sixth Example

| | | | | |
|---|---|---|---|---|
| 26 | −1151.85 | 38.13 | | |
| 27 | 369.17 | 3.73 | 1.75520 | 27.57 |
| 28 | −93.42 | 4.11 | | |
| 29 | 86.11 | 3.02 | 1.51680 | 63.88 |
| 30 | 203.60 | 2.98 | | |
| 31 | −33.74 | 1.41 | 1.77250 | 49.62 |
| 32 | −564.45 | BF | | |
| I | ∞ | | | |

[Aspherical Data]

Third Surface

κ = 0.0000
A4 = 1.74289E−06
A6 = 2.00431E−10
A8 = 5.51463E−13
A10 = −4.96767E−16

Sixth Surface

κ = 0.0000
A4 = −3.26357E−08
A6 = −1.38284E−10
A8 = 4.82201E−13
A10 = −5.68295E−16

Ninth Surface

κ = 0.0000
A4 = 1.19375E−07
A6 = 1.02375E−10
A8 = −1.30460E−13
A10 = 6.50329E−17

[Various Data]

| | W | T |
|---|---|---|
| f = | 51.6–120.0 | |
| FNO = | 4.50–5.79 | |
| Y = | 21.60–21.60 | |
| 2ω = | 33.5–14.1 | |
| TL = | 213.54–213.54 | |

| | W | M | T |
|---|---|---|---|
| [Variable Interval Data Upon Focusing On Infinite Distance Object] | | | |
| f | 71.8 | 105.0 | 171.0 |
| d8 | 1.14 | 1.14 | 1.14 |
| d15 | 3.41 | 11.93 | 21.27 |
| d20 | 41.25 | 23.90 | 1.45 |
| BF | 39.96 | 48.79 | 61.90 |
| [Variable Interval Data Upon Closest Distance Imaging] | | | |
| β | −0.32 | −0.46 | −0.75 |
| d8 | 47.89 | 47.89 | 47.89 |
| d15 | 3.41 | 11.93 | 21.27 |
| d20 | 41.25 | 23.90 | 1.45 |
| BF | 39.96 | 48.79 | 61.90 |
| R | 370.00 | 370.00 | 370.00 |

[Lens Group Data]

| | ST | f |
|---|---|---|
| G1 | 1 | 97.31 |
| G2 | 16 | −42.52 |
| G3 | 22 | 48.47 |

[Values for Conditional Expressions]

(1-1) f1/(−f11) = 0.94
(1-2) f1/(−f1F) = 0.90
(1-3) (−f2)/f3 = 0.88
(2-1) df/D1 = 0.33
(2-2) f1/(−f11) = 0.94

TABLE 6-continued

Sixth Example (2-3) f1/(−f1F) = 0.90
(2-4) (−f2)/f3 = 0.88

Figure 27A:
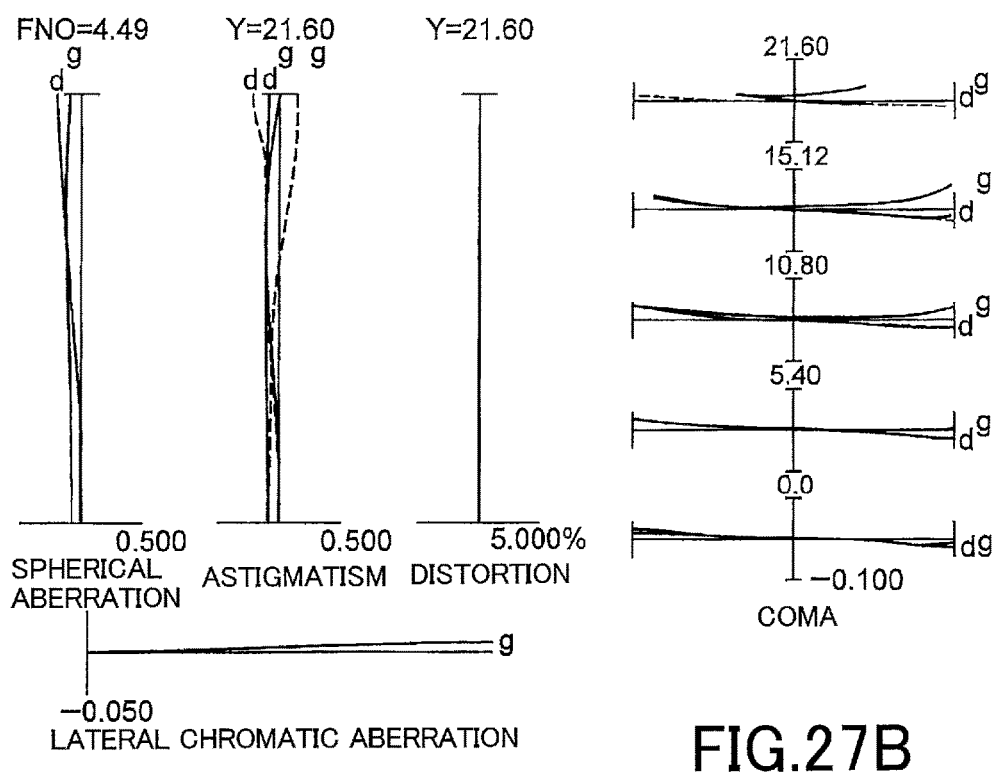
Figure 27B:
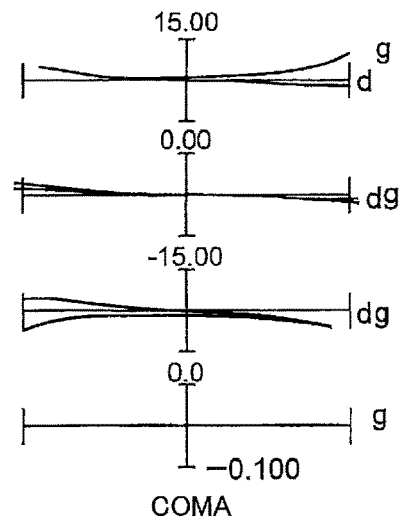
Figure 28:
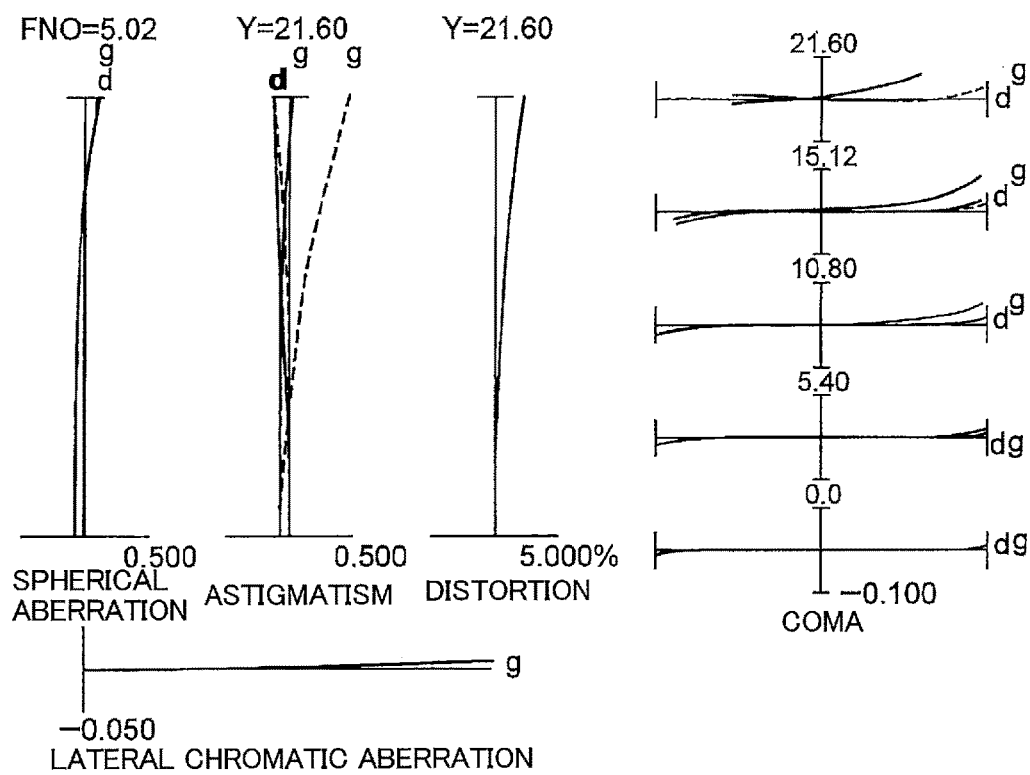
FIG. 28 is graphs showing various aberrations in the intermediate focal length state of the variable magnification optical system according to the Sixth Example.
Figure 29A:
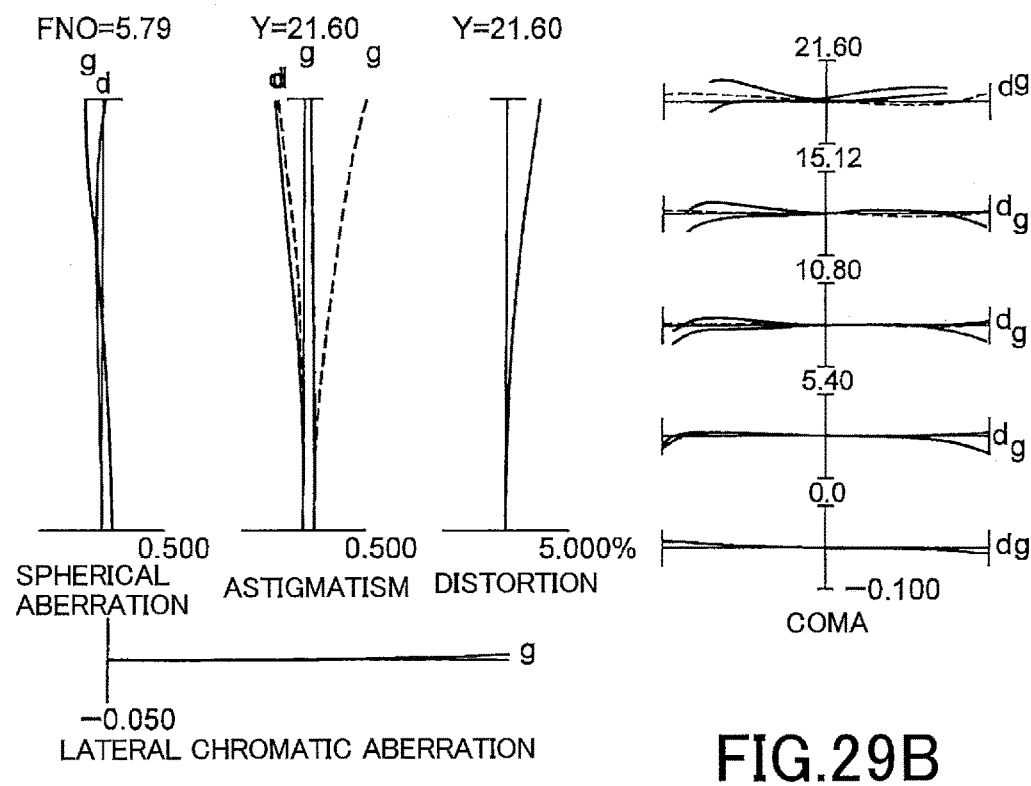
Figure 29B:
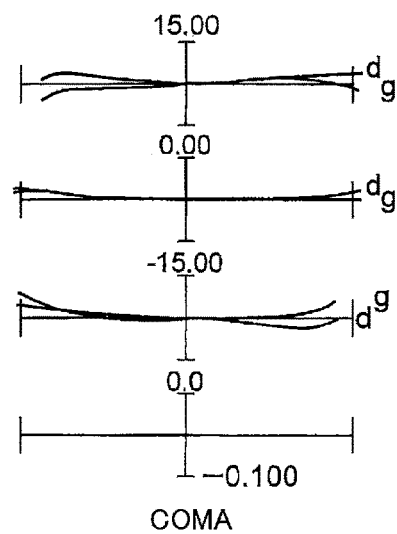
Figure 30A:
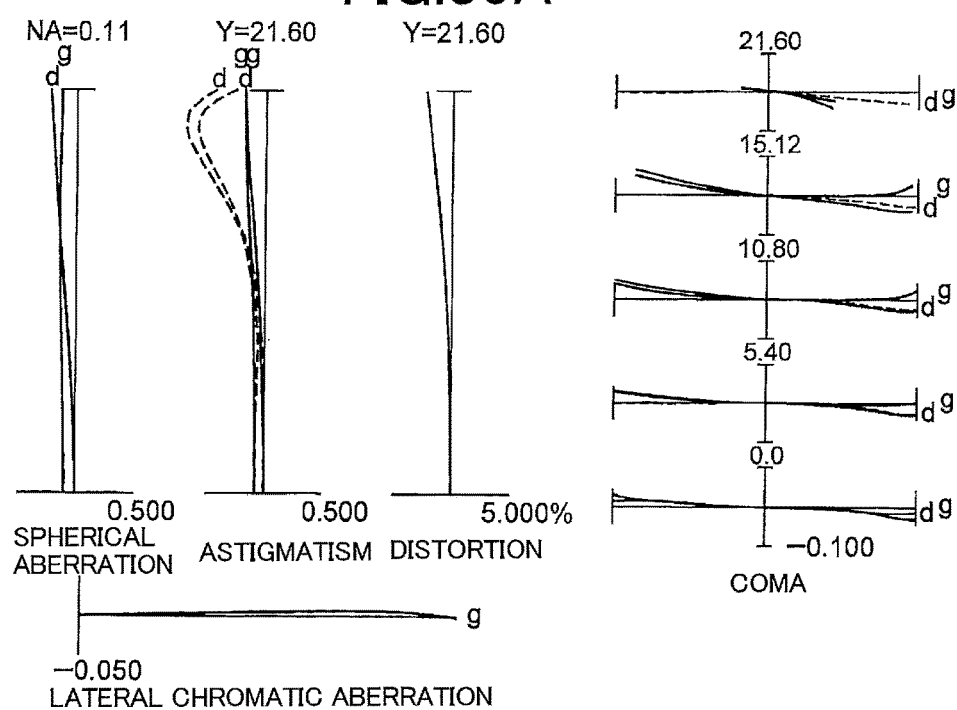
Figure 30B:
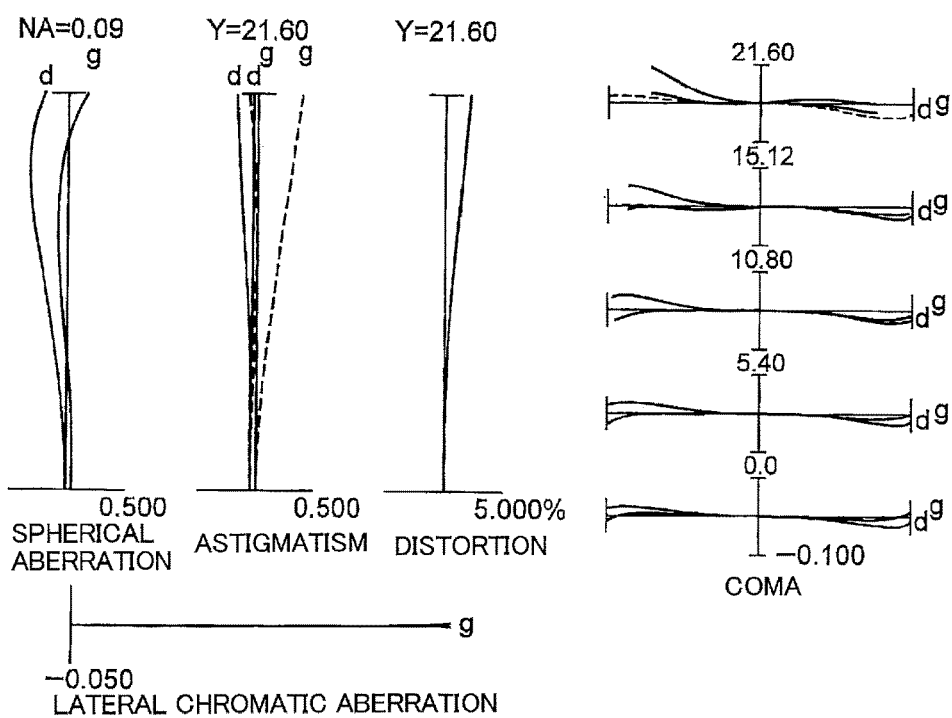

FIG. 27A is graphs showing various aberrations upon focusing on an infinite distance object in the wide angle end state of the Sixth Example. FIG. 27B is a graph showing an aberration when correction of image blur is conducted (a shift amount of the vibration lens group is 0.24) upon focusing on an infinite distance object in the wide angle end state of the Sixth Example. FIG. 28 is graphs showing various aberrations upon focusing on an infinite distance object in the intermediate focal length state of the Sixth Example. FIG. 29A is graphs showing various aberrations upon focusing on an infinite distance object in the telephoto end state of the Sixth Example. FIG. 29B is a graph showing an aberration when correction of image blur is conducted (a shift amount of the vibration lens group is 0.16) upon focusing on an infinite distance object in the telephoto end state of the Sixth Example. FIG. 30A is graphs showing various aberrations upon focusing on a close distance object in the wide angle end state of the Sixth Example, and FIG. 30B is graphs showing various aberrations upon focusing on a close distance object in the telephoto end state of the Sixth Example.

As is apparent from the above-mentioned graphs showing aberrations, the various aberrations including spherical aberration and comma aberration are corrected superbly in the variable magnification system relating to the Sixth Example.

Seventh Example

FIG. 31 is a sectional view showing a lens configuration of a variable magnification optical system ZL1 according to a Seventh Example relating to the third embodiment of the present application.

As shown in FIG. 31, the variable magnification optical system ZL1 according to the present Example is composed of, in order from an object side along the optical axis, a first lens group G1 having positive refractive power, a second lens group G2 having negative refractive power and a third lens group G3 having positive refractive power.

The first lens group G1 is composed of, in order from an object side along the optical axis, a negative meniscus lens L1 having a convex surface facing the object, a focusing group Gn having negative refractive power upon focusing on an infinite distance object and a part lens group Gp having positive refractive power. The negative meniscus lens L1 is an aspherical compound lens in which an aspherical surface is formed on a resin layer disposed on the image side lens surface.

The focusing group Gn is composed of, in order from the object side along the optical axis, a first part group Gn1 having positive refractive power and a second part group Gn2 having negative refractive power.

The first part group Gn1 is composed of, in order from the object side along the optical axis, a negative meniscus lens L2 having a convex surface facing the object and a positive meniscus lens L3 having a convex surface facing the object. The negative meniscus lens L2 is a glass-molded aspherical lens in which an aspherical surface is formed on the image side lens surface.

The second part group Gn2 is composed of a double concave lens L4. The double concave lens L4 is an aspherical compound lens in which an aspherical surface is formed on a resin layer disposed on the image side lens surface.

The part lens group Gp is composed of, in order from the object side along the optical axis, a double convex lens L5 and a cemented lens constructed by a negative meniscus lens L6 having a convex surface facing the object cemented with a double convex lens L7. The double convex lens L5 is a glass-molded aspherical lens in which an aspherical surface is formed on the object side lens surface.

The second lens group G2 is composed of, in order from the object side along the optical axis, a cemented lens constructed by a double concave lens L8 cemented with a positive meniscus lens L9 having a convex surface facing the object, and a double concave lens L10.

The third lens group G3 is composed of, in order from the object side along the optical axis, an aperture stop S, a double convex lens L11, a cemented lens constructed by a double convex lens L12 cemented with a double concave lens L13, a cemented lens constructed by a double convex lens L14 cemented with a double concave lens L15, a double concave lens L16, a double convex lens L17, and a negative meniscus lens L18 having a convex surface facing the image. The aperture stop S is disposed on the most object side in the third lens group G3 and formed integrally with the third lens group G3.

On the image plane I, an imaging device (not shown) such as a CCD, a CMOS or the like is disposed.

Under the above configuration, in the variable magnification optical system ZL1 according to the present Example, upon varying magnification from the wide angle end state to the telephoto end state, the second lens group G2 and the third lens group G3 are moved along the optical axis relative to the image plane I such that an interval between the first lens group G1 and the second lens group G2 and an interval between the second lens group G2 and the third lens group G3 are varied respectively. In detail, upon varying magnification, the first lens group G1 is fixed relative to the image plane I, the second lens group G2 is moved toward the image side and the third lens group G3 is moved toward the object. Thereby, upon varying magnification from the wide angle end state to the telephoto end state, the interval between the first lens group G1 and the second lens group G2 increases and the interval between the second lens group G2 and the third lens group G3 decreases. The aperture stop S is moved together with the third lens group G3 upon varying magnification from the wide angle end state to the telephoto end state.

In the variable magnification optical system ZL1 according to the present Example, focusing from an infinite distance object to a close distance object is carried out by moving the focusing group Gn toward the object along the optical axis. In detail, focusing from the infinite distance object to the close distance object is carried out by moving the first part group Gn1 and the second part group Gn2 in the focusing group Gn toward the object respectively. As for the movement of the first part group Gn1 and the second part group Gn2 toward the object, the first part group Gn1 is moved faster and the second part group Gn2 is moved to follow the first part group Gn1. Accordingly, while the first part group Gn1 and the second part group Gn2 are moved toward the object, an interval between the first part group Gn1 and the second part group Gn2 increases. Meanwhile, upon focusing, a position in the direction of the optical axis, of the negative meniscus lens L1 disposed on the most object side lens of the first lens group G1 is fixed.

Further, in the variable magnification optical system ZL1 according to the present Example, by moving the cemented lens constructed by the double convex lens L14 cemented with the double concave lens L15 and the double concave lens L16, of the third lens group G3 in a direction having a directional component perpendicular to the optical axis as a vibration reduction lens group, correction of the image plane upon occurrence of image blur, that is, vibration reduction is carried out.

In the variable magnification optical system ZL1, when a focal length of the entire system is "f", a ratio of a moving amount of an image on the image plane I to that of a vibration reduction lens group upon correction of a camera shake is "K" (this ratio is hereinafter referred to as a vibration reduction coefficient K), the vibration reduction lens group may be moved by the amount of (f×tan θ)/K perpendicularly to the optical axis, in order to correct rotational camera shake of an angle θ.

In the variable magnification optical system ZL1, the vibration reduction coefficient K in the wide angle end state is 1.27 and the focal length is 71.8 (mm) (see Table 7 below), so that the moving amount of the vibration reduction lens group for correction of rotational camera shake of 0.385° is 0.38 (mm). Further, the vibration reduction coefficient K in the telephoto end state is 1.73 and the focal length is 171.0 (mm) (see Table 7 below), so that the moving amount of the vibration reduction lens group for correction of rotational camera shake of 0.255° is 0.44 (mm).

TABLE 7

Seventh Example

[Surface Data]

| m | r | d | nd | vd |
|---|---|---|---|---|
| OP | ∞ | | | |
| 1 | 54.01 | 2.36 | 1.48749 | 70.32 |
| 2 | 40.00 | 0.19 | 1.56093 | 36.64 |
| 3* | 36.40 | d3 | | |
| 4 | 55.87 | 2.50 | 1.74400 | 44.80 |
| 5* | 45.63 | 12.66 | | |
| 6 | 44.51 | 4.50 | 1.72825 | 28.38 |
| 7 | 103.98 | d7 | | |
| 8 | −74.23 | 1.40 | 1.69680 | 55.52 |
| 9 | 125.88 | 0.20 | 1.56093 | 36.64 |
| 10* | 91.78 | d10 | | |
| 11* | 72.23 | 6.73 | 1.58913 | 61.22 |
| 12 | −92.51 | 0.10 | | |
| 13 | 132.89 | 1.77 | 1.75520 | 27.57 |
| 14 | 40.03 | 7.21 | 1.58913 | 61.22 |
| 15 | −180.01 | d15 | | |
| 16 | −159.95 | 1.45 | 1.69680 | 55.52 |
| 17 | 49.77 | 4.50 | 1.80809 | 22.74 |
| 18 | 117.07 | 1.91 | | |
| 19 | −133.13 | 1.45 | 1.59319 | 67.90 |
| 20 | 186.48 | d20 | | |
| 21 | ∞ | 1.50 | Aperture stop S | |
| 22 | 47.15 | 5.00 | 1.49782 | 82.57 |
| 23 | −116.11 | 0.10 | | |
| 24 | 50.48 | 5.00 | 1.49782 | 82.57 |
| 25 | −67.03 | 1.41 | 1.90200 | 25.25 |
| 26 | 238.19 | 15.27 | | |
| 27 | 71.21 | 4.50 | 1.90200 | 25.25 |
| 28 | −41.78 | 1.50 | 1.74100 | 52.76 |
| 29 | 99.32 | 4.44 | | |
| 30 | −175.75 | 1.50 | 2.00069 | 25.46 |
| 31 | 45.46 | 4.11 | | |
| 32 | 81.22 | 4.50 | 1.85026 | 32.35 |
| 33 | −76.78 | 10.21 | | |
| 34 | −26.66 | 1.41 | 1.79504 | 28.69 |
| 35 | −40.81 | BF | | |
| I | ∞ | | | |

TABLE 7-continued

Seventh Example

[Aspherical Data]

Third Surface

κ = 0.0000
A4 = 1.62424E−06
A6 = 3.44036E−10
A8 = 2.16092E−13
A10 = −1.37533E−17

Fifth Surface

K = 0.0000
A4 = 7.32547E−07
A6 = 3.50074E−11
A8 = −4.42038E−13
A10 = 2.50901E−16

Tenth Surface

κ = 0.0000
A4 = 3.60670E−07
A6 = 1.59305E−10
A8 = 3.46119E−13
A10 = 1.24755E−15

Eleventh Surface

κ = 0.0000
A4 = −8.49336E−07
A6 = 3.10654E−10
A8 = −8.73527E−14
A10 = −2.93577E−16

[Various Data]

|  | W | T |
|---|---|---|
| f = | 71.8-171.0 | |
| FNO = | 4.5-5.69 | |
| Y = | 21.6-21.6 | |
| 2ω = | 32.8-14.1 | |
| TL = | 272.19-272.19 | |
| BF = | 60.99-87.06 | |

[Variable Interval Data Upon Infinite Distance Imaging]

|  | W | M | T |
|---|---|---|---|
| f | 71.8 | 105.0 | 171.0 |
| d3 | 27.03 | 27.03 | 27.03 |
| d7 | 9.82 | 9.82 | 9.82 |
| d10 | 3.00 | 3.00 | 3.00 |
| d15 | 2.50 | 16.28 | 30.46 |
| d20 | 59.50 | 35.66 | 5.50 |
| BF | 60.99 | 71.06 | 87.06 |

[Variable Interval Data Upon Closest Distance Imaging]

|  | W | M | T |
|---|---|---|---|
| β | −0.29 | −0.43 | −0.70 |
| d3 | 4.58 | 4.58 | 4.58 |
| d7 | 9.82 | 9.82 | 9.82 |
| d10 | 25.45 | 25.45 | 25.45 |
| d15 | 2.50 | 16.28 | 30.46 |
| d20 | 59.50 | 35.66 | 5.50 |
| BF | 60.99 | 71.06 | 87.06 |
| R | 428.00 | 428.00 | 428.00 |

[Lens Group Data]

|  | ST | f |
|---|---|---|
| G1 | 1 | 124.25 |
| G2 | 16 | −58.98 |
| G3 | 21 | 64.46 |

[Values for Conditional Expressions]

(3-1) f1/(−f1n) = 0.99
(3-2) |f1/f1F| = 0.54

TABLE 7-continued

Seventh Example (3-3) (−f1n)/f1p = 2.34
(3-4) f1/f3 = 1.93

FIGS. 32A, 32B and 32C are graphs showing various aberrations of the variable magnification optical system ZL1 according to the Seventh Example upon focusing on an infinite distance object, in which FIG. 32A shows the wide angle end state, FIG. 32B shows the intermediate focal length state, and FIG. 32C shows the telephoto end state.

Figure 33A:
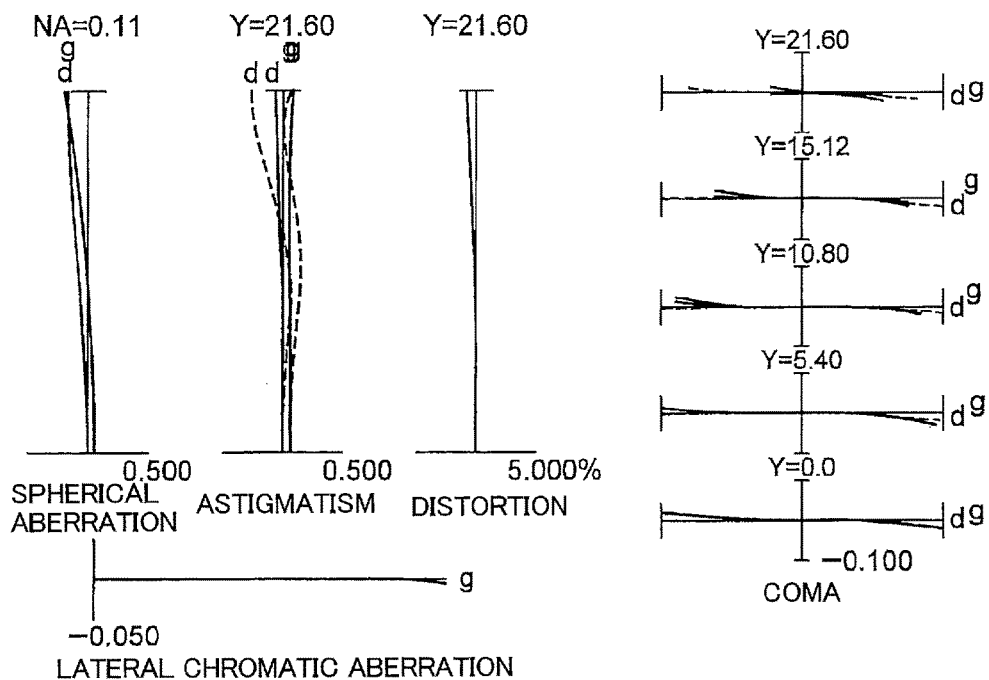
Figure 33B:
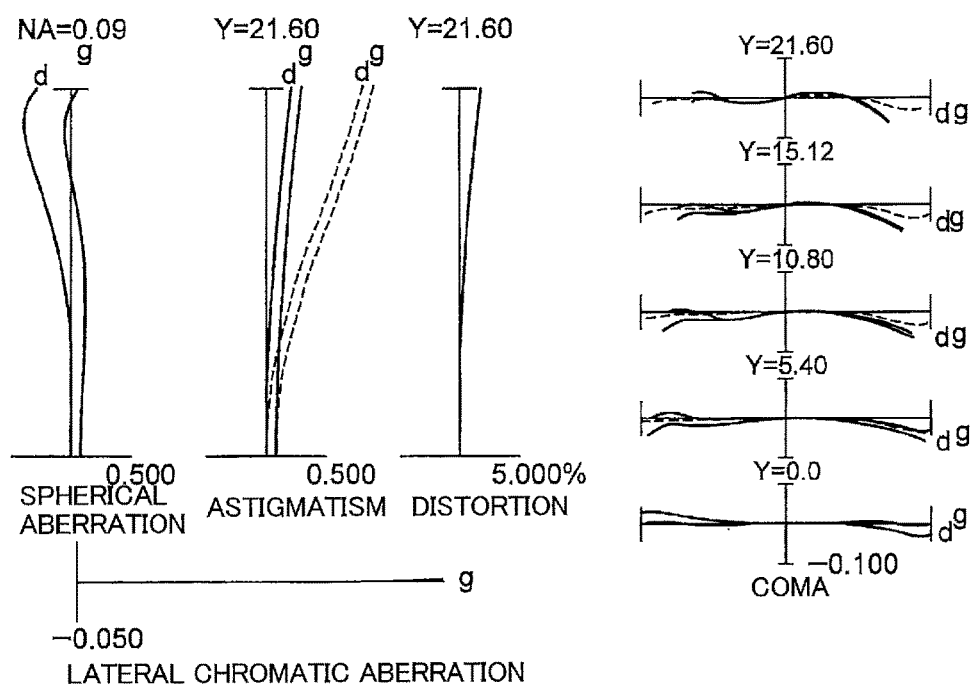

FIGS. 33A and 33B are graphs showing various aberrations of the variable magnification optical system ZL1 according to the Seventh Example upon focusing on a close distance object, in which FIG. 33A shows the wide angle end state and FIG. 33B shows the telephoto end state.

Figure 34A:
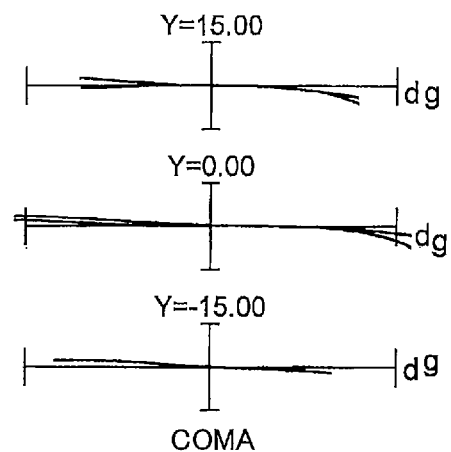
Figure 34B:
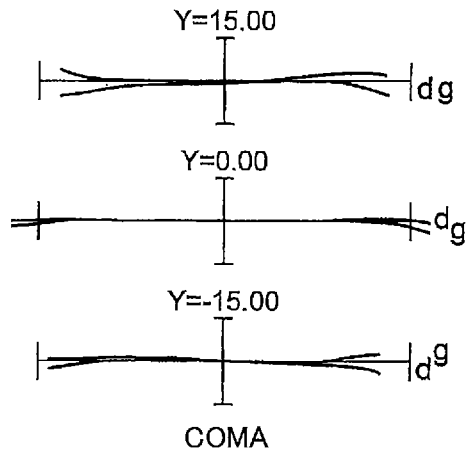

FIGS. 34A and 34B are graphs showing meridional transverse aberration of the variable magnification optical system ZL1 according to the Seventh Example when correction of image blur is conducted upon focusing on an infinite distance object, in which FIG. 34A shows the wide angle end state and FIG. 34B shows the telephoto end state.

In graphs showing the aberrations, "FNO" denotes an F-number, "NA" denotes a numerical aperture of a light made incident on the first lens group, and "Y" denotes an image height. In graphs, "d" denotes an aberration curve associated with d-line (wavelength λ=587.6 nm), and "g" denotes an aberration curve associated with g-line (wavelength λ=435.8 nm). In no indication, an aberration curve associated with d-line shown. In graphs showing spherical aberration, F-number with respect to the maximum aperture is shown, and in graphs showing astigmatism and distortion, the maximum value of the image height is shown. In graphs showing astigmatism, a solid line indicates a sagittal image plane, and a broken line indicates a meridional image plane. In graphs showing comma aberration, a solid line indicates a meridional comma aberration associated with d-line and g-line, and a broken line indicates a meridional comma aberration. Meanwhile, in graphs showing various aberrations in the other Examples as described below, the same symbols as in the present Example are employed.

As is apparent from the graphs showing aberrations, in the variable magnification optical system ZL1 according to the Seventh Example, the various aberrations are corrected superbly over the entire object distance from an infinite distance object to a close distance object, and excellent optical performance is obtained.

Eighth Example

Figure 35:
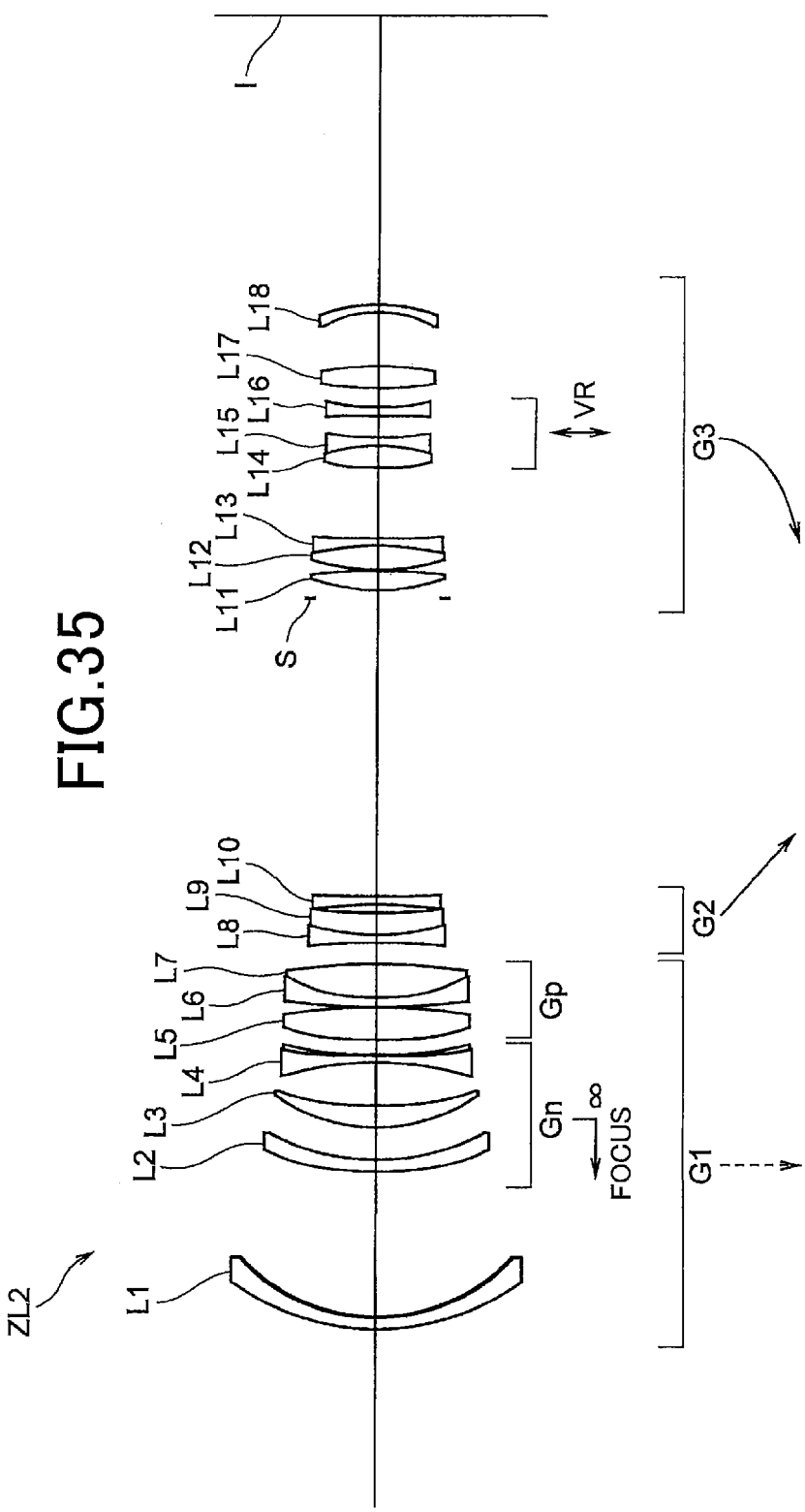
FIG. 35 is a sectional view showing a lens configuration of a variable magnification optical system according to an Eighth Example that is related to the third embodiment of the present application.

FIG. 35 is a sectional view showing a lens configuration of a variable magnification optical system ZL2 according to an Eighth Example relating to the third embodiment of the present application.

As shown in FIG. 35, the variable magnification optical system ZL2 according to the present Example is composed of, in order from an object side along the optical axis, a first lens group G1 having positive refractive power, a second lens group G2 having negative refractive power and a third lens group G3 having positive refractive power.

The first lens group G1 is composed of, in order from an object side along the optical axis, a negative meniscus lens L1 having a convex surface facing the object, a focusing group Gn having negative refractive power upon focusing on an infinite distance object and a part lens group Gp having positive refractive power. The negative meniscus lens L1 is an aspherical compound lens in which an aspherical surface is formed on a resin layer disposed on the image side lens surface.

The focusing group Gn is composed of, in order from the object side along the optical axis, a negative meniscus lens L2 having a convex surface facing the object, a positive meniscus lens L3 having a convex surface facing the object and a double concave lens L4. The negative meniscus lens L2 is a glass-molded aspherical lens in which an aspherical surface is formed on the image side lens surface. The double concave lens L4 is an aspherical compound lens in which an aspherical surface is formed on a resin layer disposed on the image side lens surface.

The part lens group Gp is composed of, in order from the object side along the optical axis, a double convex lens L5 and a cemented lens constructed by a negative meniscus lens L6 having a convex surface facing the object cemented with a double convex lens L7. The double convex lens L5 is a glass-molded aspherical lens in which an aspherical surface is formed on the object side lens surface.

The second lens group G2 is composed of, in order from the object side along the optical axis, a cemented lens constructed by a double concave lens L8 cemented with a positive meniscus lens L9 having a convex surface facing the object, and a double concave lens L10.

The third lens group G3 is composed of, in order from the object side along the optical axis, an aperture stop S, a double convex lens L11, a cemented lens constructed by a double convex lens L12 cemented with a double concave lens L13, a cemented lens constructed by a double convex lens L14 cemented with a double concave lens L15, a double concave lens L16, a double convex lens L17, and a negative meniscus lens L18 having a convex surface facing the image. The aperture stop S is disposed on the most object side in the third lens group G3 and formed integrally with the third lens group G3.

On the image plane I, an imaging device (not shown) such as a CCD, a CMOS or the like is disposed.

Under the above configuration, in the variable magnification optical system ZL2 according to the present Example, upon varying magnification from the wide angle end state to the telephoto end state, the second lens group G2 and the third lens group G3 are moved along the optical axis relative to the image plane I such that an interval between the first lens group G1 and the second lens group G2 and an interval between the second lens group G2 and the third lens group G3 are varied respectively. In detail, upon varying magnification, the first lens group G1 is fixed relative to the image plane I, the second lens group G2 is moved toward the image side and the third lens group G3 is moved toward the object. Thereby, upon varying magnification from the wide angle end state to the telephoto end state, the interval between the first lens group G1 and the second lens group G2 increases and the interval between the second lens group G2 and the third lens group G3 decreases. The aperture stop S is moved together with the third lens group G3 upon varying magnification from the wide angle end state to the telephoto end state.

In the variable magnification optical system ZL2 according to the present Example, focusing from an infinite distance object to a close distance object is carried out by moving the focusing group Gn toward the object along the optical axis. Meanwhile, upon focusing from the infinite distance object to the close distance object, a position in the direction of the optical axis, of the negative meniscus lens L1 disposed on the most object side lens of the first lens group G1 is fixed.

Further, in the variable magnification optical system ZL2 according to the present Example, by moving the cemented lens constructed by the double convex lens L14 cemented with the double concave lens L15 and the double concave lens L16, of the third lens group G3 in a direction having a directional component perpendicular to the optical axis as a vibration reduction lens group, correction of the image plane upon occurrence of image blur, that is, vibration reduction is carried out.

In the variable magnification optical system ZL2, when a focal length of the entire system is "f", a vibration reduction coefficient upon correcting a camera shake is "K", the vibration reduction lens group may be moved by the amount of (f×tan θ)/K perpendicularly to the optical axis, in order to correct rotational camera shake of an angle θ.

In the variable magnification optical system ZL2, the vibration reduction coefficient K in the wide angle end state is 1.11 and the focal length is 71.8 (mm) (see Table 8 below), so that the moving amount of the vibration reduction lens group for correction of rotational camera shake of 0.390° is 0.44 (mm). Further, the vibration reduction coefficient K in the telephoto end state is 1.54 and the focal length is 171.0 (mm) (see Table 8 below), so that the moving amount of the vibration reduction lens group for correction of rotational camera shake of 0.253° is 0.49 (mm).

Table 8 below shows various values of the variable magnification optical system relating to the Eighth Example.

TABLE 8

Eighth Example

[Surface Data]

| m | r | d | nd | vd |
|---|---|---|---|---|
| OP | ∞ | | | |
| 1 | 53.10 | 2.36 | 1.48749 | 70.32 |
| 2 | 40.00 | 0.19 | 1.56093 | 36.64 |
| 3* | 36.70 | d3 | | |
| 4 | 68.73 | 2.50 | 1.74400 | 44.80 |
| 5* | 50.61 | 6.56 | | |
| 6 | 39.33 | 4.50 | 1.72825 | 28.38 |
| 7 | 79.54 | 8.75 | | |
| 8 | −74.05 | 1.40 | 1.69680 | 55.52 |
| 9 | 165.90 | 0.20 | 1.56093 | 36.64 |
| 10* | 104.70 | d10 | | |
| 11* | 70.45 | 6.73 | 1.61800 | 63.34 |
| 12 | −139.91 | 0.10 | | |
| 13 | 164.14 | 1.77 | 1.75520 | 27.57 |
| 14 | 43.36 | 7.21 | 1.58913 | 61.22 |
| 15 | −111.36 | d15 | | |
| 16 | −173.36 | 1.45 | 1.69680 | 55.52 |
| 17 | 50.94 | 4.50 | 1.80809 | 22.74 |
| 18 | 132.14 | 1.81 | | |
| 19 | −141.02 | 1.45 | 1.59319 | 67.90 |
| 20 | 130.34 | d20 | | |
| 21 | ∞ | 1.50 | Aperture stop S | |
| 22 | 46.43 | 4.00 | 1.49782 | 82.57 |
| 23 | −106.59 | 0.10 | | |
| 24 | 52.63 | 5.00 | 1.49782 | 82.57 |
| 25 | −61.80 | 1.41 | 1.90200 | 25.25 |
| 26 | 273.76 | 14.27 | | |
| 27 | 73.00 | 4.50 | 1.90200 | 25.25 |
| 28 | −42.20 | 1.50 | 1.74100 | 52.76 |
| 29 | 96.62 | 4.50 | | |
| 30 | −236.86 | 1.50 | 2.00069 | 25.46 |
| 31 | 47.98 | 4.00 | | |
| 32 | 85.33 | 4.50 | 1.85026 | 32.35 |
| 33 | −83.25 | 10.91 | | |
| 34 | −25.95 | 1.41 | 1.79504 | 28.69 |
| 35 | −40.90 | BF | | |
| I | ∞ | | | |

TABLE 8-continued

Eighth Example

[Aspherical Data]

Third Surface

κ = 0.0000
A4 = 1.21122E−06
A6 = 2.87057E−10
A8 = −6.16926E−14
A10 = 5.34937E−17

Fifth Surface

κ = 0.0000
A4 = 9.07075E−07
A6 = −2.46095E−10
A8 = 1.64371E−13
A10 = −5.32477E−16

Tenth Surface

κ = 0.0000
A4 = 8.90876E−07
A6 = 5.06704E−10
A8 = −7.79450E−14
A10 = −8.57340E−16

Eleventh Surface

κ = 0.0000
A4 = −8.59935E−07
A6 = 1.93576E−10
A8 = −6.89609E−14
A10 = −9.77162E−17

[Various Data]

| | W | T |
|---|---|---|
| f = | 71.8–171.0 | |
| FNO = | 4.5–5.88 | |
| Y = | 21.6–21.6 | |
| 2ω = | 32.9–14.1 | |
| TL = | 265.75–265.75 | |
| BF = | 57.95–85.38 | |

| | W | M | T |
|---|---|---|---|
| [Variable Interval Data Upon Infinite Distance Imaging] | | | |
| f | 71.8 | 105.0 | 171.0 |
| d3 | 29.77 | 29.77 | 29.77 |
| d10 | 2.78 | 2.78 | 2.78 |
| d15 | 4.17 | 19.29 | 30.21 |
| d20 | 60.51 | 37.03 | 7.04 |
| BF | 57.95 | 66.31 | 85.38 |
| [Variable Interval Data Upon Closest Distance Imaging] | | | |
| β | −0.30 | −0.43 | −0.71 |
| d3 | 5.65 | 5.65 | 5.65 |
| d10 | 26.90 | 26.90 | 26.90 |
| d15 | 4.17 | 19.29 | 30.21 |
| d20 | 60.51 | 37.03 | 7.04 |
| BF | 57.95 | 66.31 | 85.38 |
| R | 420.00 | 420.00 | 420.00 |

[Lens Group Data]

| | ST | f |
|---|---|---|
| G1 | 1 | 124.87 |
| G2 | 16 | −58.84 |
| G3 | 21 | 62.88 |

[Values for Conditional Expressions]

(3-1) f1/(−f1n) = 1.02
(3-2) |f1/f1F| = 0.51
(3-3) (−f1n)/f1p = 2.28
(3-4) f1/f3 = 1.99

FIGS. 36A, 36B and 36C are graphs showing various aberrations of the variable magnification optical system ZL2 according to the Eighth Example upon focusing on an infinite distance object, in which FIG. 36A shows the wide angle end state, FIG. 36B shows the intermediate focal length state, and FIG. 36C shows the telephoto end state.

Figure 37A:
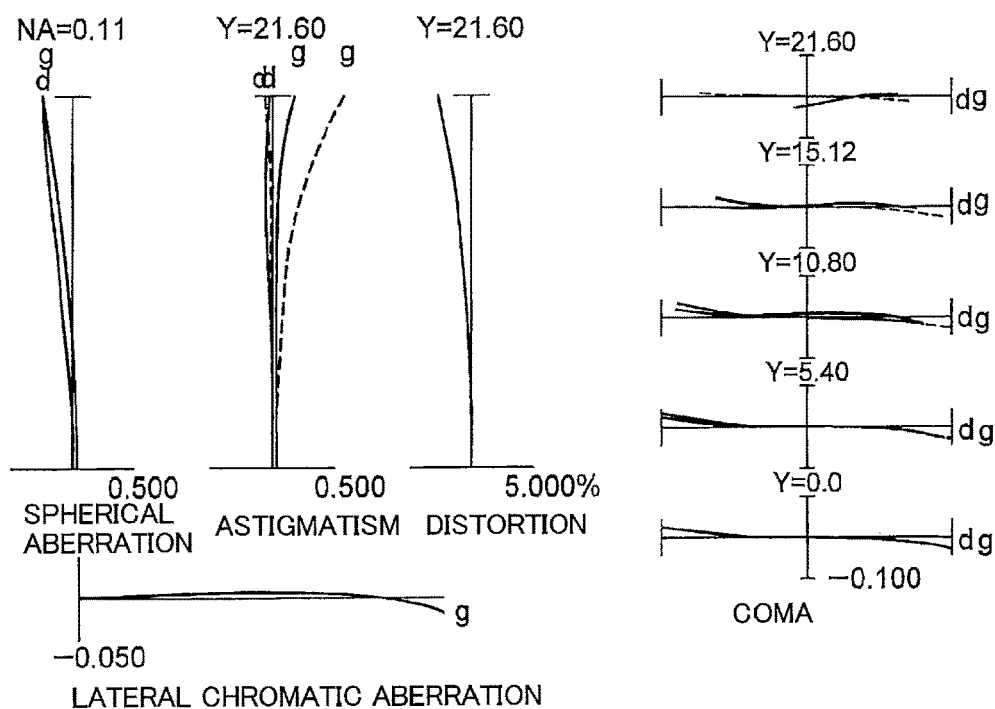
Figure 37B:
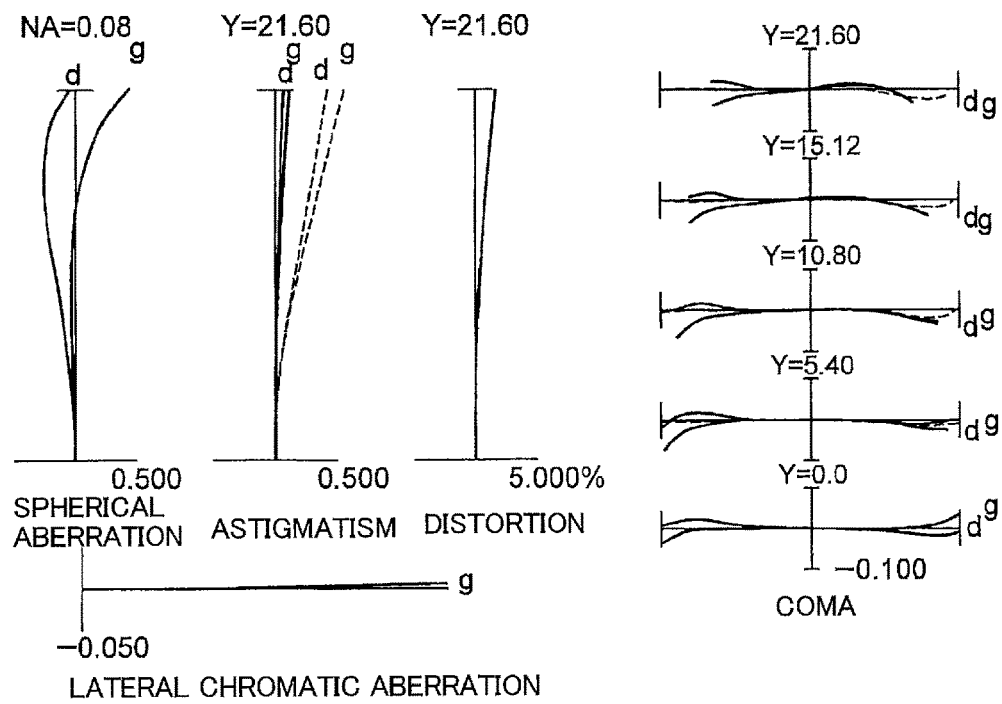

FIGS. 37A and 37B are graphs showing various aberrations of the variable magnification optical system ZL2 according to the Eighth Example upon focusing on a close distance object, in which FIG. 37A shows the wide angle end state and FIG. 37B shows the telephoto end state.

FIGS. 38A and 38B are graphs showing meridional transverse aberration of the variable magnification optical system ZL2 according to the Eighth Example when correction of image blur is conducted upon focusing on an infinite distance object, in which FIG. 38A shows the wide angle end state and FIG. 38B shows the telephoto end state.

As is apparent from the graphs showing aberrations, in the variable magnification optical system ZL2 according to the Eighth Example, the various aberrations are corrected superbly from a wide angle end state to a telephoto end state over the entire object distance from an infinite distance object to a close distance object, and excellent optical performance is obtained.

Ninth Example

FIG. 39 is a sectional view showing a lens configuration of a variable magnification optical system ZL3 according to a Ninth Example relating to the third embodiment of the present application.

As shown in FIG. 39, the variable magnification optical system ZL3 according to the present Example is composed of, in order from an object side along the optical axis, a first lens group G1 having positive refractive power, a second lens group G2 having negative refractive power and a third lens group G3 having positive refractive power.

The first lens group G1 is composed of, in order from an object side along the optical axis, a negative meniscus lens L1 having a convex surface facing the object, a focusing group Gn having negative refractive power upon focusing on an infinite distance object and a part lens group Gp having positive refractive power. The negative meniscus lens L1 is an aspherical compound lens in which an aspherical surface is formed on a resin layer disposed on the image side lens surface.

The focusing group Gn is composed of, in order from the object side along the optical axis, a first part group Gn1 having positive refractive power and a second part group Gn2 having negative refractive power.

The first part group Gn1 is composed of a positive meniscus lens L2 having a convex surface facing the object.

The second part group Gn2 is composed of a cemented lens constructed by a positive meniscus lens L3 having a convex surface facing the image side cemented with a double concave lens L4. The positive meniscus lens L3 is a glass-molded aspherical lens in which an aspherical surface is formed on the object side lens surface.

The part lens group Gp is composed of, in order from the object side along the optical axis, a double convex lens L5 and a cemented lens constructed by a negative meniscus lens L6 having a convex surface facing the object cemented with a double convex lens L7. The double convex lens L5 is a glass-molded aspherical lens in which an aspherical surface is formed on the object side lens surface.

The second lens group G2 is composed of, in order from the object side along the optical axis, a cemented lens constructed by a double concave lens L8 cemented with a positive meniscus lens L9 having a convex surface facing the object, and a double concave lens L10.

The third lens group G3 is composed of, in order from the object side along the optical axis, an aperture stop S, a double convex lens L11, a cemented lens constructed by a double convex lens L12 cemented with a double concave lens L13, a cemented lens constructed by a double convex lens L14 cemented with a double concave lens L15, a double concave lens L16, a double convex lens L17, and a negative meniscus lens L18 having a convex surface facing the image. The aperture stop S is disposed on the most object side in the third lens group G3 and formed integrally with the third lens group G3.

On the image plane I, an imaging device (not shown) such as a CCD, a CMOS or the like is disposed.

Under the above configuration, in the variable magnification optical system ZL3 according to the present Example, upon varying magnification from the wide angle end state to the telephoto end state, the second lens group G2 and the third lens group G3 are moved along the optical axis relative to the image plane I such that an interval between the first lens group G1 and the second lens group G2 and an interval between the second lens group G2 and the third lens group G3 are varied respectively. In detail, upon varying magnification, the first lens group G1 is fixed relative to the image plane I, the second lens group G2 is moved toward the image side and the third lens group G3 is moved toward the object. Thereby, upon varying magnification from the wide angle end state to the telephoto end state, the interval between the first lens group G1 and the second lens group G2 increases and the interval between the second lens group G2 and the third lens group G3 decreases. The aperture stop S is moved together with the third lens group G3 upon varying magnification from the wide angle end state to the telephoto end state.

In the variable magnification optical system ZL3 according to the present Example, focusing from an infinite distance object to a close distance object is carried out by moving the focusing group Gn toward the object along the optical axis. In detail, focusing from the infinite distance object to the close distance object is carried out by moving the first part group Gn1 and the second part group Gn2 in the focusing group Gn toward the object respectively. As for the movement of the first part group Gn1 and the second part group Gn2 toward the object, the first part group Gn1 is moved faster and the second part group Gn2 is moved to follow the first part group Gn1. Accordingly, while the first part group Gn1 and the second part group Gn2 are moved toward the object, an interval between the first part group Gn1 and the second part group Gn2 increases. Meanwhile, upon focusing, a position in the direction of the optical axis, of the negative meniscus lens L1 disposed on the most object side lens of the first lens group G1 is fixed.

Further, in the variable magnification optical system ZL3 according to the present Example, by moving the cemented lens constructed by the double convex lens L14 cemented with the double concave lens L15 and the double concave lens L16, of the third lens group G3 in a direction having a directional component perpendicular to the optical axis as a vibration reduction lens group, correction of the image plane upon occurrence of image blur, that is, vibration reduction is carried out.

In the variable magnification optical system ZL3, when a focal length of the entire system is "f", a vibration reduction coefficient upon correcting a camera shake is "K", the vibration reduction lens group may be moved by the amount of $(f \times \tan \theta)/K$ perpendicularly to the optical axis, in order to correct rotational camera shake of an angle $\theta$.

In the variable magnification optical system ZL3, the vibration reduction coefficient K in the wide angle end state is 1.25 and the focal length is 71.8 (mm) (see Table 9 below), so that the moving amount of the vibration reduction lens group for correction of rotational camera shake of 0.389° is 0.39 (mm). Further, the vibration reduction coefficient K in the telephoto end state is 1.71 and the focal length is 171.0 (mm) (see Table 9 below), so that the moving amount of the vibration reduction lens group for correction of rotational camera shake of 0.252° is 0.44 (mm).

Table 9 below shows various values of the variable magnification optical system ZL3 relating to the Ninth Example.

TABLE 9

Ninth Example

[Surface Data]

| m | r | d | nd | vd |
|---|---|---|---|---|
| OP | ∞ | | | |
| 1 | 63.21 | 2.36 | 1.48749 | 70.32 |
| 2 | 40.00 | 0.19 | 1.56093 | 36.64 |
| 3* | 36.40 | d3 | | |
| 4 | 42.65 | 6.00 | 1.72825 | 28.38 |
| 5 | 74.29 | d5 | | |
| 6* | −68.89 | 2.30 | 1.58313 | 59.53 |
| 7 | −58.56 | 1.40 | 1.69680 | 55.52 |
| 8 | 103.87 | d8 | | |
| 9* | 71.60 | 6.73 | 1.58913 | 61.22 |
| 10 | −89.37 | 0.10 | | |
| 11 | 119.61 | 1.77 | 1.75520 | 27.57 |
| 12 | 39.18 | 7.21 | 1.58913 | 61.22 |
| 13 | −195.01 | d13 | | |
| 14 | −153.15 | 1.45 | 1.69680 | 55.52 |
| 15 | 46.57 | 4.50 | 1.80809 | 22.74 |
| 16 | 105.28 | 1.94 | | |
| 17 | −145.39 | 1.45 | 1.59319 | 67.90 |
| 18 | 188.93 | d18 | | |
| 19 | ∞ | 1.50 | Aperture stop S | |
| 20 | 50.87 | 5.00 | 1.49782 | 82.57 |
| 21 | −101.93 | 0.10 | | |
| 22 | 49.01 | 5.00 | 1.49782 | 82.57 |
| 23 | −66.62 | 1.41 | 1.90200 | 25.26 |
| 24 | 263.75 | 15.59 | | |
| 25 | 76.65 | 4.50 | 1.90200 | 25.26 |
| 26 | −41.58 | 1.50 | 1.74100 | 52.76 |
| 27 | 101.88 | 4.47 | | |
| 28 | −168.59 | 1.50 | 2.00069 | 25.46 |
| 29 | 48.53 | 4.00 | | |
| 30 | 92.68 | 4.50 | 1.85026 | 32.35 |
| 31 | −75.95 | 11.53 | | |
| 32 | −26.71 | 1.41 | 1.79504 | 28.69 |
| 33 | −39.62 | BF | | |
| I | ∞ | | | |

[Aspherical Data]

Third Surface

κ = 0.0000
A4 = 9.50891E−07
A6 = −1.31378E−10
A8 = −3.84583E−14
A10 = −1.22939E−16

Sixth Surface

κ = 0.0000
A4 = −7.25088E−07
A6 = −2.48121E−10
A8 = 1.08360E−12
A10 = −6.73072E−16

TABLE 9-continued

Ninth Example

Ninth Surface

κ = 0.0000
A4 = −8.71221E−07
A6 = 2.23342E−10
A8 = −2.83237E−13
A10 = 1.73835E−16

[Various Data]

| | W | T |
|---|---|---|
| f = | | 71.8-171.0 |
| FNO = | | 4.5-5.88 |
| Y = | | 21.6-21.6 |
| 2ω = | | 32.9-14.1 |
| TL = | | 261.14-261.14 |
| BF = | | 59.18-85.46 |

| | W | M | T |
|---|---|---|---|

[Variable Interval Data Upon Infinite Distance Imaging]

| | | | |
|---|---|---|---|
| f | 71.8 | 105.0 | 171.0 |
| d3 | 30.00 | 30.00 | 30.00 |
| d5 | 8.41 | 8.41 | 8.41 |
| d8 | 6.20 | 6.20 | 6.20 |
| d13 | 3.00 | 16.15 | 29.49 |
| d18 | 54.94 | 31.73 | 2.20 |
| BF | 59.18 | 69.34 | 85.46 |

[Variable Interval Data Upon Closest Distance Imaging]

| | | | |
|---|---|---|---|
| β | −0.33 | −0.48 | −0.78 |
| d3 | 8.78 | 8.78 | 8.78 |
| d5 | 6.29 | 6.29 | 6.29 |
| d8 | 29.55 | 29.55 | 29.55 |
| d13 | 3.00 | 16.15 | 29.49 |
| d18 | 54.94 | 31.73 | 2.20 |
| BF | 59.18 | 69.34 | 85.46 |
| R | 400.00 | 400.00 | 400.00 |

[Lens Group Data]

| | ST | f |
|---|---|---|
| G1 | 1 | 116.90 |
| G2 | 14 | −57.60 |
| G3 | 19 | 63.16 |

[Values for Conditional Expressions]

(3-1) f1/(−f1n) = 0.83
(3-2) |f1/f1F| = 0.66
(3-3) (−f1n)/f1p = 2.71
(3-4) f1/f3 = 1.85

Figure 40A:
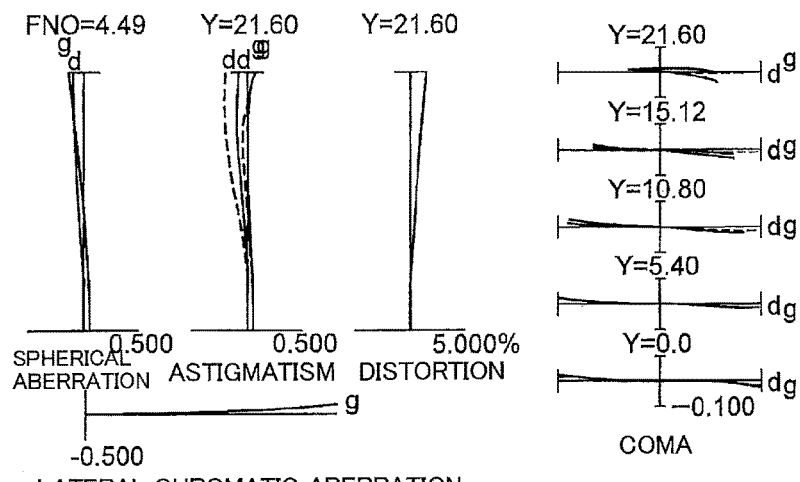
Figure 40B:
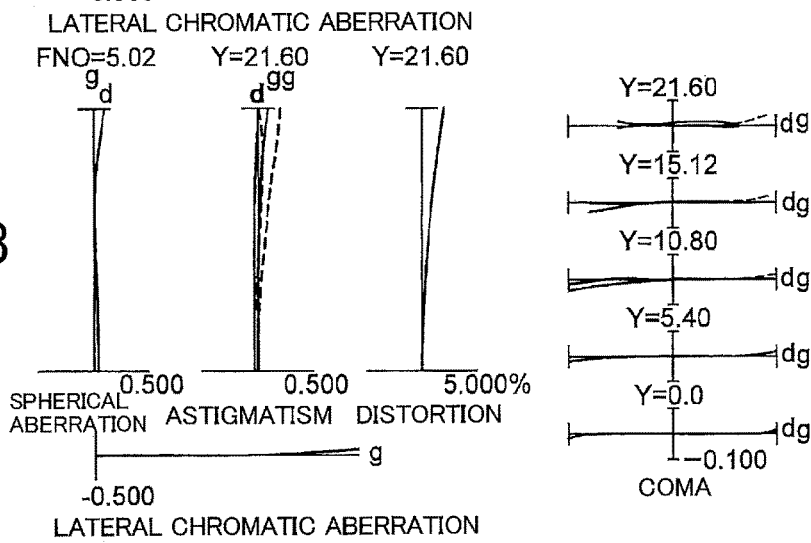
Figure 40C:
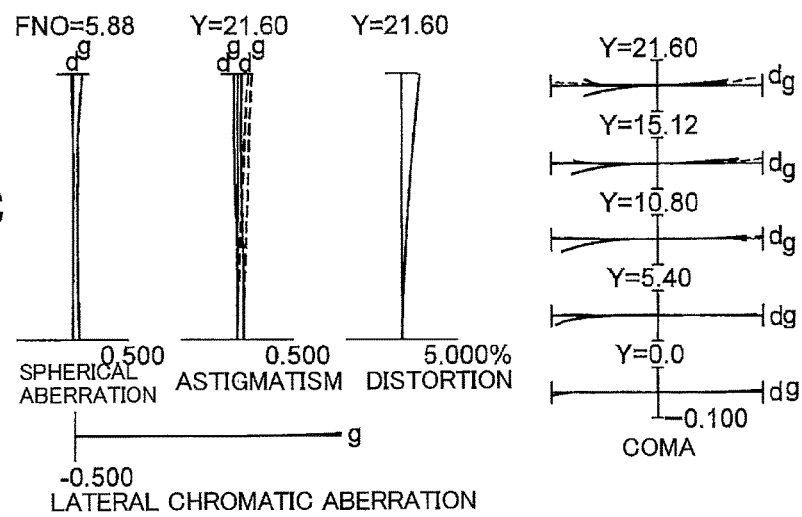

FIGS. 40A, 40B and 40C are graphs showing various aberrations of the variable magnification optical system ZL3 according to the Ninth Example upon focusing on an infinite distance object, in which FIG. 40A shows the wide angle end state, FIG. 40B shows the intermediate focal length state, and FIG. 40C shows the telephoto end state.

Figure 41A:
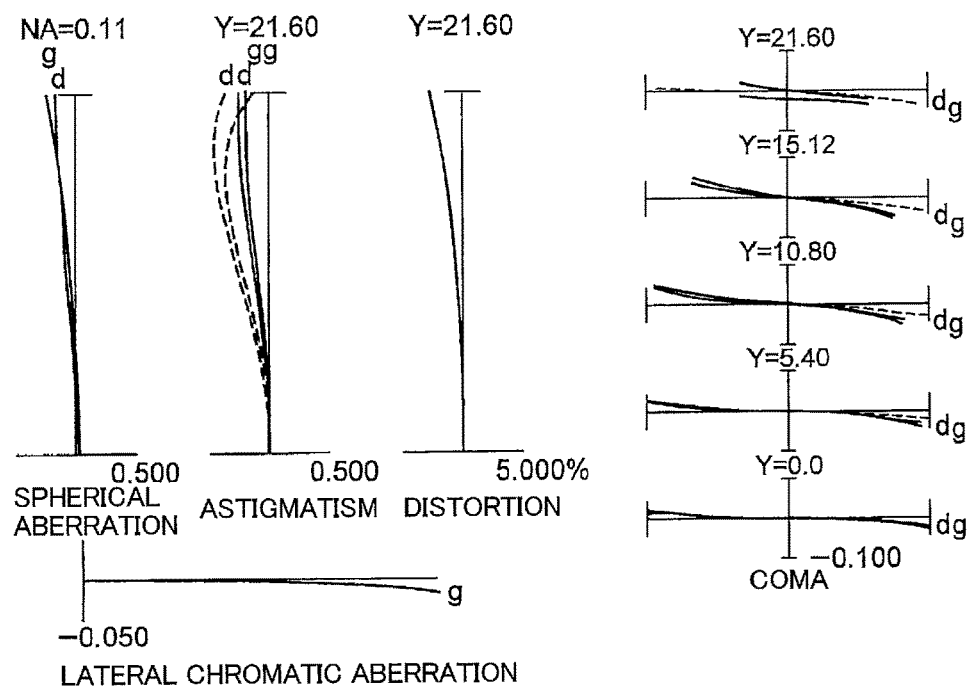
Figure 41B:
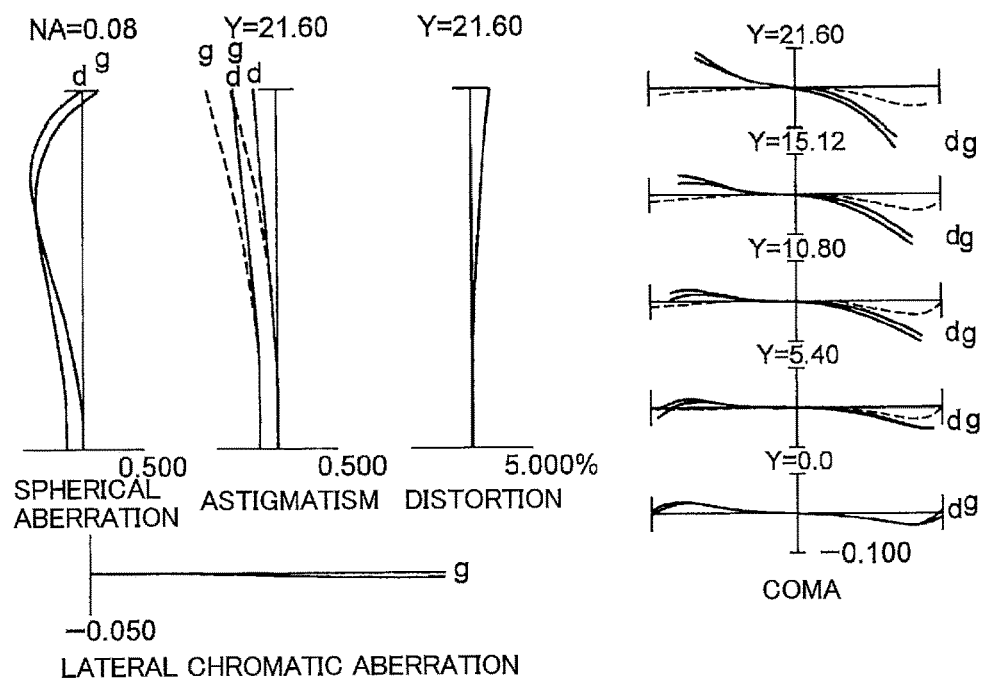

FIGS. 41A and 41B are graphs showing various aberrations of the variable magnification optical system ZL3 according to the Ninth Example upon focusing on a close distance object, in which FIG. 41A shows the wide angle end state and FIG. 41B shows the telephoto end state.

FIGS. 42A and 42B are graphs showing meridional transverse aberration of the variable magnification optical system ZL3 according to the Ninth Example when correction of image blur is conducted upon focusing on an infinite distance object, in which FIG. 42A shows the wide angle end state and FIG. 42B shows the telephoto end state.

As is apparent from the graphs showing aberrations, in the variable magnification optical system ZL3 according to the Ninth Example, the various aberrations are corrected superbly from a wide angle end state to a telephoto end state over the entire object distance from an infinite distance object to a close distance object, and excellent optical performance is obtained.

As mentioned above, each of the above described Examples can realize a small-sized variable magnification optical system having excellent optical performance. In addition, it is noted that each of the above described Examples is a concrete example of the invention of the present application, and the invention of the present application is not limited to them. The contents described below can be adopted without deteriorating optical performance of the variable magnification optical systems according to the present application.

In addition, it is noted that each of the above described Examples is a concrete example of the invention of the present application, and the invention of the present application is not limited to them. The contents described below can be adopted without deteriorating optical performance of the variable magnification optical systems according to the present application.

Although variable magnification optical systems each having a three group configuration were illustrated above as numerical examples of the variable magnification optical systems according to the present application, the present application is not limited to them and variable magnification optical systems having other configurations, such as four group configuration, five group configuration or the like, can be configured. Concretely, a lens configuration that a lens or a lens group is added to the most object side or the most image side of the variable magnification optical systems according to the present application is possible. Incidentally, a lens group designates a part having at least one lens separated by an air interval varied upon varying magnification.

Further, in order to perform focusing from an infinite distance object to a close object, the variable magnification optical systems according to the present application may be so configured that a portion of a lens group, a single lens group in the entirety thereof, or a plurality of lens groups is moved along the optical axis as a focusing lens group. It is particularly preferable that at least a portion of the first lens group is moved as the focusing lens group. In addition, the focusing lens group can be used for auto focus, and suitable for being driven by a motor such as an ultrasonic motor.

Further, the variable magnification optical systems according to the present application may so configured that a shake detecting system for detecting a camera shake of a lens system and a driving means are combined with the lens system and any lens group in the entirety thereof or a portion thereof can be moved in a direction including a component perpendicular to the optical axis as a vibration reduction lens group, or rotationally moved (swayed) in an in-plane direction including the optical axis, whereby an image blur caused by a camera shake or the like is corrected. Particularly, in the variable magnification optical systems according to the first and the second embodiments of the present application, it is preferable that at least a portion of the first lens group G1 or the third lens group G3 is used as a vibration reduction lens group.

Further, in the variable magnification optical systems according to the present application, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if an image plane is shifted, deterioration in depiction performance is little, so that it is preferable. When a lens surface is an aspherical surface, the aspherical surface may be fabricated by a grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Further, in the variable magnification optical systems according to the first and the second embodiments of the present application, it is preferable that the aperture stop S is disposed in the vicinity of the third lens group G3. But, the function may be substituted by a lens frame without disposing a member as an aperture stop. In the variable magnification optical system according to the third embodiment of the present application, the aperture stop S is disposed on the most object side of the third lens group G3. But, the function may be substituted by a lens frame without disposing a member as an aperture stop.

Moreover, the lens surface(s) of the lenses configuring the variable magnification optical systems according to the present application, may be coated with anti-reflection coating(s) having a high transmittance in a wide wavelength region. With this contrivance, it is feasible to reduce a flare as well as ghost and attain excellent optical performance with high contrast.

In the variable magnification optical systems according to the present application, a focal length in the wide angle end state is about 60 mm through 80 mm by conducting 35 mm-conversion, and a focal length in the telephoto end state is about 150 mm through 200 mm by conducting 35 mm-conversion. Further, in the variable magnification optical systems according to the present application, a magnification ratio is on the order of 1.5 through 4. Furthermore, in the variable magnification optical systems according to the present application, the maximum shooting magnification β in any focal length state is equal to or exceed −0.5 and equal to or falls below −1.0, and both short-distance shooting and varying magnification can be satisfied.

Figure 43:
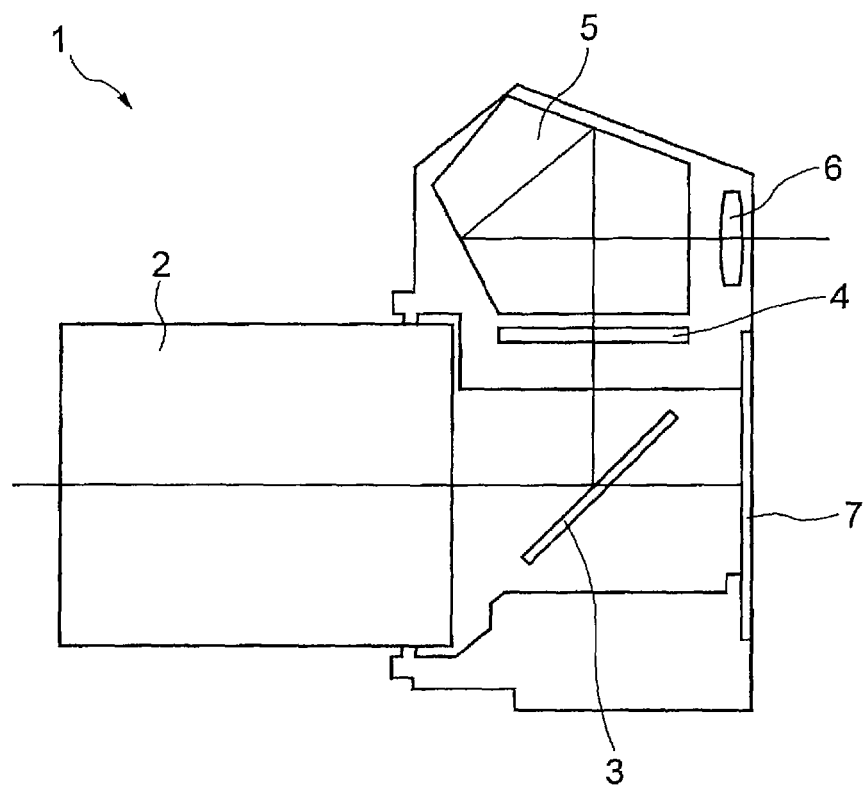
FIG. 43 is a diagram showing a cross-section of a single lens reflex camera equipped with the variable magnification optical system according to the First Example of the present application.

Next, a camera equipped with the variable magnification optical system according to the present application, will be explained with referring to FIG. 43. FIG. 43 is a view showing a configuration of the camera equipped with the variable magnification optical system according to the present application. The present camera 1 is a single-lens reflex digital camera equipped with the variable magnification optical system according to the first Example as an imaging lens 2.

In the present camera 1, a light emitted from an unillustrated object is converged by the imaging lens 2, reflected by a quick return mirror 3, and focused on a focusing screen 4. The light focused on the focusing screen 4 is reflected a plurality of times in a pentagonal roof prism 5, and is led to an eyepiece 6. Accordingly, a photographer can observe an object image as an erected image through the eyepiece 6.

When the photographer presses an unillustrated release button down, the quick return mirror 3 is retracted from the optical path, and the light from the unillustrated object arrives on an imaging device 7. Accordingly, the light emitted from the object is captured by the imaging device 7, and stored in an unillustrated memory as the object image. In this manner, the photographer can take a picture of the object by the present camera 1.

As mentioned above, the variable magnification optical system according to the first Example installed as the imaging lens 2 in the present camera 1, can correct superbly aberrations over the entire object distance from an infinite distance to the closest distance and upon correcting displacement of an imaging position caused by a camera shake or the like, so that the variable magnification optical system has optical performance making available of dealing with problems caused by displacement of an imaging position due to a camera shake or the like. Accordingly, the present camera 1 in which the variable magnification optical system according to the first Example is installed as the imaging lens 2, deals with problems caused by displacement of an imaging position due to a camera shake or the like, so that it can realize excellent performance photographing. Further, as above-mentioned, the variable magnification optical system according to the first Example installed as the imaging lens 2 in the present camera 1, attains downsizing, corrects superbly various aberrations including spherical aberration and comma aberration, and has excellent optical performance. Therefore, the present camera 1 in which the variable magnification optical system according to the first Example is installed as the imaging lens 2, can realize downsizing and excellent photographing with superb correction of various aberrations. Incidentally, when there is configured a camera in which the variable magnification optical system according to any of the before-mentioned second to sixth Examples is installed as the imaging lens 2, the camera also can the same effects as those of the above-mentioned camera 1. Further, there can be configured a camera in which the variable magnification optical system according to any of the before-mentioned seventh to ninth Examples is installed as the imaging lens 2. The seventh to ninth Examples are small-sized variable magnification optical systems having excellent optical performance. As a result, the present camera can realize downsizing and excellent optical performance.

Figure 44:
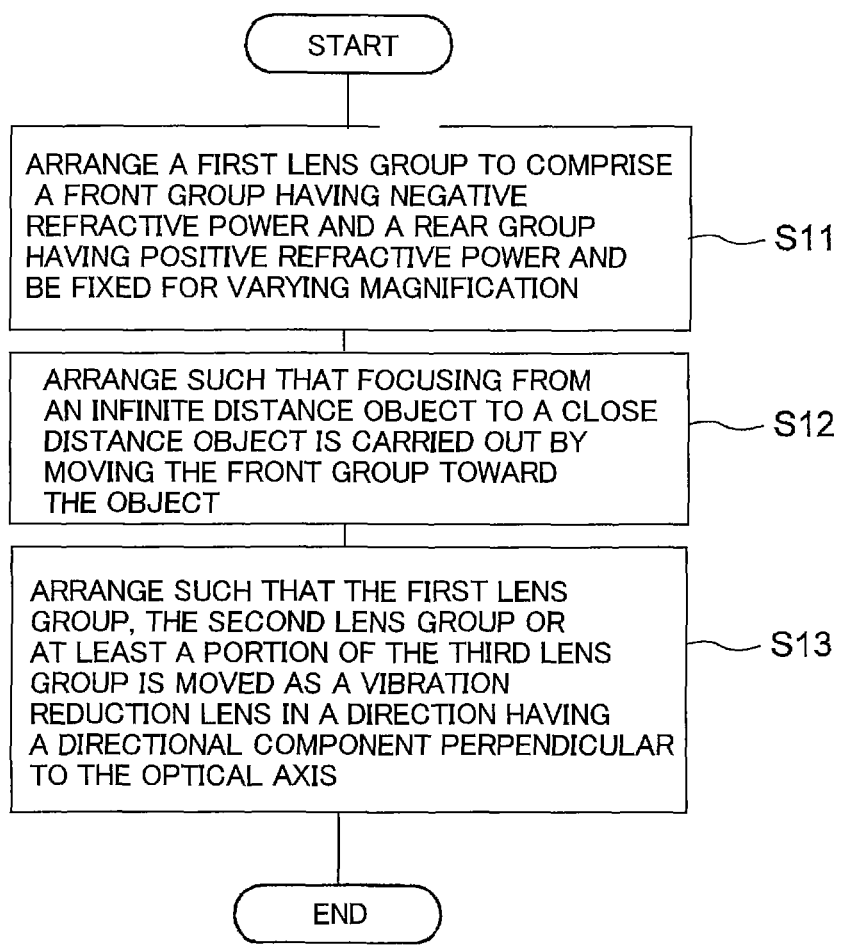
FIG. 44 is a flowchart schematically showing a method for manufacturing the variable magnification optical system according to the first embodiment of the present application.

Next, an outline of a method for manufacturing the variable magnification optical system according to the first embodiment of the present application, is described with referring to FIG. 44.

The method for manufacturing the variable magnification optical system according to the first embodiment of the present application as shown in FIG. 44, is a method for manufacturing a variable magnification optical system which comprises, in order from an object side along the optical axis, a first lens group G1 having positive refractive power, a second lens group G2 having negative refractive power and a third lens group G3 having positive refractive power, the method comprising the following steps S11 to S13.

That is, as the step S11, the first lens group G1 is arranged to comprise a front group G11 having negative refractive power and a rear group G12 having positive refractive power and be fixed for varying magnification. As the step S12, there is conducted such arrangement that focusing from an infinite distance object to a close distance object is carried out by moving the front group G11 toward the object. As the step S13, there is conducted such arrangement that the first lens group G1, the second lens group G2 or at least a portion of the third lens group G3 is moved as a vibration reduction lens in a direction having a directional component perpendicular to the optical axis.

According to the above-stated method, it is possible to manufacture a variable magnification optical system that can solve the problem of displacement of an imaging position caused by a camera shake or the like.

Next, an outline of a method for manufacturing the variable magnification optical system according to the second embodiment of the present application, is described with referring to FIG. 45.

The method for manufacturing the variable magnification optical system according to the second embodiment of the present application as shown in FIG. 45, is a method for manufacturing a variable magnification optical system which comprises, in order from an object side along the optical axis, a first lens group G1 having positive refractive power, a second lens group G2 having negative refractive power and a third lens group G3 having positive refractive power, the method comprising the following steps S21 to S23.

That is, as the step S21, the first lens group G1 is arranged to comprise a front group G11 having negative refractive power and a rear group G12 having positive refractive power and be fixed for varying magnification. As the step S22, there is conducted such arrangement that focusing from an infinite distance object to a close distance object is carried out by moving the front group G11 toward the object. As the step S23, there is conducted such arrangement that the following conditional expression (2-1) is satisfied:

$$0.20 < df/D1 < 0.50 \quad (2\text{-}1)$$

where df denotes the sum of thickness along the optical axis of each lens composing the front group G11, and D1 denotes the sum of thickness along the optical axis of each lens composing the first lens group G1.

According to the above-stated method, it is possible to manufacture a small-sized variable magnification optical system having excellent optical performance.

Finally, a method for manufacturing the variable magnification optical system according to the third embodiment of the present application is described. FIG. 46 is a schematic view showing a method for manufacturing the variable magnification optical system according to the third embodiment of the present application.

The method for manufacturing the variable magnification optical system according to the third embodiment is a method for manufacturing a variable magnification optical system which comprises, in order from an object side along the optical axis, a first lens group G1 having positive refractive power, a second lens group G2 having negative refractive power and a third lens group G3 having positive refractive power, the method comprising the following steps S31 to S33 as shown in FIG. 46.

Step S31: constructing such that, upon varying magnification from a wide angle end state to a telephoto end state, a position of said first lens group in the direction of the optical axis is fixed, an interval between said first lens group and said second lens group is varied and an interval between said second lens group and said third lens group is varied.

Step S32: constructing such that said first lens group comprises a focusing group having negative refractive power in a state where an infinite distance object is focused.

Step S33: constructing such that focusing from an infinite distance object to a close distance object is carried out by moving said focusing group in the direction of the optical axis, and upon the focusing, a position in the direction of the optical axis, of the most object side lens of said first lens group is fixed.

According to the above-stated method, it is possible to manufacture a small-sized variable magnification optical system having excellent imaging performance.

ZL1, ZL2, ZL3 variable magnification optical system
G1 first lens group
G2 second lens group
G3 third lens group
G11 front group in the first lens group
G12 rear group in the first lens group
Gn focusing lens group
Gp part lens group
Gn1 first part group
Gn2 second part group
I image plane
S aperture stop
1 camera, optical apparatus
2 imaging lens
3 quick return mirror
4 focusing screen
5 pentagonal roof prism
6 eyepiece
7 imaging device

What is claimed is:

1. A variable magnification optical system comprising, in order from an object side, a first lens group having positive refractive power, a second lens group having negative refractive power, and a third lens group having positive refractive power;
said first lens group comprising a front group having negative refractive power and a rear group having positive refractive power;
focusing being carried out by moving said front group; and
the following conditional expression being satisfied:

$$0.80 < f1/(-f1F) < 1.50$$

where f1 denotes a focal length of said first lens group, and f1F denotes a focal length of the most object side lens in said front group.

2. A variable magnification optical system comprising, in order from an object side, a first lens group having positive refractive power, a second lens group having negative refractive power, and a third lens group having positive refractive power;
said first lens group comprising a front group having negative refractive power and a rear group having positive refractive power;
focusing being carried out by moving said front group; and
the following conditional expressions being satisfied:

$$0.20 < df/D1 < 0.50$$

$$0.80 < f1/(-f1F) < 1.50$$

where df denotes the sum of thickness along the optical axis of each lens composing said front group, D1 denotes the sum of thickness along the optical axis of each lens composing said first lens group, f1 denotes a focal length of said first lens group, and f1F denotes a focal length of the most object side lens in said front group.

3. A variable magnification optical system according to claim 1 or 2, wherein a position of said first lens group relative to the image plane is fixed upon varying magnification.

4. A variable magnification optical system according to claim 1 or 2, wherein the following conditional expression is satisfied:

$$0.80 < f1/(-f11) < 1.60$$

where f1 denotes a focal length of said first lens group, and f11 denotes a focal length of said front group.

5. A variable magnification optical system according to claim 1 or 2, wherein the following conditional expression is satisfied:

$$0.85<(-f2)/f3<1.20$$

where f2 denotes a focal length of said second lens group, and f3 denotes a focal length of said third lens group.

6. A variable magnification optical system according to claim 1 or 2, wherein upon varying magnification from a wide angle end state to a telephoto end state, an interval between said first lens group and said second lens group increases and an interval between said second lens group and said third lens group decreases.

7. A variable magnification optical system comprising, in order from an object side along the optical axis, a first lens group having positive refractive power, a second lens group having negative refractive power, and a third lens group having positive refractive power;
   upon varying magnification, an interval between said first lens group and said second lens group being varied and an interval between said second lens group and said third lens group being varied;
   said first lens group comprising at least one lens disposed on the most object side and a focusing group;
   said focusing group having negative refractive power in a state where an infinite distance object is focused;
   focusing being carried out by moving said focusing group along the optical axis; and
   the following conditional expression being satisfied:

$$0.7<f1/(-f1n)<1.2$$

where f1 denotes a focal length of said first lens group, and f1n denotes a focal length of said focusing group in a state where an infinite distance object is focused.

8. A variable magnification optical system according to claim 7, wherein a position of said at least one lens disposed on the most object side, relative to the image plane is fixed upon focusing.

9. A variable magnification optical system according to claim 7 or 8, wherein a position of said first lens group relative to the image plane is fixed upon varying magnification.

10. A variable magnification optical system according to claim 9, wherein said first lens group comprises an image side part lens group having positive refractive power on an image side of said focusing group, and a position of said image side part lens group relative to the image plane is fixed upon focusing.

11. A variable magnification optical system according to claim 10, wherein the following conditional expression is satisfied:

$$2.0<(-f1n)/f1p<3.0$$

where f1n denotes a focal length of said focusing group in a state where an infinite distance object is focused, and f1p denotes a focal length of said image side part lens group.

12. A variable magnification optical system according to claim 10, wherein the following conditional expression is satisfied:

$$1.7<f1/f3<2.2$$

where f1 denotes a focal length of said first lens group, and f3 denotes a focal length of said third lens group.

13. A variable magnification optical system according to claim 10, wherein said focusing group comprises a first part group having positive refractive power and a second part group having negative refractive power, and an interval between said first part group and said second part group is varied upon focusing.

14. A variable magnification optical system according to claim 10, wherein upon varying magnification from a wide angle end state to a telephoto end state, an interval between said first lens group and said second lens group increases and an interval between said second lens group and said third lens group decreases.

15. A variable magnification optical system according to any one of claims 1, 2 and 7, wherein the following conditional expression is satisfied:

$$0.4<|f1/f1F|<0.8$$

where f1 denotes a focal length of said first lens group, and f1F denotes a focal length of the most object side lens in said first lens group.

16. An optical apparatus comprising the variable magnification optical system according to any one of claims 1, 2 and 7.

17. A variable magnification optical system according to any one of claims 1, 2 and 7, wherein
   said first lens group, said second lens group or at least a portion of said third lens group is moved in a direction having a directional component perpendicular to the optical axis as a vibration reduction lens group.

18. A variable magnification optical system according to any one of claims 1, 2 and 7, and wherein a shooting magnification in any focal state is equal to or exceeds −0.5.

19. A method for manufacturing a variable magnification optical system comprising, in order from an object side, a first lens group having positive refractive power, a second lens group having negative refractive power and a third lens group having positive refractive power;
   the method comprising steps of:
   arranging said first lens group to comprise a front group having negative refractive power and a rear group having positive refractive power;
   arranging such that focusing is carried out by moving said front group;
   arranging such that a shooting magnification in any focal length state is equal to or exceeds −0.5; and
   arranging such that the following conditional expression is satisfied:

$$0.80<f1/(-f1F)<1.50$$

where f1 denotes a focal length of said first lens group, and f1F denotes a focal length of the most object side lens in said front group.

20. A method for manufacturing a variable magnification optical system comprising, in order from an object side, a first lens group having positive refractive power, a second lens group having negative refractive power and a third lens group having positive refractive power;
   the method comprising steps of:
   arranging said first lens group to comprise a front group having negative refractive power and a rear group having positive refractive power;
   arranging such that focusing is carried out by moving said front group; and
   arranging such that the following conditional expressions are satisfied:

$$0.20<df/D1<0.50$$

$$0.80<f1/(-f1F)<1.50$$

where df denotes the sum of thickness along the optical axis of each lens composing said front group, D1 denotes the sum of thickness along the optical axis of each lens composing said first lens group, f1 denotes a focal length of said first lens group, and f1F denotes a focal length of the most object side lends in said front group.

21. A method for manufacturing a variable magnification optical system comprising, in order from an object side, a first lens group having positive refractive power, a second lens group having negative refractive power and a third lens group having positive refractive power;

the method comprising steps of:

constructing such that, upon varying magnification an interval between said first lens group and said second lens group is varied and an interval between said second lens group and said third lens group is varied;

constructing such that said first lens group comprises at least one lens disposed on the most object side and a focusing group;

constructing such that said focusing group has negative refractive power in a state where an infinite distance object is focused;

constructing such that focusing is carried out by moving said focusing group along the optical axis; and constructing such that the following conditional expression is satisfied:

$0.7 < f1/(-f1n) < 1.2$ where f1 denotes a focal length of said first lens group, and f1n denotes a focal length of said focusing group in a state where an infinite distance object is focused.

* * * * *